(12) United States Patent
Lee

(10) Patent No.: US 11,140,674 B2
(45) Date of Patent: *Oct. 5, 2021

(54) METHOD FOR TRANSMITTING AND RECEIVING PHYSICAL DOWNLINK SHARED CHANNEL IN WIRELESS COMMUNICATION SYSTEM AND DEVICE SUPPORTING THE SAME

(71) Applicant: LG Electronics Inc., Seoul (KR)

(72) Inventor: Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,610

(22) Filed: Mar. 10, 2020

(65) Prior Publication Data

US 2020/0288446 A1 Sep. 10, 2020

Related U.S. Application Data

(63) Continuation of application No. 16/506,368, filed on Jul. 9, 2019, now Pat. No. 10,631,285.

(Continued)

(51) Int. Cl.
*H04W 4/00* (2018.01)
*H04W 72/04* (2009.01)

(52) U.S. Cl.
CPC ....... *H04W 72/042* (2013.01); *H04W 72/044* (2013.01)

(58) Field of Classification Search
CPC ............. H04W 72/042; H04W 72/044; H04W 72/0446; H04W 72/1242; H04W 72/1289;

(Continued)

(56) References Cited

U.S. PATENT DOCUMENTS 10,516,507 B2 * 12/2019 Uchino ............. H04W 52/0216
10,631,285 B2 * 4/2020 Lee .................... H04L 5/0053

(Continued)

FOREIGN PATENT DOCUMENTS

JP 2016530840 9/2016
JP 2017531361 10/2017

(Continued)

OTHER PUBLICATIONS

Ericsson, "Notes of the offline session on PDSCH repetition for LTE URLLC," R1-1807452,3GPP TSG RAN WG1 Meeting #93, Busan, Korea, May 21-25, 2018, 7 pages.

(Continued)

*Primary Examiner* — Chuong T Ho
(74) *Attorney, Agent, or Firm* — Fish & Richardson P.C.

(57) ABSTRACT

A method of receiving, by a user equipment, a physical downlink shared channel (PDSCH) in a wireless communication system. The method includes receiving, from a base station (BS), a higher layer signal including first information for an uplink (UL)-downlink (DL) configuration; repeatedly receiving, from the BS, a first transport block (TB) via the PDSCH based on the first information for the UL-DL configuration; receiving, from the BS, a first control channel including second information for the UL-DL configuration; and discarding a second control channel based on: (i) the second control channel scheduling a PDSCH repetition of a second TB in a transmission time unit, (ii) the first information for the UL-DL configuration indicating the transmission time unit as an uplink, and (iii) the second information for the UL-DL configuration indicating the transmission time unit as a downlink.

12 Claims, 27 Drawing Sheets

Related U.S. Application Data

(60) Provisional application No. 62/737,958, filed on Sep. 28, 2018, provisional application No. 62/716,327, filed on Aug. 8, 2018, provisional application No. 62/695,775, filed on Jul. 9, 2018.

(58) Field of Classification Search
CPC ....... H04L 1/1664; H04L 1/08; H04L 1/1896; H04L 1/1854; H04L 5/0073; H04L 5/1469; H04L 5/0053; H04L 5/0044
USPC .................................................. 370/329, 330
See application file for complete search history.

(56) References Cited

U.S. PATENT DOCUMENTS

| | | | |
|---|---|---|---|
| 2013/0083736 | A1 | 4/2013 | Yin et al. |
| 2015/0078349 | A1 | 3/2015 | He et al. |
| 2016/0269939 | A1 | 9/2016 | Papasakellariou |
| 2017/0164394 | A1 | 6/2017 | Ahn et al. |
| 2017/0311319 | A1 | 10/2017 | Lee et al. |
| 2017/0359836 | A1 | 12/2017 | Kato et al. |
| 2018/0131425 | A1 | 5/2018 | Li et al. |
| 2018/0279327 | A1 | 9/2018 | Ying et al. |
| 2018/0351705 | A1* | 12/2018 | Uchino ............. H04W 52/0216 |
| 2018/0367289 | A1 | 12/2018 | Kim et al. |
| 2021/0007094 | A1* | 1/2021 | Lee .................... H04W 72/042 |

FOREIGN PATENT DOCUMENTS

| | | |
|---|---|---|
| KR | 1020150034584 | 4/2014 |
| KR | 1020150037461 | 4/2015 |
| KR | 1020170044140 | 4/2017 |
| WO | WO2017082244 | 5/2017 |

OTHER PUBLICATIONS

Ericsson. "Remaining details on URLLC techniques for POSCH," R1-1807302, 3GPP TSG-RAM Meeting #92bis, Busan, South Korea, May 21-25, 2018, 6 pages.

Motorola Mobility, Lenovo, "PDSCH aspects of L TE-URLLC," R1-1807273, 3GPP TSG RAN WG1 #93, Busan, Korea, May 21-25, 2018, 1 page.

Samsung, "Discussion on POSCH repetition," R1-1806697, 3GPP TSG RAN WG1 Meeting #93. Busan, Korea. May 21-25, 2018, 3 pages.

Extended European Search Report in European Appln. No. 19816188. 7, dated Jul. 29, 2020, 8 pages.

U.S. Office Action in U.S. Appl. No. 17/029,509, dated Nov. 10, 2020, 9 pages.

JP Office Action in Japanese Appln. No. 2019-562542, dated Jan. 19, 2021, 6 pages (with English translation).

U.S. Notice of Allowance in U.S. Appl. No. 17/029,509, dated Feb. 18, 2021, 9 pages.

* cited by examiner

METHOD FOR TRANSMITTING AND RECEIVING PHYSICAL DOWNLINK SHARED CHANNEL IN WIRELESS COMMUNICATION SYSTEM AND DEVICE SUPPORTING THE SAME

CROSS-REFERENCE TO RELATED APPLICATIONS

This application claims priority to U.S. application Ser. No. 16/506,368, filed Jul. 9, 2019, which claims the benefit of an earlier filing date and right of priority to U.S. Provisional Application No. 62/695,775, filed on Jul. 9, 2018, U.S. Provisional Application No. 62/716,327, filed on Aug. 8, 2018, and U.S. Provisional Application No. 62/737,958, filed on Sep. 28, 2018, the contents of which are all hereby incorporated by reference herein in their entirety.

TECHNICAL FIELD

The present disclosure generally relates to a wireless communication system, and more particularly to transmitting and receiving a physical downlink shared channel (PDSCH).

BACKGROUND

Mobile communication systems have been developed to provide voice services, while ensuring activity and mobility of users. However, coverage of mobile communication systems has been extended to include data services, as well as voice services, resulting in an explosive increase in traffic and shortage of resources. To meet the demands of users expecting relatively high speed services, an advanced mobile communication system is required.

Requirements of a next-generation mobile communication system include accommodation of increased amounts of data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

SUMMARY

One general aspect of the present disclosure includes a method of receiving, by a user equipment, a physical downlink shared channel (PDSCH) in a wireless communication system, the method including: receiving, from a base station (BS), a higher layer signal including first information for an uplink (UL)-downlink (DL) configuration. The method also includes repeatedly receiving, from the BS, a first transport block (TB) via the PDSCH based on the first information for the UL-DL configuration. The method also includes receiving, from the BS, a first control channel including second information for the UL-DL configuration. The method further includes discarding a second control channel based on: (i) the second control channel scheduling a PDSCH repetition of a second TB in a transmission time unit, (ii) the first information for the UL-DL configuration indicating the transmission time unit as an uplink, and (iii) the second information for the UL-DL configuration indicating the transmission time unit as a downlink. Other embodiments of this aspect include corresponding computer systems, apparatus, and computer programs recorded on one or more computer storage devices, each configured to perform the actions of the methods.

Implementations may include one or more of the following features. The method where the transmission time unit is a subframe or a special subframe. The method where the higher layer signal further includes information for configuration of an enhanced interference mitigation and traffic adaptation (eIMTA) operation. The method where the first control channel is a physical downlink control channel (PDCCH) with a cyclic redundancy check (CRC) scrambled by an eIMTA-radio network temporary identifier (RNTI). Implementations of the described techniques may include hardware, a method or process, or computer software on a computer-accessible medium.

Another general aspect includes a user equipment (UE) configured to receive a physical downlink shared channel (PDSCH) in a wireless communication system, the UE including: a transceiver, at least one processor; and at least one computer memory operably connectable to the at least one processor and storing instructions that, when executed by the at least one processor, perform operations including: receiving, from a base station (BS), a higher layer signal including first information for an uplink (UL)-downlink (DL) configuration. The operations also include repeatedly receiving, from the BS, a first transport block (TB) via the PDSCH based on the first information for the UL-DL configuration. The operations also include receiving, from the BS, a first control channel including second information for the UL-DL configuration. The operations further include discarding a second control channel based on: (i) the second control channel scheduling a PDSCH repetition of a second TB in a transmission time unit, (ii) the first information for the UL-DL configuration indicating the transmission time unit as an uplink, and (ii) the second information for the UL-DL configuration indicating the transmission time unit as a downlink. Other embodiments of this aspect include corresponding computer systems, apparatus, and computer programs recorded on one or more computer storage devices, each configured to perform the actions of the methods.

Implementations may include one or more of the following features. The UE where the transmission time unit is a subframe or a special subframe. The UE where the higher layer signal further includes information for configuration of an enhanced interference mitigation and traffic adaptation (eIMTA) operation. The UE where the first control channel is a physical downlink control channel (PDCCH) with a cyclic redundancy check (CRC) scrambled by an eIMTA-radio network temporary identifier (RNTI). Implementations of the described techniques may include hardware, a method or process, or computer software on a computer-accessible medium.

Another general aspect includes a base station configured to transmit a physical downlink shared channel (PDSCH) in a wireless communication system, the base station including: a transceiver, at least one processor; and at least one computer memory operably connectable to the at least one processor and storing instructions that, when executed by the at least one processor, perform operations including: transmitting, to a user equipment (UE), a higher layer signal including first information for an uplink (UL)-downlink (DL) configuration. The operations also include repeatedly transmitting, to the UE, a first transport block (TB) via the PDSCH. The operations also include transmitting, to the UE, a first control channel including second information for the UL-DL configuration. Furthermore, a second control channel is discarded based on: (i) the second control channel scheduling a PDSCH repetition of a second TB in a transmission time unit, (ii) the first information for the UL-DL configuration indicating the transmission time unit as an uplink, and (iii) the second information for the UL-DL configuration indicating the transmission time unit as a downlink. Other embodiments of this aspect include corresponding computer systems, apparatus, and computer programs recorded on one or more computer storage devices, each configured to perform the actions of the methods.

Implementations may include one or more of the following features. The base station where the transmission time unit is a subframe or a special subframe. The base station where the higher layer signal further includes information for configuration of an enhanced interference mitigation and traffic adaptation (eIMTA) operation. The base station where the first control channel is a physical downlink control channel (PDCCH) with a cyclic redundancy check (CRC) scrambled by an eIMTA-radio network temporary identifier (RNTI).

Implementations of the described techniques may include hardware, a method or process, or computer software on a computer-accessible medium. A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions.

DETAILED DESCRIPTION

Figure 1:
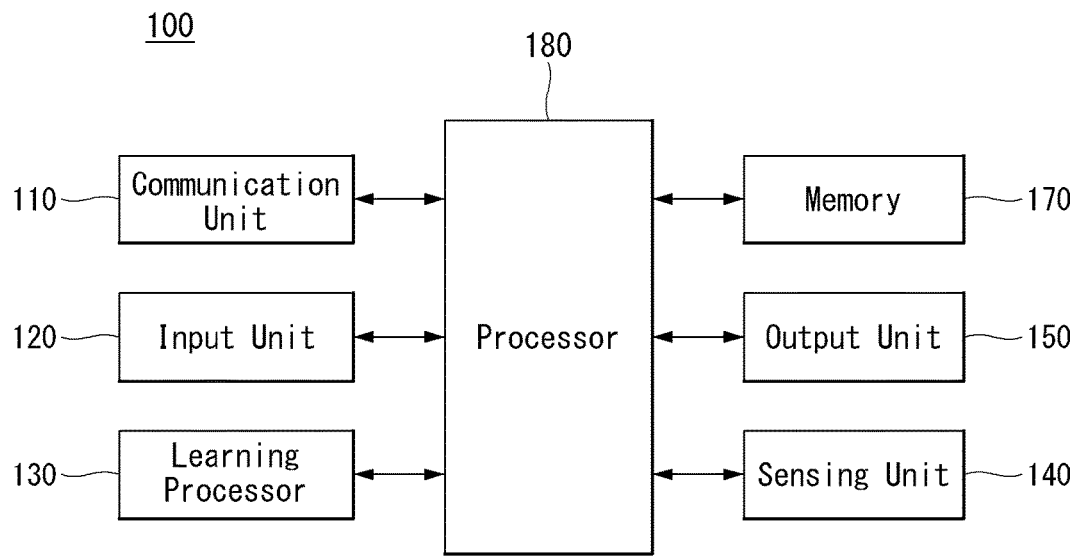
FIG. 1 illustrates an example of an AI device to which implementations of the present disclosure are applicable.

An object of implementations of the present disclosure is to provide techniques for improving reliability of PDSCH transmission and reception in a PDSCH repetition operation.

Another object of implementations of the present disclosure is to provide techniques for implementing low latency in a PDSCH repetition operation.

Another object of implementations of the present disclosure is to provide techniques for preventing a parallel repetition transmission of other PDSCHs during a repetition of a specific PDSCH when following a transmission direction indicated by a higher layer signal, and giving a priority to a currently ongoing PDSCH repetition operation.

In some scenarios, implementations of the present disclosure may have an effect of improving reliability of PDSCH transmission and reception in a PDSCH repetition operation.

In some scenarios, implementations of the present disclosure may have an effect of implementing a low latency in a PDSCH repetition operation.

In some scenarios, implementations of the present disclosure may have an effect of preventing a parallel repetition transmission of other PDSCHs during a repetition of a specific PDSCH when following a transmission direction indicated by a higher layer signal, and giving a priority to a currently ongoing PDSCH repetition operation.

Effects obtainable from implementations of the present disclosure are not limited by the effects mentioned above, and other effects which are not mentioned above can be clearly understood from the following description by those skilled in the art to which the present disclosure pertains.

The present disclosure describes examples of operations of a UE during repetition transmission in scenarios where a transmission time unit is encountered having a different link direction (downlink or uplink) than a link direction of the repetition transmission (first implementation). The present disclosure also describes examples of operations of a UE during repetition transmission in scenarios where a link direction indicated by a higher layer signal or system information block 1 (SIB 1) is different from a link direction indicated by a physical layer signal (e.g., PDCCH) in the repetition transmission operation (second implementation). The present disclosure also describes examples of operations of a UE during repetition transmission in scenarios where the UE follows a link direction that is indicated by a higher layer signal in the repetition transmission operation (third implementation). The present disclosure further describes examples of operations of a UE during repetition transmission in scenarios where the UE fails in detection and/or decoding of a PDCCH when the UE follows a link direction that is indicated by a physical layer signal in the repetition transmission operation (fourth implementation).

Hereafter, various implementations of the present disclosure will be described in detail with reference to the accompanying drawings. A detailed description to be disclosed herein below together with the accompanying drawing is to describe implementations of the present disclosure and not to describe a unique implementation for carrying out the present disclosure. The detailed description below includes details in order to provide a complete understanding. However, those skilled in the art know that the present disclosure can be carried out without the details.

In some cases, in order to prevent a concept of the present disclosure from being ambiguous, known structures and devices may be omitted or may be illustrated in a block diagram format based on core function of each structure and device.

In this disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The implementations of the present disclosure may be based on standard documents disclosed in at least one of IEEE 802, 3GPP, and 3GPP2 which are the wireless access systems. That is, steps or parts which are not described to definitely show the technical spirit of the present disclosure among the implementations of the present disclosure may be based on the documents. Further, all terms disclosed in the document may be described by the standard document.

3GPP LTE/LTE-A/NR is primarily described for clear description, but technical features of the present disclosure are not limited thereto.

Hereinafter, examples of 5G use scenarios to which implementations of the present disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 to which implementations of the present disclosure is applicable.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
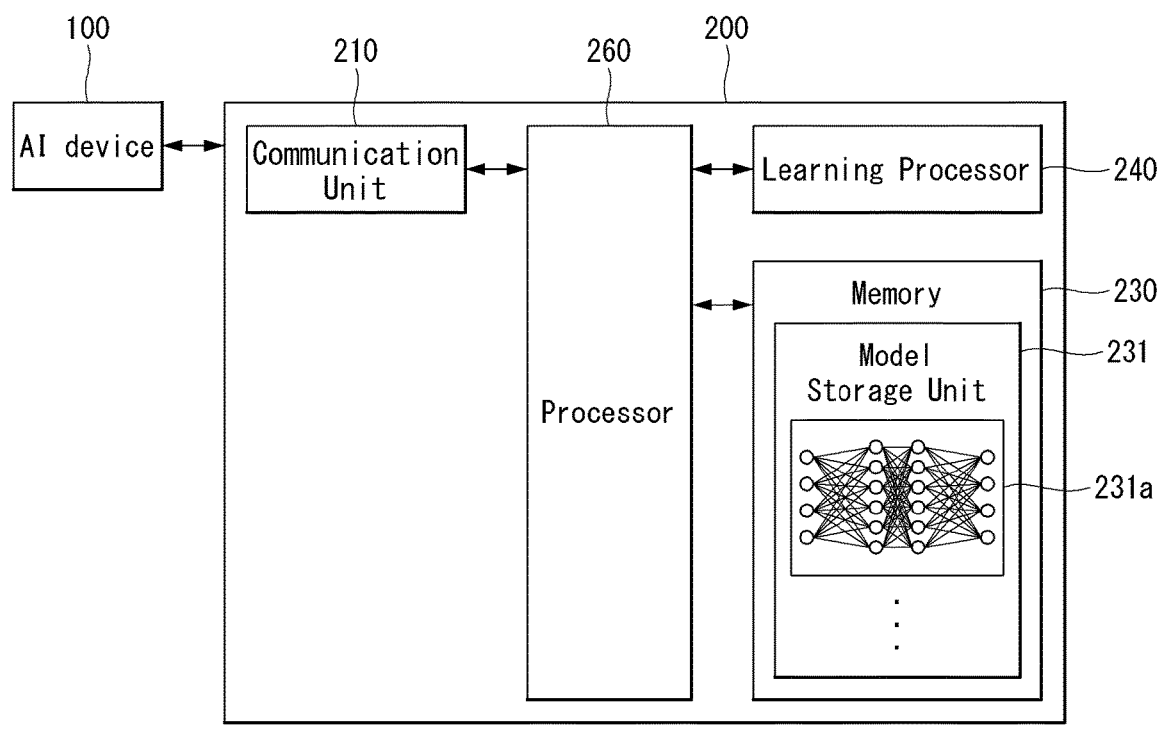
FIG. 2 illustrates an example of an AI server to which implementations of the present disclosure are applicable.

FIG. 2 illustrates the AI server 200 to which implementations of the present disclosure is applicable.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
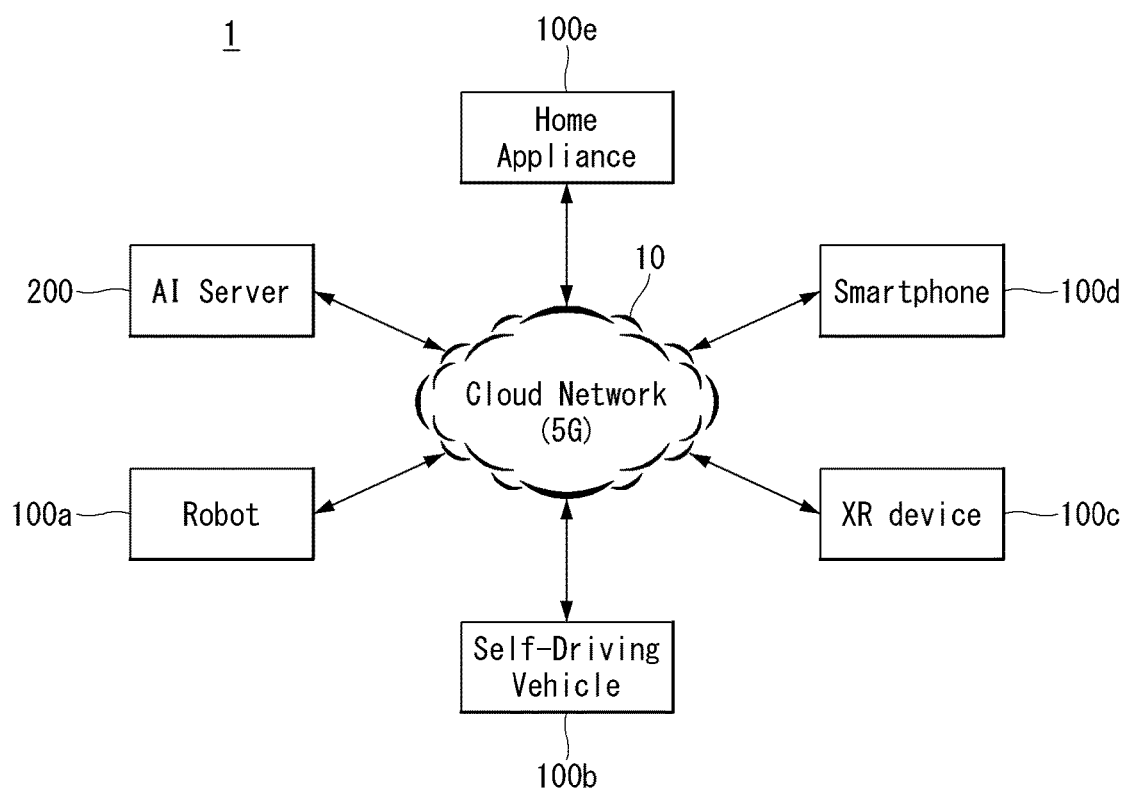
FIG. 3 illustrates an example of an AI system to which implementations of the present disclosure are applicable.

FIG. 3 illustrates an AI system 1 to which implementations of the present disclosure is applicable.

Referring to FIG. 3, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various implementations of the AI devices 100*a* to 100*e* to which the above-described technology is applied are described. In this case, the AI devices 100*a* to 100*e* shown in FIG. 3 may be considered to be detailed implementations of the AI device 100 shown in FIG. 1.

AI and Robot

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

AI and Self-Driving

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

AI and XR

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

AI and Robot and Self-Driving

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously move along a given flow without control of a user or autonomously determine a flow and move.

The robot 100*a* and the self-driving vehicle 100*b* having the self-driving function may use a common sensing technique in order to determine one or more of a moving path or a running plan. For example, the robot 100*a* and the self-driving vehicle 100*b* having the self-driving function may determine one or more of a moving path or a running plan using information sensed through LIDAR, a radar, a camera, etc.

The robot 100*a* interacting with the self-driving vehicle 100*b* is present separately from the self-driving vehicle 100*b*, and may perform an operation associated with a self-driving function inside or outside the self-driving vehicle 100*b* or associated with a user got in the self-driving vehicle 100*b*.

In this case, the robot 100*a* interacting with the self-driving vehicle 100*b* may control or assist the self-driving function of the self-driving vehicle 100*b* by obtaining sensor information in place of the self-driving vehicle 100*b* and providing the sensor information to the self-driving vehicle 100*b*, or by obtaining sensor information, generating surrounding environment information or object information, and providing the surrounding environment information or object information to the self-driving vehicle 100*b*.

Alternatively, the robot 100*a* interacting with the self-driving vehicle 100*b* may control the function of the self-driving vehicle 100*b* by monitoring a user got in the self-driving vehicle 100*b* or through an interaction with a user. For example, if a driver is determined to be a drowsiness state, the robot 100*a* may activate the self-driving function of the self-driving vehicle 100*b* or assist control of the driving unit of the self-driving vehicle 100*b*. In this case, the function of the self-driving vehicle 100*b* controlled by the robot 100*a* may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI and Robot and XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI and Self-Driving and XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Overview of System

Figure 4A:
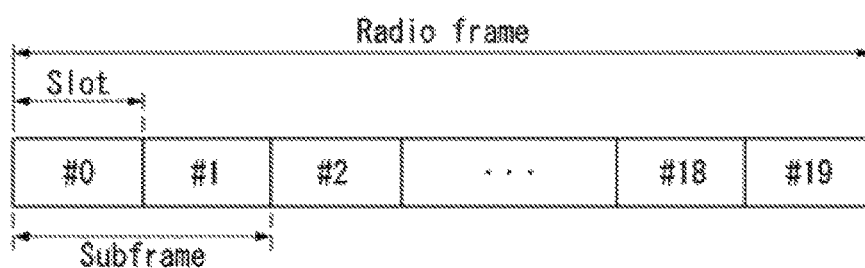
FIGS. 4A and 4B illustrate an example of a structure of a radio frame in a wireless communication system to which implementations of the present disclosure are applicable.
Figure 4B:
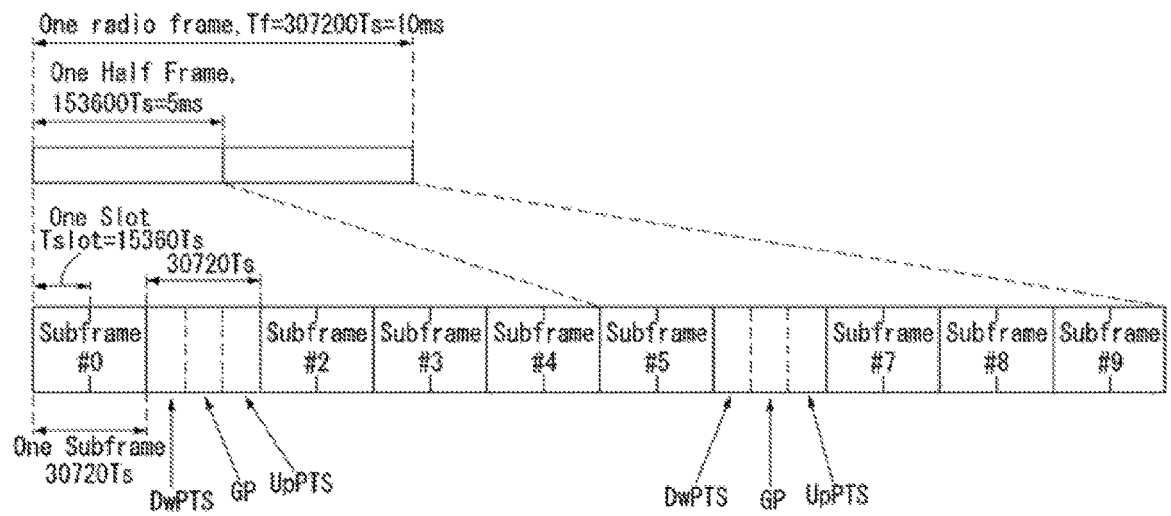

FIGS. 4A and 4B illustrate a structure of a radio frame in a wireless communication system to which the present disclosure is applicable.

3GPP LTE/LTE-A supports radio frame structure type 1 applicable to frequency division duplex (FDD) and radio frame structure Type 2 applicable to time division duplex (TDD).

In FIGS. 4A and 4B, the size of a radio frame in a time domain is represented as a multiple of a time unit of $T\_s=1/(15000*2048)$. Downlink and uplink transmissions are organized into radio frames with a duration of $T\_f=307200*T\_s=10$ ms.

FIG. 4A illustrates radio frame structure type 1. The radio frame structure type 1 is applicable to both full duplex FDD and half duplex FDD.

A radio frame consists of 10 subframes. One radio frame consists of 20 slots of $T\_slot=15360*T\_s=0.5$ ms length, and indexes of 0 to 19 are given to the respective slots. One subframe consists of two consecutive slots in the time domain, and subframe i consists of slot 2i and slot 2i+1. A time required to transmit one subframe is referred to as a transmission time interval (TTI). For example, the length of one subframe may be 1 ms, and the length of one slot may be 0.5 ms.

The uplink transmission and the downlink transmission in the FDD are distinguished in the frequency domain. Whereas there is no restriction in the full duplex FDD, a UE cannot transmit and receive simultaneously in the half duplex FDD operation.

One slot includes a plurality of orthogonal frequency division multiplexing (OFDM) symbols in the time domain and includes a plurality of resource blocks (RBs) in a frequency domain. Since 3GPP LTE uses OFDMA in downlink, OFDM symbols are used to represent one symbol period. The OFDM symbol may be called one SC-FDMA symbol or a symbol period. The resource block is a resource allocation unit and includes a plurality of consecutive sub-carriers in one slot.

FIG. 4B illustrates frame structure type 2.

The radio frame type 2 consists of two half-frames of $153600*T\_s=5$ ms length each. Each half-frame consists of five subframes of $30720*T\_s=1$ ms length.

In the frame structure type 2 of a TDD system, uplink-downlink configuration is a rule indicating whether uplink and downlink are allocated (or reserved) to all subframes.

Table 1 represents uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for downlink transmission, 'U' represents a subframe for uplink transmission, and 'S' represents a special subframe consisting of three types of fields including a downlink pilot time slot (DwPTS), a guard period (GP), and an uplink pilot time slot (UpPTS). The DwPTS is used for an initial cell search, synchronization or channel estimation in a UE. The UpPTS is used for channel estimation in a base station and uplink transmission synchronization of the UE. The GP is a period for removing interference generated in uplink due to multi-path delay of a downlink signal between uplink and downlink.

Each subframe i consists of slot 2i and slot 2i+1 of T_slot=15360*T_s=0.5 ms length each.

The uplink-downlink configuration may be classified into 7 types, and a location and/or the number of a downlink subframe, a special subframe and an uplink subframe are different for each configuration.

A point of time at which switching from downlink to uplink or switching from uplink to downlink is performed is referred to as a switching point. A switch-point periodicity refers to a period in which switched patterns of an uplink subframe and a downlink subframe are equally repeated, and both 5 ms and 10 ms switch-point periodicity are supported. In case of 5 ms downlink-to-uplink switch-point periodicity, the special subframe S exists in every half-frame. In case of 5 ms downlink-to-uplink switch-point periodicity, the special subframe S exists in a first half-frame only.

In all the configurations, subframes 0 and 5 and a DwPTS are reserved for downlink transmission only. An UpPTS and a subframe immediately following the subframe are always reserved for uplink transmission.

Such uplink-downlink configurations may be known to both the base station and the UE as system information. The base station may inform the UE of change in an uplink-downlink allocation state of a radio frame by transmitting only indexes of uplink-downlink configuration information to the UE each time the uplink-downlink configuration information is changed. Furthermore, configuration information is a kind of downlink control information and may be transmitted via a physical downlink control channel (PDCCH) like other scheduling information, or is a kind of broadcast information and may be commonly transmitted to all UEs within a cell via a broadcast channel.

Table 2 represents configuration (length of DwPTS/GP/UpPTS) of a special subframe.

The structure of a radio frame according to an example of FIGS. 4A and 4B is merely an example, and the number of subcarriers included in a radio frame, the number of slots included in a subframe, and the number of OFDM symbols included in a slot may be variously changed.

Figure 5:
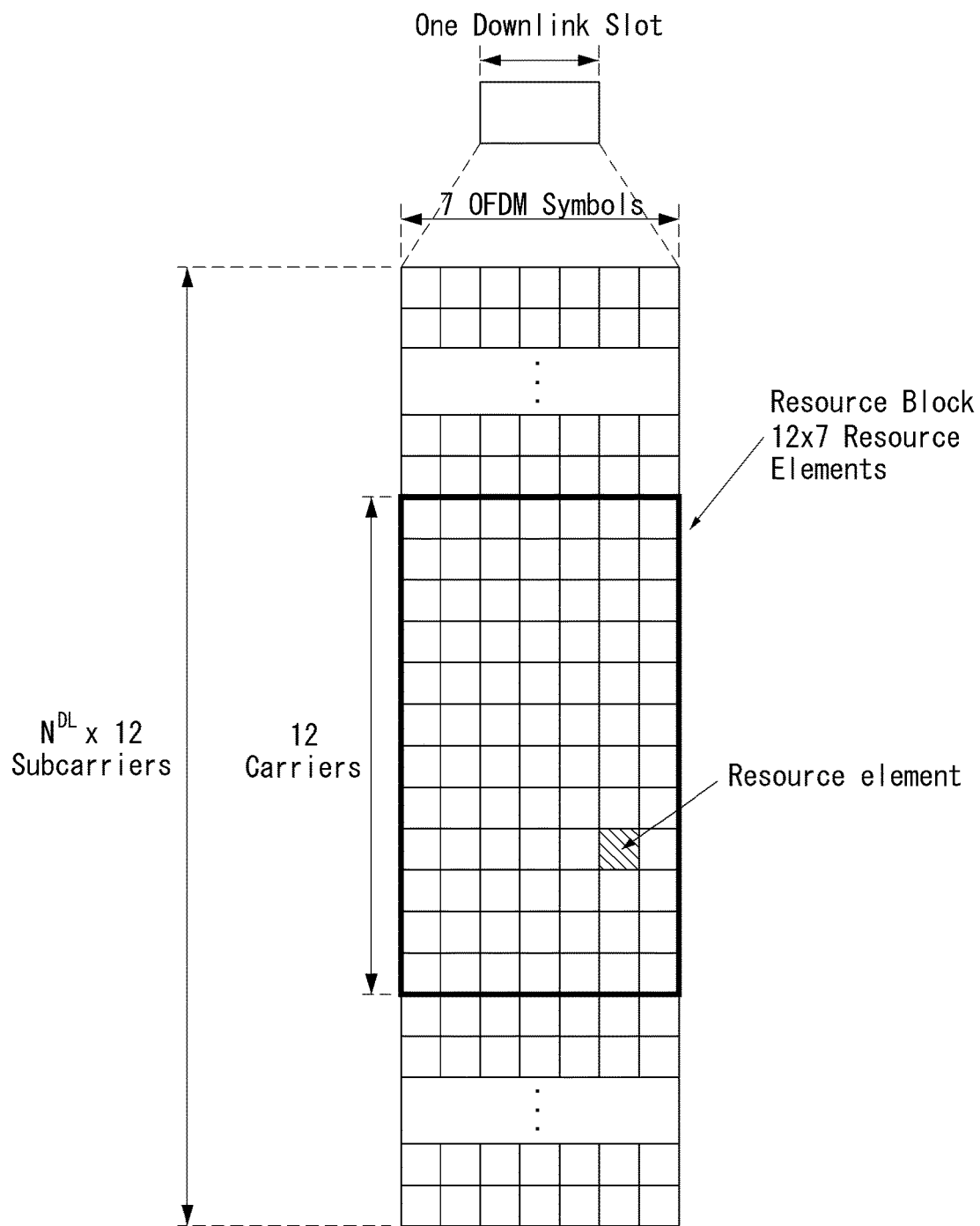
FIG. 5 illustrates an example of a resource grid for one downlink slot in a wireless communication system to which implementations of the present disclosure are applicable.

FIG. 5 illustrates a resource grid for one downlink slot in the wireless communication system to which the present disclosure is applicable.

Referring to FIG. 5, one downlink slot includes the plurality of OFDM symbols in the time domain. Herein, it is exemplarily described that one downlink slot includes 7 OFDM symbols and one resource block includes 12 subcarriers in the frequency domain, but the present disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 6:
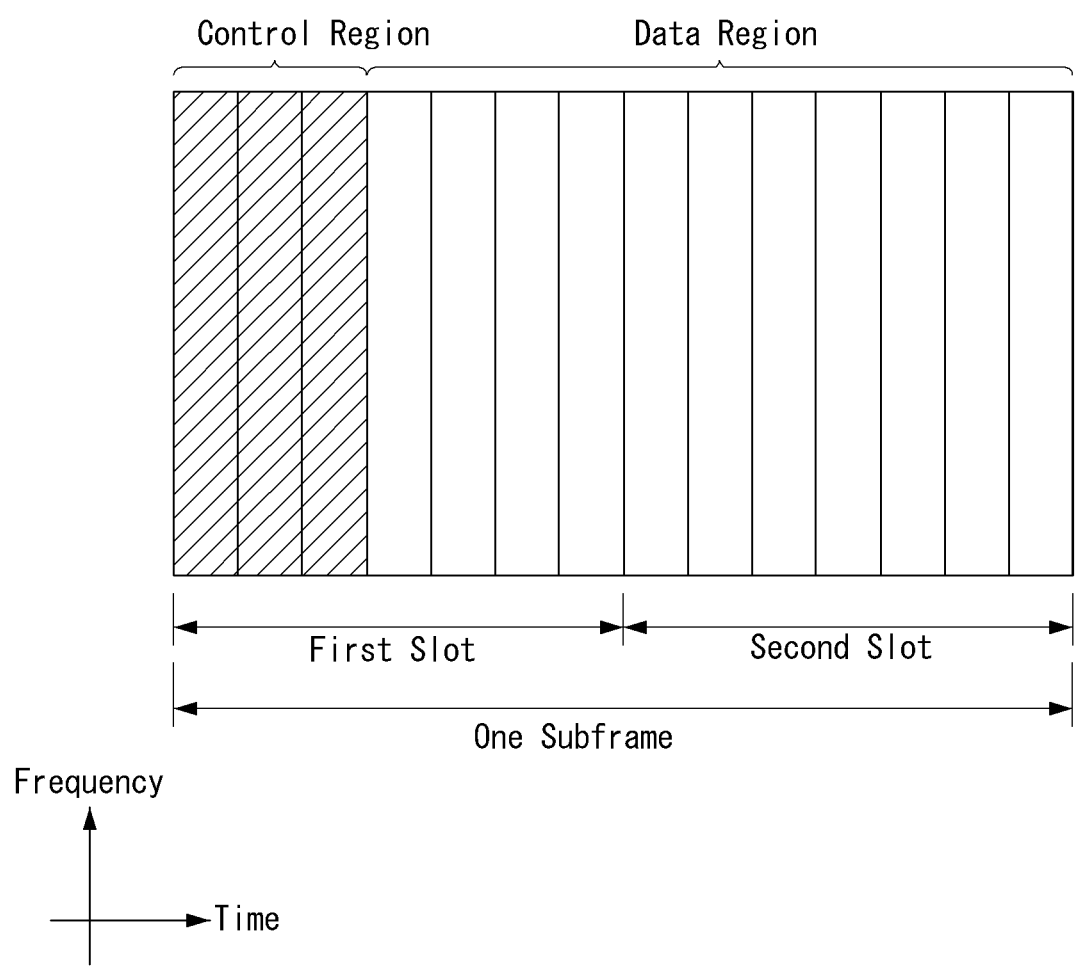
FIG. 6 illustrates an example of a structure of a downlink subframe in a wireless communication system to which implementations of the present disclosure are applicable.

FIG. 6 illustrates a structure of a downlink subframe in the wireless communication system to which the present disclosure is applicable.

Referring to FIG. 6, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARD). Control information transmitted through a PDCCH is referred to as downlink control information (DCI). The downlink control information includes uplink resource allocation information, downlink resource allocation information, or an uplink transmission (Tx) power control command for a predetermined terminal group.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked to the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is configured to be UE specific. In other words, as described above, the PDCCH may be transmitted in up to first three OFDM symbols in a first slot of a subframe, but the EPDCCH may be transmitted in a resource region other than the PDCCH. A time (i.e., symbol) at which the EPDCCH starts in the subframe may be configured to the UE via higher layer signaling (e.g., RRC signaling, etc.).

The EPDCCH may carry a transport format, resource allocation and HARQ information related to DL-SCH, a transport format, resource allocation and HARQ information related to UL-SCH, resource allocation information related to sidelink shared channel (SL-SCH) and physical sidelink control channel (PSCCH), etc. Multiple EPDCCHs may be supported, and the UE may monitor a set of EPCCHs.

The EPDCCH may be transmitted using one or more consecutive enhanced CCEs (ECCEs), and the number of ECCEs per EPDCCH may be determined for each EPDCCH format.

Each ECCE may consist of a plurality of enhanced resource element groups (EREGs). The EREG is used to define mapping of the ECCE to the RE. There are 16 EREGs per PRB pair. All REs except the RE carrying the DMRS in each PRB pair are numbered from 0 to 15 in increasing order of the frequency and then in increasing order of time.

The UE may monitor a plurality of EPDCCHs. For example, one or two EPDCCH sets may be configured in one PRB pair in which the UE monitors EPDCCH transmission.

Different coding rates may be implemented for the EPCCH by combining different numbers of ECCEs. The EPCCH may use localized transmission or distributed transmission, and hence, the mapping of ECCE to the RE in the PRB may vary.

Figure 7:
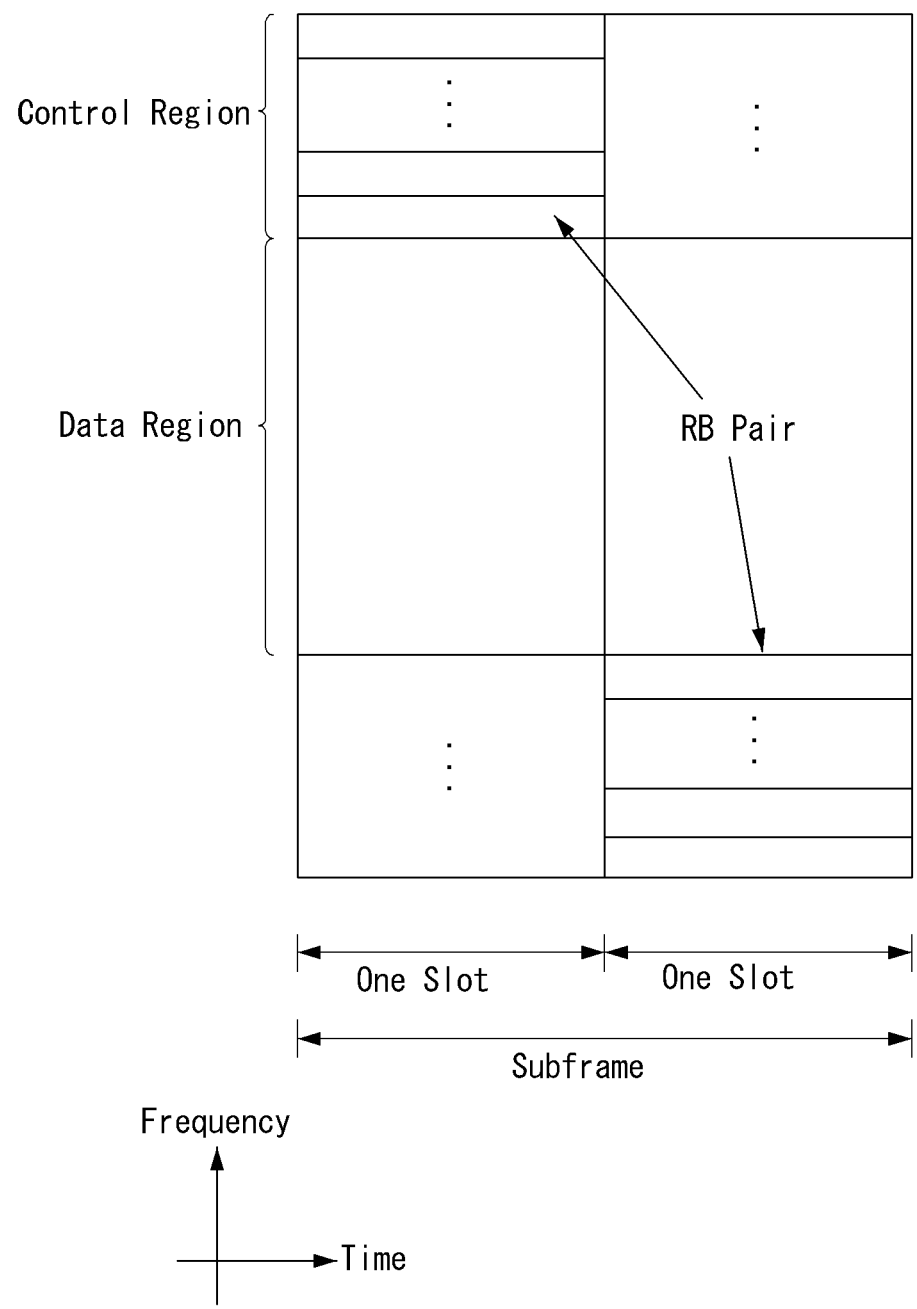
FIG. 7 illustrates an example of a structure of an uplink subframe in a wireless communication system to which implementations of the present disclosure are applicable.

FIG. 7 illustrates a structure of an uplink subframe in the wireless communication system to which the present disclosure is applicable.

Referring to FIG. 7, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

The following disclosure described by the present disclosure can be applied to a 5G NR system (or device) as well as a LTE/LTE-A system (or device).

Communication of the 5G NR system is described below with reference to FIGS. 8 to 13.

The 5G NR system defines enhanced mobile broadband (eMBB), massive machine type communications (mMTC), ultra-reliable and low latency communications (URLLC), and vehicle-to-everything (V2X) based on usage scenario (e.g., service type).

A 5G NR standard is divided into standalone (SA) and non-standalone (NSA) depending on co-existence between a NR system and a LTE system.

The 5G NR system supports various subcarrier spacings and supports CP-OFDM in the downlink and CP-OFDM and DFT-s-OFDM (SC-OFDM) in the uplink.

Implementations of the present disclosure can be supported by standard documents disclosed in at least one of IEEE 802, 3GPP, and 3GPP2 which are the wireless access systems. That is, steps or parts in implementations of the present disclosure which are not described to clearly show the technical spirit of the present disclosure can be supported by the standard documents. Further, all terms disclosed in the present disclosure can be described by the standard document.

As smart phones and Internet of Things (IoT) terminals spread rapidly, an amount of information exchanged through a communication network is increasing. Hence, it is necessary to consider an environment (e.g., enhanced mobile broadband communication) that provides faster services to more users than the existing communication system (or existing radio access technology) in the next generation wireless access technology.

To this end, a design of a communication system considering machine type communication (MTC) that provides services by connecting multiple devices and objects is being discussed. In addition, a design of a communication system (e.g., ultra-reliable and low latency communication (URLLC)) considering a service and/or a terminal sensitive to reliability and/or latency of communication is also being discussed.

Hereinafter, in the present disclosure, for convenience of explanation, the next generation radio access technology is referred to as NR (new RAT, radio access technology), and a wireless communication system to which the NR is applied is referred to as an NR system.

Description of Terms Related to NR System eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Figure 8:
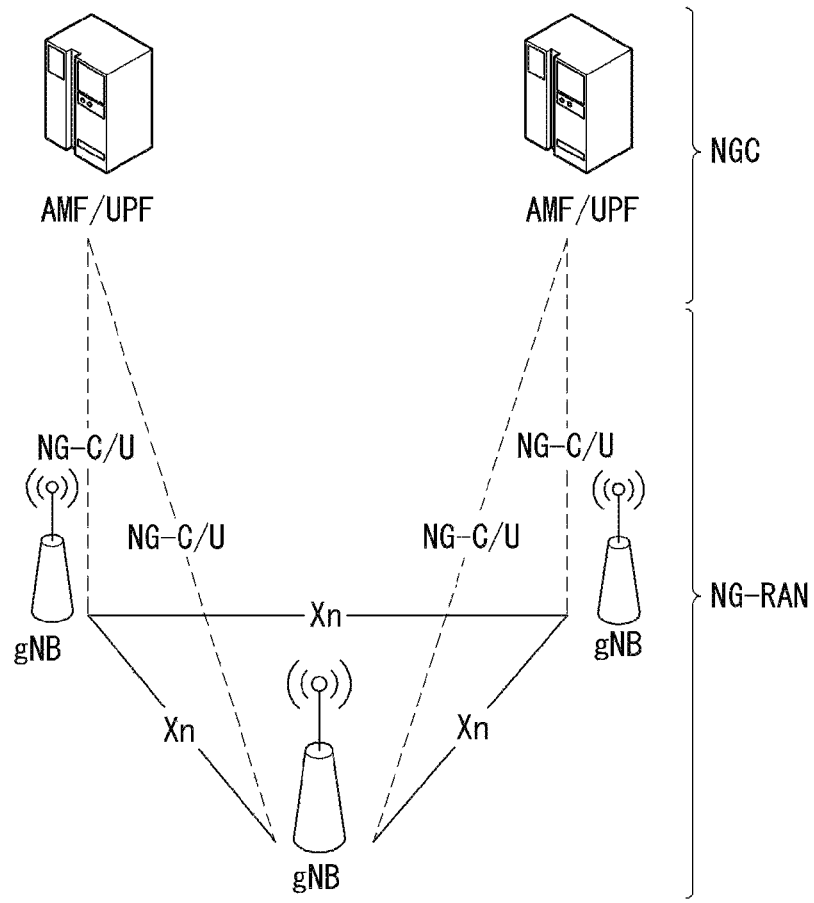
FIG. 8 illustrates an example of an overall structure of a NR system to which implementations of the present disclosure are applicable.

FIG. 8 illustrates an example of an overall structure of a new radio (NR) system to which implementations of the present disclosure is applicable.

Referring to FIG. 8, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 3.

TABLE 3

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$ where $\Delta f_{max} = 480 \cdot 10^3$ and $N_f = 4096$. Downlink and uplink transmissions are organized into radio frames with a duration of $T_f = (\Delta f_{max} N_f/100) \cdot T_s = 10$ ms. The radio frame consists of ten subframes each having a section of $T_{sf} = (\Delta f_{max} N_f/1000) \cdot T_s = 1$ ms. In this case, there may be a set of frames in the uplink and a set of frames in the downlink.

Figure 9:
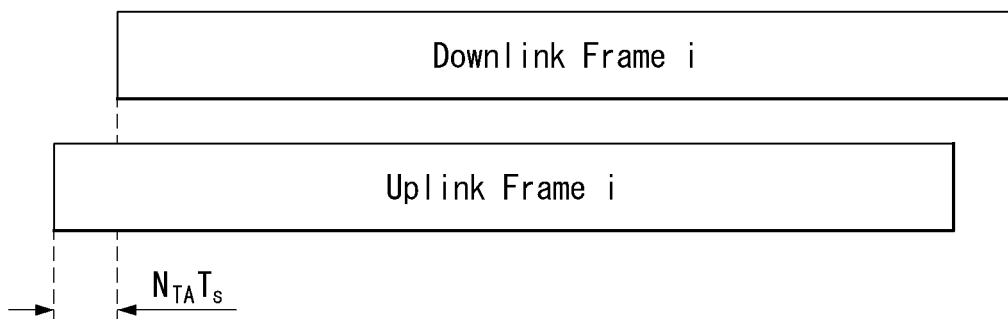
FIG. 9 illustrates an example of a relation between an uplink frame and a downlink frame in a wireless communication system to which implementations of the present disclosure is applicable.

FIG. 9 illustrates a relation between a UL frame and a DL frame in a wireless communication system to which implementations of the present disclosure are applicable.

As illustrated in FIG. 9, a UL frame number i for transmission from a user equipment (UE) shall start $T_{TA} = N_{TA} T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe, and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 4 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 5 represents the number of OFDM symbols in an extended CP, the number of slot per radio frame and the number of slot per subframe.

TABLE 4

| μ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 5

| μ | $N_{symb}^{slot}$ | $N_{slot}^{frame, \mu}$ | $N_{slot}^{subframe, \mu}$ |
| --- | --- | --- | --- |
| 2 | 12 | 40 | 4 |

Figure 10:
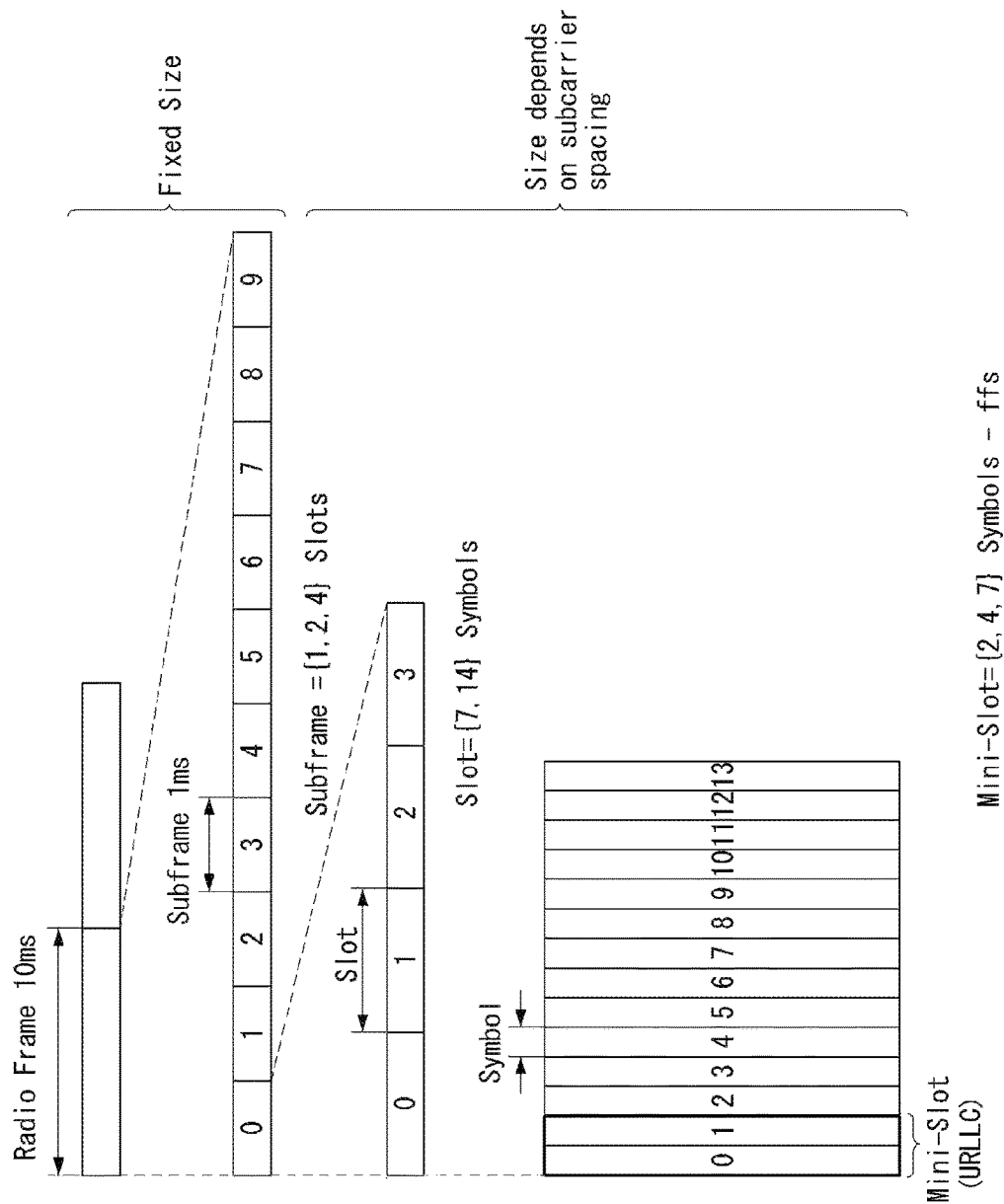
FIG. 10 illustrates an example of a frame structure in a NR system.

FIG. 10 illustrates an example of a frame structure in the NR system. FIG. 10 is merely for convenience of explanation and does not limit the scope of the present disclosure. Table 5 represents an example of μ=2, that is, the case that subcarrier spacing is 60 kHz. Referring to Table 4, one subframe (or frame) may include 4 slots. One subframe={1, 2, 4} slots shown in FIG. 10 are an example, and the number of slot(s) included in 1 subframe can be defined as represented in Table 4.

In addition, a mini-slot may include 2, 4 or 7 symbols, or include the more or the less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 11:
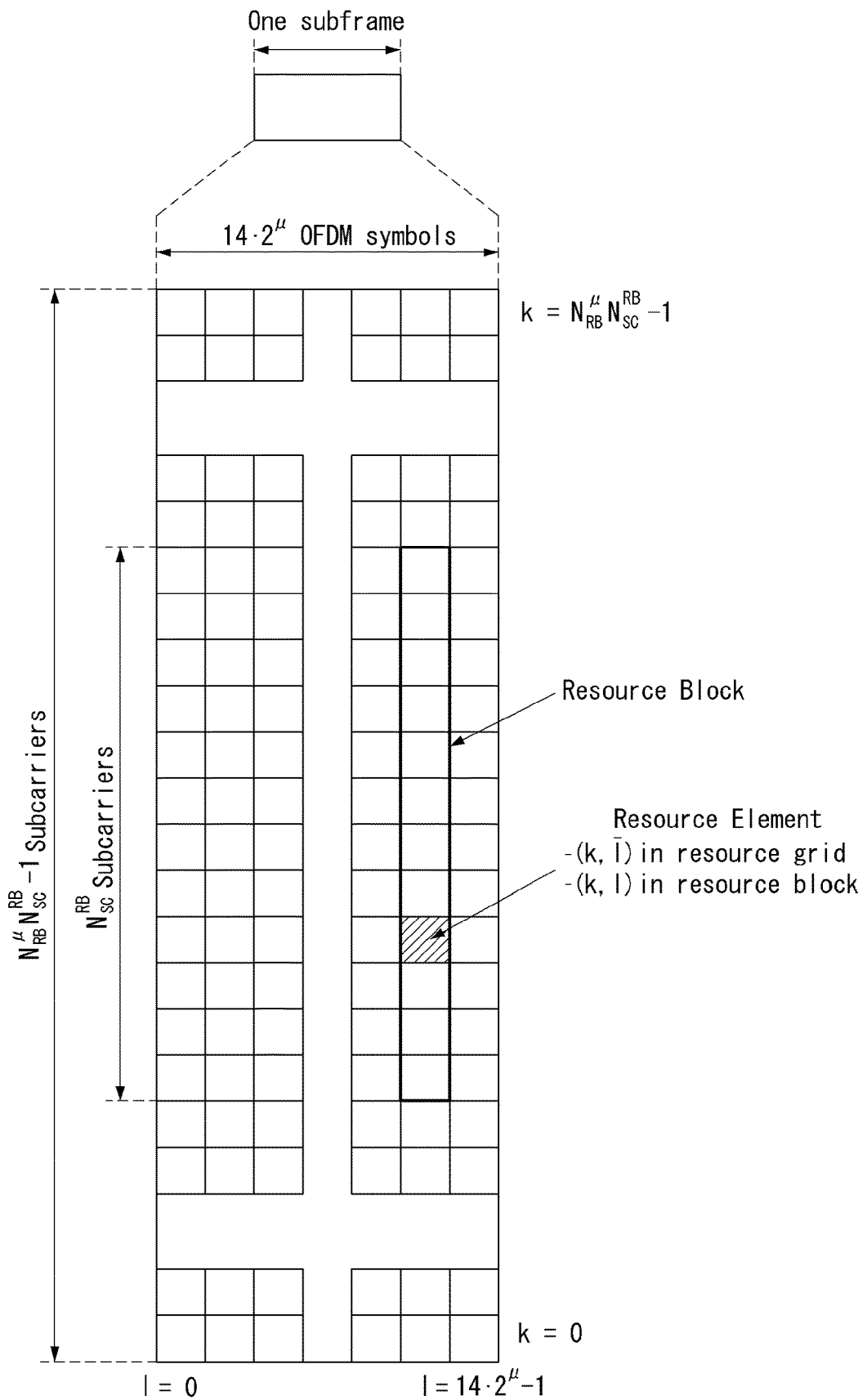
FIG. 11 illustrates an example of a resource grid supported in a wireless communication system to which implementations of the present disclosure are applicable.

FIG. 11 illustrates an example of a resource grid supported in a wireless communication system to which implementations of the present disclosure are applicable.

Referring to FIG. 11, a resource grid consists of $N_{RB}{}^{\mu}N_{sc}{}^{RB}$ subcarriers in a frequency domain, each subframe consisting of $14 \cdot 2^{\mu}$ OFDM symbols, but the present disclosure is not limited thereto.

In the NR system, a transmitted signal is described by one or more resource grids, consisting of $N_{RB}{}^{\mu}N_{sc}{}^{RB}$ subcarriers, and $2^{\mu}N_{symb}{}^{(\mu)}$ OFDM symbols, where $N_{RB}{}^{\mu} \leq N_{RB}{}^{max,\mu}$. The above $N_{RB}{}^{max,\mu}$ indicates the maximum transmission bandwidth, and it may change not just between numerologies, but between UL and DL.

Figure 12:
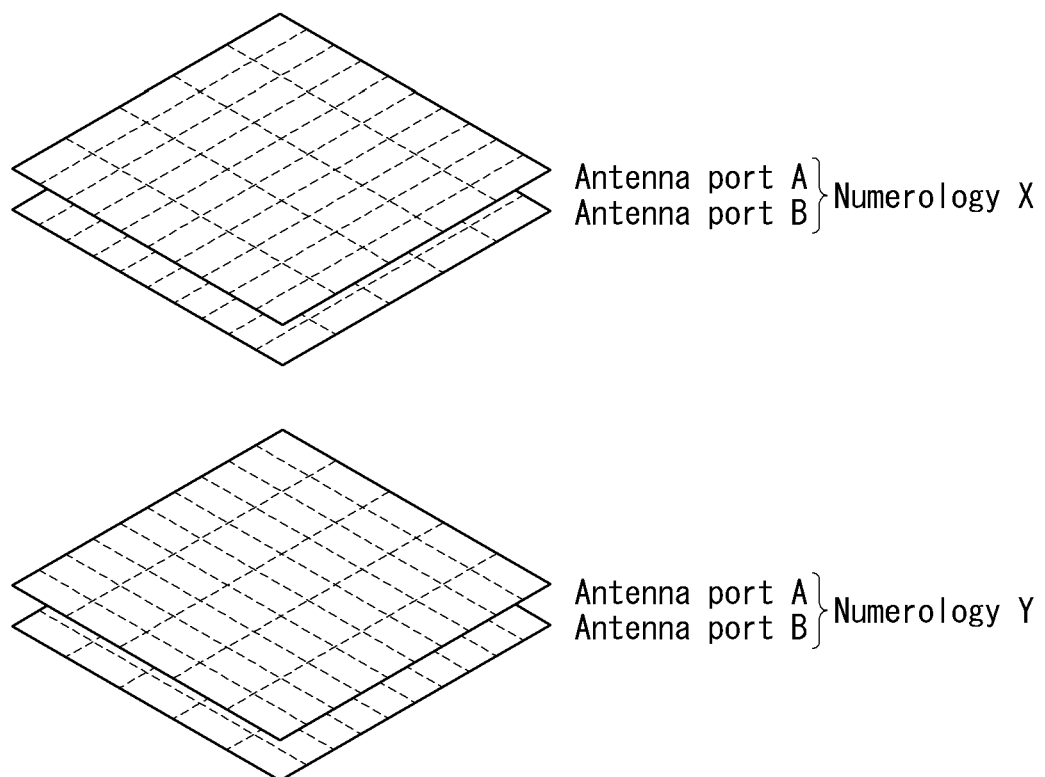
FIG. 12 illustrates examples of a resource grid per antenna port and numerology to which implementations of the present disclosure are applicable.

In this case, as illustrated in FIG. 12, one resource grid may be configured for the numerology μ and an antenna port p.

FIG. 12 illustrates examples of resource grids for each antenna port and numerology to which implementations of this disclosure may be applied.

Each element of the resource grid for the numerology μ and the antenna port p is indicated as a resource element, and may be uniquely identified by an index pair (k, l̄). Herein, k=0, . . . , $N_{RB}{}^{\mu}N_{sc}{}^{RB}-1$ is an index in the frequency domain, and l̄=0, . . . , $2^{\mu}N_{symb}{}^{(\mu)}-1$ indicates a location of a symbol in a subframe. To indicate a resource element in a slot, the index pair (k,l̄) is used. Herein, l=0, . . . , $N_{symb}{}^{\mu}-1$.

The resource element (k, l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}{}^{RB}=12$ Sc consecutive subcarriers on a frequency domain.

Point A plays the role of a common reference point of the resource block grid and may be obtained as follows.

offsetToPointA with respect to Pcell downlink represents a frequency offset between the lowest subcarrier of the lowest resource block overlapped with SS/PBCH block used by a UE for an initial cell selection with point A, and represents by resource block units assuming 15 kHz subcarrier spacing for FR1 and 60 kHz subcarrier spacing for FR2;

absoluteFrequencyPointA represents frequency-position of point A represented as in absolute radio-frequency channel number (ARFCN).

Common resource blocks are numbered from 0 to upper sides in a frequency domain for subcarrier spacing configuration μ.

The center of subcarrier 0 of common resource block 0 for the subcarrier spacing configuration μ coincides with 'point A'. Resource element (k, l) for the common resource block number and the subcarrier spacing configuration μ in a frequency domain may be given as represented in Equation 1 below.

$$n_{CRB}^{\mu} = \left\lfloor \frac{k}{N_{sc}^{RB}} \right\rfloor \quad \text{[Equation 1]}$$

Herein, k may be defined relatively to point A such that k=0 corresponds to the subcarrier with point A in the center. The number from 0 to $N_{BWP}{}^{size}-1$ are numbered to the physical resource blocks in a bandwidth part (BWP) and i is the number of the BWP. In BWP i, the relation between the physical resource block $n_{PRB}$ and the common resource block $n_{CRB}$ may be given as represented in Equation 2 below.

$$n_{CRB} = n_{PRB} + N_{BWP,i}^{start} \quad \text{[Equation 2]}$$

Herein, $N_{BWP,i}^{start}$ may be the common resource block in which the BWP starts relatively to common resource block 0.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

Figure 13:
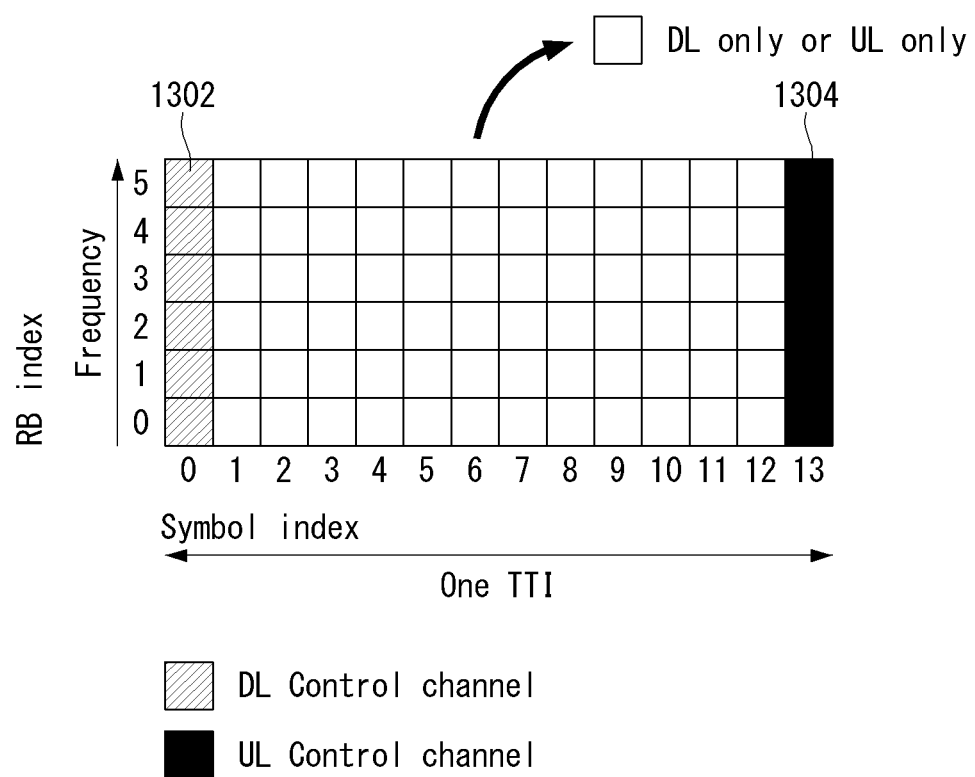
FIG. 13 illustrates an example of a self-contained structure to which implementations of the present disclosure are applicable.

FIG. 13 illustrates one example of a self-contained structure to which implementations of the present disclosure are applicable. FIG. 13 is merely for convenience of explanation and does not limit the scope of the present disclosure.

Referring to FIG. 13, it is assumed that one transmission unit (e.g., slot or subframe) is constituted by 14 orthogonal frequency division multiplexing (OFDM) symbols as in legacy LTE.

In FIG. 13, a region 1302 refers to a downlink control region and a region 1304 refers to an uplink control region. Further, a region (that is, a region without a separate indication) other than the regions 1302 and 1304 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 13 is used, in one self-contained slot, downlink transmission and uplink transmission may sequentially proceed, and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 13, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Physical Uplink Control Channel (PUCCH)

Uplink control information (UCI) transmitted on a PUCCH may include scheduling request (SR), HARQ ACK/NACK information, and downlink channel measurement information.

The HARQ ACK/NACK information may be generated depending on whether decoding of downlink data packet on a PDSCH is successful or not. In the existing wireless communication system, one bit as ACK/NACK information is transmitted in a single codeword downlink transmission, and two bits as ACK/NACK information are transmitted in two codeword downlink transmissions.

The channel measurement information refers to feedback information related to a multiple input multiple output (MIMO) scheme and may include a channel quality indicator (CQI), a precoding matrix index (PMI), and a rank indicator (RI). The channel measurement information may collectively be referred to as a CQI.

20 bits per subframe may be used for the CQI transmission.

The PUCCH may be modulated by using a binary phase shift keying (BPSK) scheme and a quadrature phase shift keying (QPSK) scheme. Control information for a plurality of UEs may be transmitted on the PDCCH. In case of performing code division multiplexing (CDM) to distinguish signals of the respective UEs, a length-12 constant amplitude zero autocorrelation (CAZAC) sequence is mostly used. Since the CAZAC sequence has characteristics of maintaining a predetermined amplitude in a time domain and a frequency domain, the CAZAC has properties suitable to increase coverage by reducing a peak-to-average power ratio (PAPR) or a cubic metric (CM) of the UE. In addition, the ACK/NACK information for downlink data transmission transmitted on the PDCCH is covered by using an orthogonal sequence or an orthogonal cover (OC).

Further, control information transmitted on the PUCCH may be distinguished using a cyclically shifted sequence each having a different cyclic shift (CS) value. The cyclically shifted sequence may be produced by cyclically shifting a base sequence by as much as a specific cyclic shift (CS) amount. The specific CS amount is indicated by a CS index. The number of available cyclic shifts may vary depending on the delay spread of a channel. Various kinds of sequences may be used as the base sequence, and the CAZAC sequence described above is an example.

An amount of control information that the UE can transmit in one subframe may be determined depending on the number of SC-FDMA symbols (i.e., SC-FDMA symbols except SC-FDMA symbols used for reference signal (RS) transmission for coherent detection of the PUCCH), that can be used in the transmission of the control information.

In the 3GPP LTE system, the PUCCH is defined as a total of seven different formats depending on transmitted control information, a modulation scheme, an amount of control information, etc., and attributes of uplink control information (UCI) transmitted according to each PUCCH format may be summarized as in the following Table 6.

TABLE 6

| PUCCH Format | Uplink Control Information (UCI) |
| --- | --- |
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for single transmission of SR. In case of single transmission of SR, an unmodulated waveform is applied, which will be described in detail below. PUCCH format 1a or 1b is used for transmission of HARQ ACK/NACK. In case of single transmission of HARQ ACK/NACK in a random subframe, PUCCH format 1a or 1b may be used. Alternatively, the HARQ ACK/NACK and the SR may be transmitted in the same subframe using the PUCCH format 1a or 1b.

PUCCH format 2 is used for transmission of a CQI, and PUCCH format 2a or 2b is used for transmission of the CQI and the HARQ ACK/NACK.

In case of an extended CP, the PUCCH format 2 may also be used for transmission of the CQI and the HARQ ACK/NACK.

Figure 14:
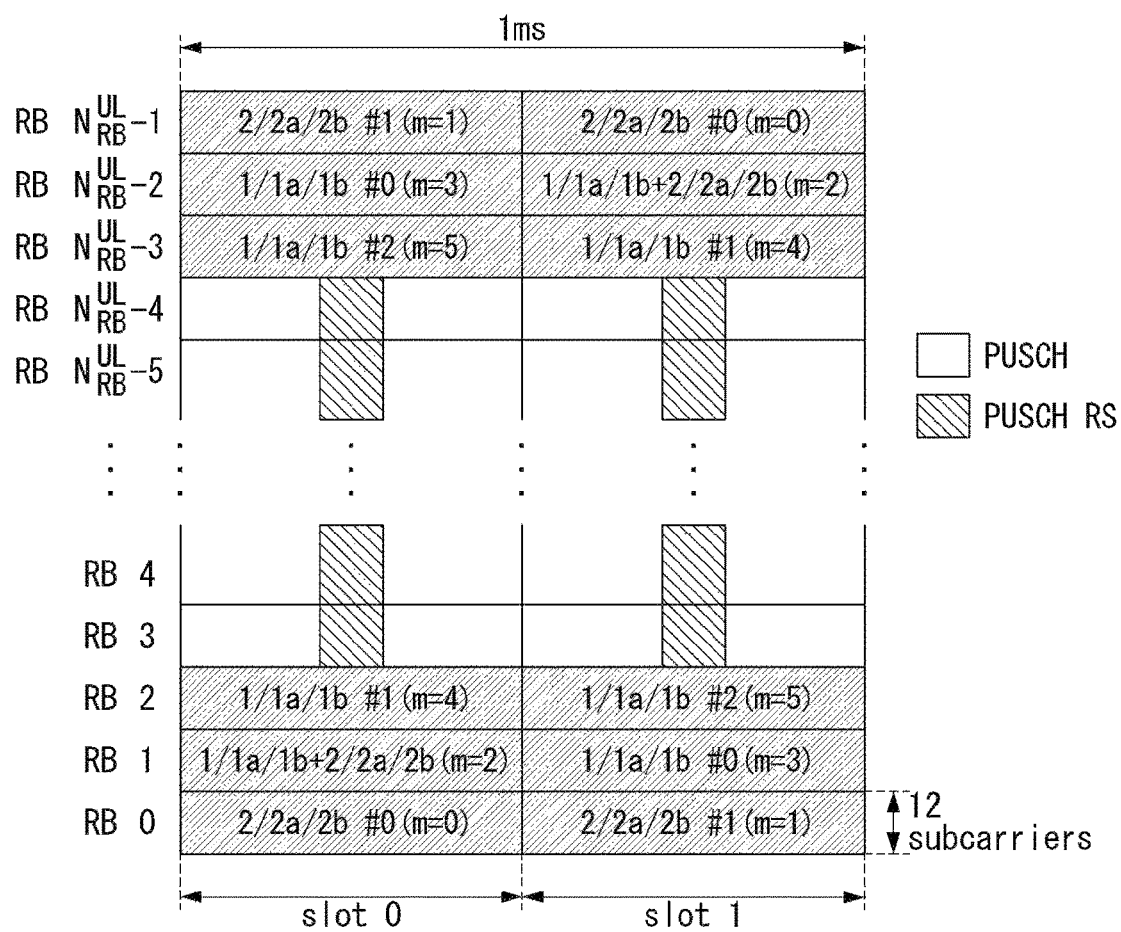
FIG. 14 illustrates an example in which physical uplink control channel (PUCCH) formats are mapped to PUCCH regions of uplink physical resource blocks in a wireless communication system to which implementations of the present disclosure are applicable.

FIG. 14 illustrates an example in which PUCCH formats are mapped to PUCCH regions of uplink physical resource blocks in a wireless communication system to which the present disclosure is applicable.

In FIG. 14, $N_{RB}^{UL}$ represents the number of resource blocks in the uplink, and $0, 1, \ldots, N_{RB}^{UL}-1$ refers to No. of s physical resource block. Basically, the PUCCH is mapped to both edges of an uplink frequency block. As illustrated in FIG. 14, the PUCCH format 2/2a/2b is mapped to a PUCCH region marked by m=0, 1, which may represent that the PUCCH format 2/2a/2b is mapped to resource blocks located at band edges. In addition, the PUCCH format 2/2a/2b and the PUCCH format 1/1a/1b are mixedly mapped to the PUCCH region marked by m=2. Next, the PUCCH format 1/1a/1b may be mapped to a PUCCH region marked by m=3, 4, 5. The number $N_{RB}^{(2)}$ of PUCCH RBs available for use by the PUCCH format 2/2a/2b may be indicated to the UEs in a cell by broadcasting signaling.

The PUCCH format 2/2a/2b is described. The PUCCH format 2/2a/2b is a control channel used to transmit channel measurement feedbacks CQI, PMI, and RI.

A periodicity and a frequency unit (or a frequency resolution) to be used to report the channel measurement feedback (hereinafter, collectively referred to as CQI information) may be controlled by the base station. Periodic CQI reporting and aperiodic CQI reporting in a time domain can be reported. The PUCCH format 2 may be used for the periodic CQI reporting only, and the PUSCH may be used for the aperiodic CQI reporting. In case of the aperiodic CQI reporting, the base station may instruct the UE to send an individual CQI report embedded into a resource which is scheduled for uplink data transmission.

Figure 15:
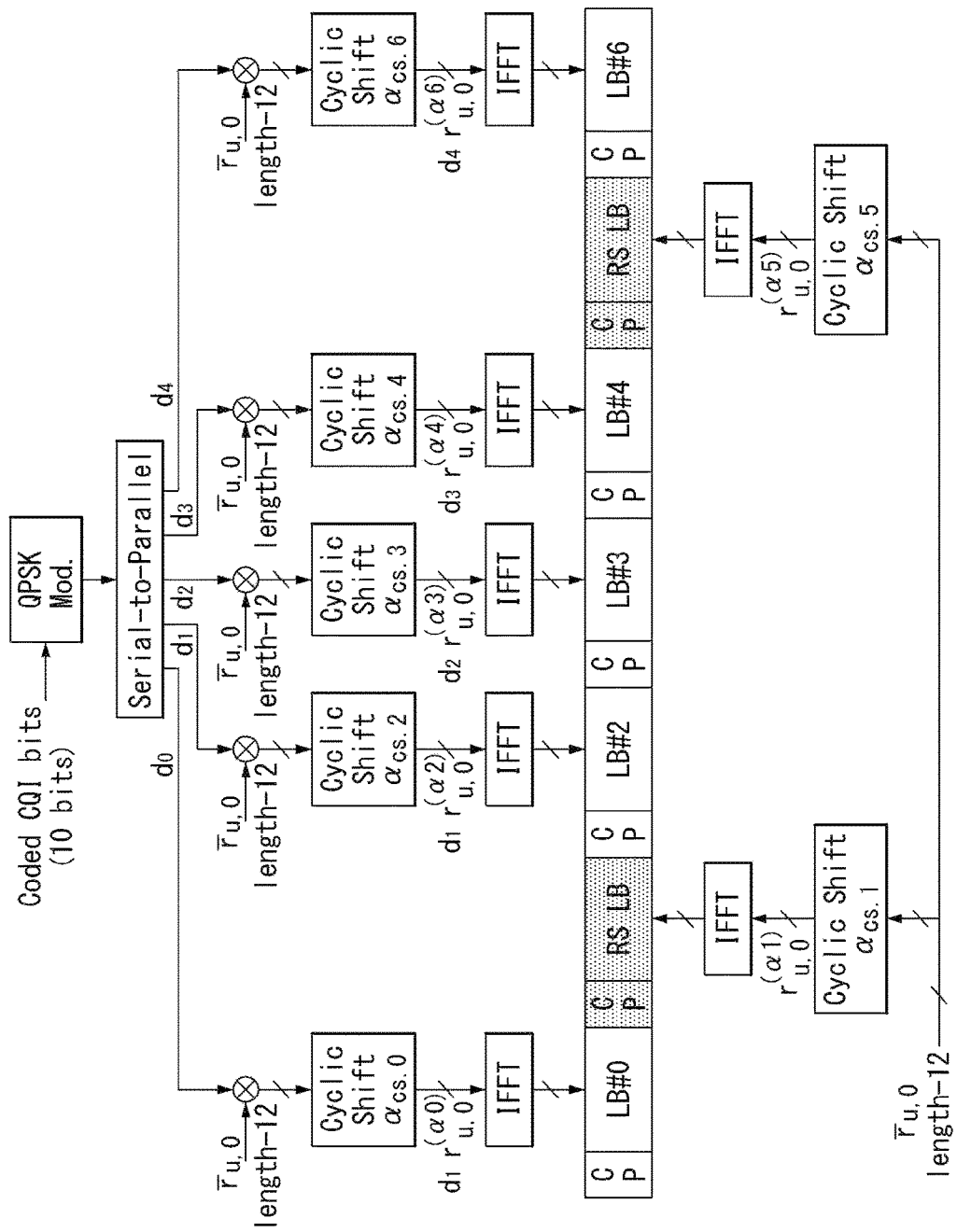
FIG. 15 illustrates an example of a structure of channel quality indicator (CQI) channel in case of a normal cyclic prefix (CP) in a wireless communication system to which implementations of the present disclosure are applicable.

FIG. 15 illustrates a structure of CQI channel in case of a normal CP in a wireless communication system to which the present disclosure is applicable.

Among SC-FDMA symbols 0 to 6 of one slot, SC-FDMA symbols 1 and 5 (second and sixth symbols) may be used for transmission of demodulation reference signal (DMRS), and the CQI information may be transmitted in the remaining SC-FDMA symbols. In case of the extended CP, one SC-FDMA symbol (SC-FDMA symbol 3) is used for the DMRS transmission.

In the PUCCH format 2/2a/2b, the modulation by the CAZAC sequence is supported, and a QPSK modulated symbol is multiplied by the length-12 CAZAC sequence. A cyclic shift (CS) of the sequence is changed between symbols and slots. An orthogonal covering is used for the DMRS.

The reference signal (DMRS) is carried on two SC-FDMA symbols which are separated from each other at an interval of three SC-FDMA symbols among seven SC-FDMA symbols included in one slot, and the CQI information is carried on the remaining five SC-FDMA symbols. The use of two RSs in one slot is to support a high speed UE. Further, the respective UEs are distinguished using a cyclic shift (CS) sequence. CQI information symbols are modulated and transmitted to all the SC-FDMA symbols, and the SC-FDMA symbol is composed of one sequence. That is, the UE modulates the CQI and transmits the modulated CQI to each sequence.

The number of symbols which can be transmitted in one TTI is 10, and the modulation of the CQI information is also determined up to the QPSK. Since a 2-bit CQI value can be carried in case of using the QPSK mapping for the SC-FDMA symbol, a 10-bit CQI value can be carried on one slot. Thus, a CQI value of maximum 20 bits can be carried in one subframe. A frequency domain spreading code is used to spread the CQI information in a frequency domain.

As the frequency domain spreading code, length-12 CAZAC sequence (e.g., ZC sequence) may be used. Each control channel may be distinguished by applying the CAZAC sequence having a different cyclic shift value. An IFFT is performed on frequency domain spreading CQI information.

The 12 equally-spaced cyclic shifts may allow 12 different UEs to be orthogonally multiplexed on the same PUCCH RB. In case of a normal CP, a DMRS sequence on the SC-FDMA symbol 1 and 5 (on the SC-FDMA symbol 3 in case of an extended CP) is similar to a CQI signal sequence on the frequency domain, but the modulation like the CQI information is not applied.

The UE may be semi-statically configured by higher layer signaling to report periodically different CQI, PMI, and RI types on PUCCH resources indicated as PUCCH resource indexes ($n_{PUCCH}^{(1,\tilde{p})}$, $n_{PUCCH}^{(2,\tilde{p})}$, $n_{PUCCH}^{(3,\tilde{p})}$). Here, the PUCCH resource index ($n_{PUCCH}^{(2,\tilde{p})}$) is information indicating a PUCCH region used for the PUCCH format 2/2a/2b transmission and a cyclic shift (CS) value to be used.

PUCCH Channel Structure

PUCCH formats 1a and 1b are described.

In the PUCCH format 1a/1b, a symbol modulated using a BPSK or QPSK modulation scheme is multiplied by length-12 CAZAC sequence. For example, the result of multiplying length-N CAZAC sequence r(n) (where n=0, 1, 2, ..., N−1) by a modulation symbol d(0) is y(0), y(1), y(2), ..., y(N−1). The symbols y(0), y(1), y(2), ..., y(N−1) may be referred to as a block of symbols. After the CAZAC sequence is multiplied by the modulation symbol, the block-wise spreading using an orthogonal sequence is applied.

A length-4 Hadamard sequence is used for normal ACK/NACK information, and a length-3 discrete fourier transform (DFT) sequence is used for shortened ACK/NACK information and a reference signal.

A length-2 Hadamard sequence is used for the reference signal in case of an extended CP.

Figure 16:
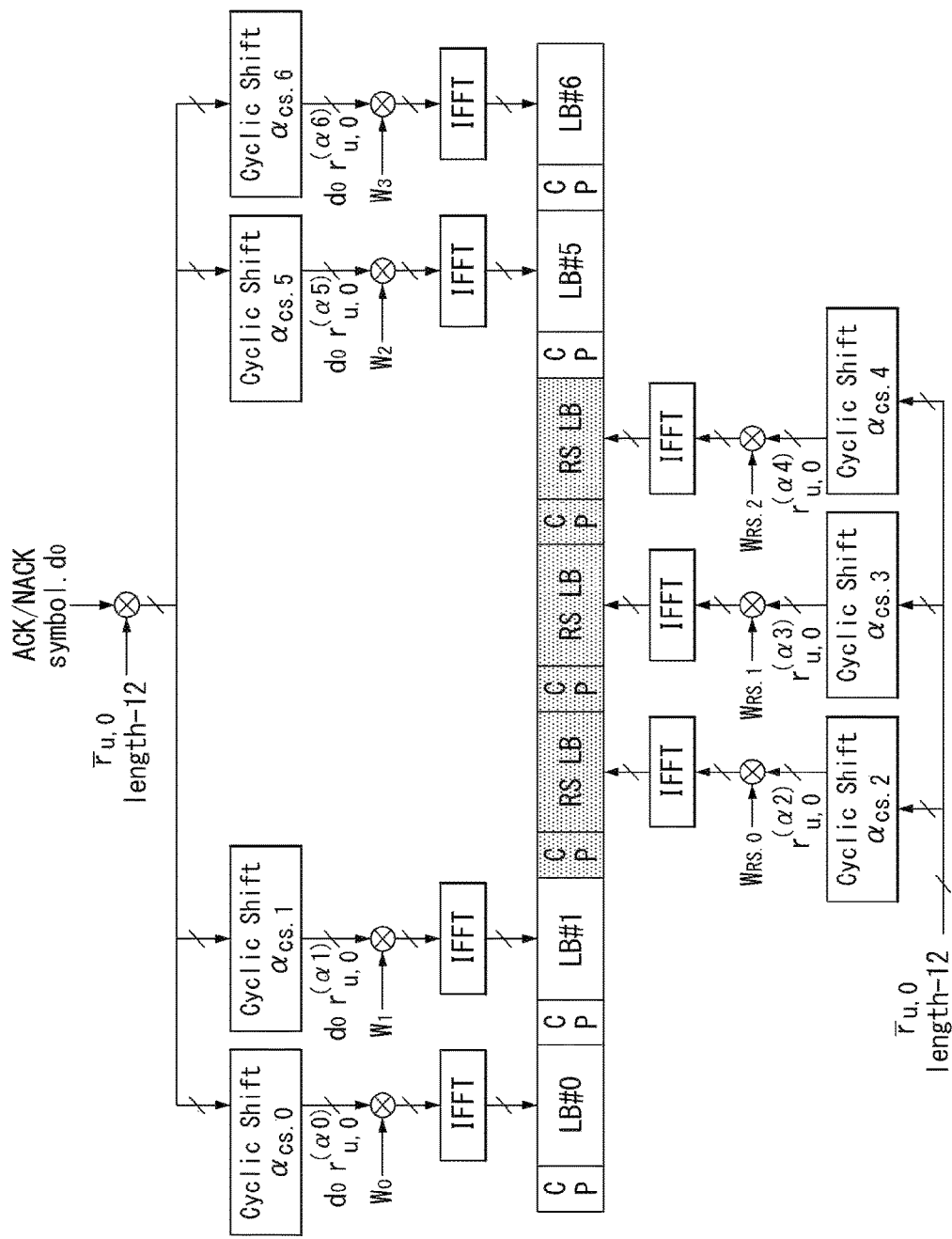
FIG. 16 illustrates an example of a structure of ACK/NACK channel in case of a normal CP in a wireless communication system to which implementations of the present disclosure are applicable.

FIG. 16 illustrates a structure of ACK/NACK channel in case of a normal CP in a wireless communication system to which the present disclosure is applicable.

More specifically, FIG. 16 illustrates an example of a PUCCH channel structure for HARQ ACK/NACK transmission without CQI.

A reference signal (RS) is carried on three consecutive SC-FDMA symbols in the middle of seven SC-FDMA symbols included in one slot, and an ACK/NACK signal is carried on the remaining four SC-FDMA symbols.

In case of an extended CP, the RS may be carried on two consecutive symbols in the middle. The number and location of symbols used for the RS may vary depending on a control channel, and the number and location of symbols used for the ACK/NACK signal related may be changed accordingly.

Both 1-bit and 2-bit acknowledgement information (in a state of not being scrambled) may be expressed as a single HARQ ACK/NACK modulation symbol using the BPSK and QPSK modulation schemes, respectively. Positive acknowledgement (ACK) may be encoded as '1', and negative ACK (NACK) may be encoded as '0'.

When a control signal is transmitted in an allocated bandwidth, two-dimensional spreading is applied to increase a multiplexing capacity. That is, frequency domain spreading and time domain spreading are simultaneously applied to increase the number of UEs or the number of control channels that can be multiplexed.

In order to spread an ACK/NACK signal in the frequency domain, a frequency domain sequence is used as a base sequence. As the frequency domain sequence, a Zadoff-Chu (ZC) sequence which is a kind of CAZAC sequence may be used. For example, multiplexing of different UEs or different control channels can be applied by applying different cyclic shifts (CS) to the ZC sequence which is the base sequence. The number of CS resources supported in SC-FDMA symbols for PUCCH RBs for the HARQ ACK/NACK transmission is configured by a cell-specific higher layer signaling parameter $\Delta_{shift}^{PUCCH}$.

The frequency domain spreading ACK/NACK signal is spread in a time domain using an orthogonal spreading code. A Walsh-Hadamard sequence or a DFT sequence may be used as the orthogonal spreading code. For example, the ACK/NACK signal may be spread using length-4 orthogonal sequences (w0, w1, w2, w3) for four symbols. An RS is also spread through length-3 or length-2 orthogonal sequence. This is referred to as orthogonal covering (OC).

As described above, multiple UEs may be multiplexed in a code division multiplexing (CDM) technique using CS resources in the frequency domain and OC resources in the time domain. That is, ACK/NACK information and a RS of a large number of UEs may be multiplexed on the same PUCCH RB.

As to the time domain spreading CDM, the number of spreading codes supported for the ACK/NACK information is limited by the number of RS symbols. That is, since the number of SC-FDMA symbols for RS transmission is less than the number of SC-FDMA symbols for ACK/NACK information transmission, a multiplexing capacity of the RS is less than a multiplexing capacity of the ACK/NACK information.

For example, in case of the normal CP, the ACK/NACK information may be transmitted on four symbols, and not four but three orthogonal spreading codes may be used for the ACK/NACK information. This is because the number of RS transmission symbols is limited to three, and three orthogonal spreading codes only may be used for the RS.

If three symbols in one slot are used for the RS transmission and four symbols are used for the ACK/NACK information transmission in a subframe of the normal CP, for example, if six cyclic shifts (CSs) in the frequency domain and three orthogonal covering (OC) resources in the time domain can be used, HARQ acknowledgement from a total of 18 different UEs may be multiplexed within one PUCCH RB. If two symbols in one slot are used for the RS transmission and four symbols are used for the ACK/NACK information transmission in a subframe of the extended CP, for example, if six cyclic shifts (CSs) in the frequency domain and two orthogonal covering (OC) resources in the time domain can be used, HARQ acknowledgement from a total of 12 different UEs may be multiplexed in one PUCCH RB.

Next, the PUCCH format 1 is described. A scheduling request (SR) is transmitted in such a manner that the UE is requested to be scheduled or is not request. A SR channel reuses an ACK/NACK channel structure in the PUCCH format 1a/1b, and is configured in an on-off keying (OOK) technique based on an ACK/NACK channel design. In the SR channel, a reference signal is not transmitted. Thus, length-7 sequence is used in the normal CP, and length-6 sequence is used in the extended CP. Different cyclic shifts or orthogonal covers may be allocated for the SR and the ACK/NACK. That is, the UE transmits HARQ ACK/NACK on resources allocated for the SR for the purpose of positive SR transmission. The UE transmits HARQ ACK/NACK on resources allocated for the ACK/NACK for the purpose of negative SR transmission.

Next, an enhanced-PUCCH (e-PUCCH) format is described. The e-PUCCH format may correspond to PUCCH format 3 of the LTE-A system. A block spreading scheme may be applied to the ACK/NACK transmission using the PUCCH format 3.

PUCCH Piggybacking in Rel-8 LTE

Figure 17:
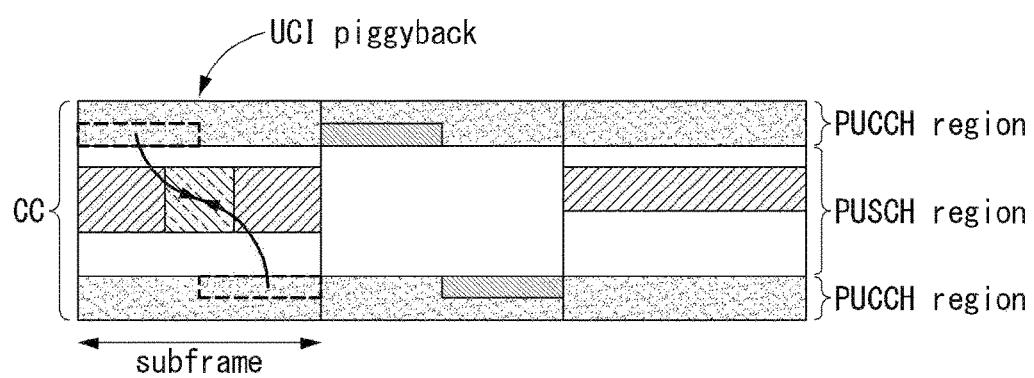
FIG. 17 illustrates an example of transport channel processing of an uplink shared channel (UL-SCH) in a wireless communication system to which implementations of the present disclosure are applicable.

FIG. 17 illustrates an example of transport channel processing of an UL-SCH in a wireless communication system to which the present disclosure is applicable.

In the 3GPP LTE system (=E-UTRA, Rel. 8), in case of the UL, for efficient utilization of a power amplifier of a terminal, peak-to-average power ratio (PAPR) characteristics or cubic metric (CM) characteristics that affect a performance of the power amplifier are configured so that good single carrier transmission is maintained. That is, in the existing LTE system, the good single carrier characteristics can be maintained by maintaining single carrier characteristics of data to be transmitted through DFT-precoding in case of the PUSCH transmission, and transmitting information carried on a sequence with the single carrier characteristic in case of the PUCCH transmission. However, when DFT-precoded data is non-consecutively allocated to a frequency axis or the PUSCH and the PUCCH are simultaneously transmitted, the single carrier characteristics are degraded. Thus, as illustrated in FIG. 17, when the PUSCH is transmitted in the same subframe as the PUCCH transmission, uplink control information (UCI) to be transmitted to the PUCCH for the purpose of maintaining the single carrier characteristics is transmitted (piggyback) together with the data via the PUSCH.

As described above, because the PUCCH and the PUSCH cannot be simultaneously transmitted in the existing LTE terminal, the existing LTE terminal uses a technique that multiplexes uplink control information (UCI) (CQI/PMI, HARQ-ACK, RI, etc.) to the PUSCH region in a subframe in which the PUSCH is transmitted.

For example, when a channel quality indicator (CQI) and/or a precoding matrix indicator (PMI) needs to be transmitted in a subframe allocated to transmit the PUSCH, UL-SCH data and the CQI/PMI are multiplexed before DFT-spreading and transmit both control information and data. In this case, the UL-SCH data performs rate-matching considering CQI/PMI resources. Further, a scheme is used, in which control information such as HARQ ACK and RI punctures the UL-SCH data and is multiplexed to the PUSCH region.

Figure 18:
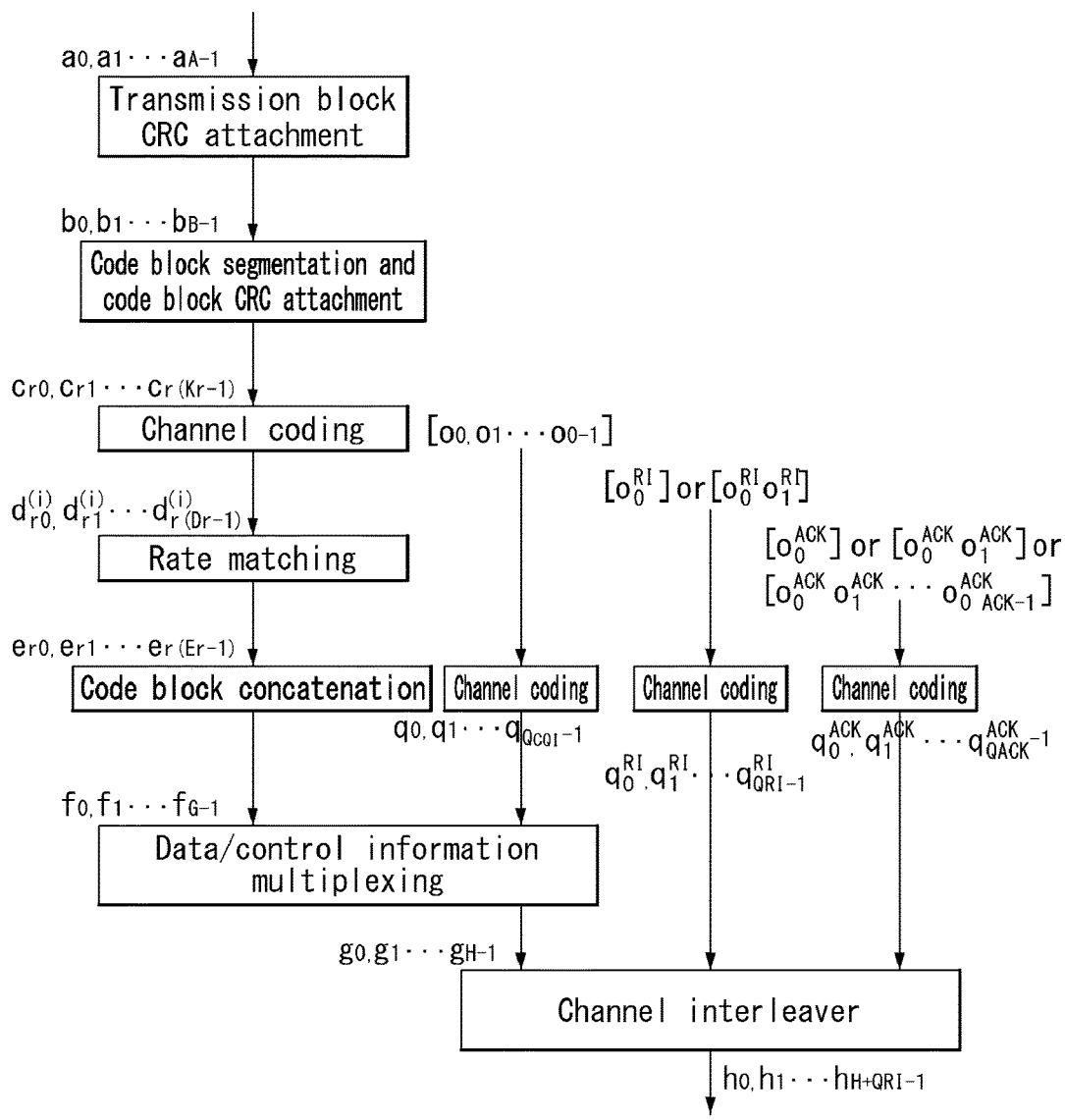
FIG. 18 illustrates an example of signal processing of an uplink shared channel that is a transport channel in a wireless communication system to which implementations of the present disclosure are applicable.

FIG. 18 illustrates an example of signal processing of an uplink shared channel that is a transport channel in a wireless communication system to which the present disclosure is applicable.

Hereinafter, signal processing of an uplink shared channel (hereinafter, referred to as "UL-SCH") may be applied to one or more transport channels or control information types.

Referring to FIG. 18, the UL-SCH transfers data to a coding unit in the form of a transport block (TB) once every a transmission time interval (TTI).

CRC parity bits $p_0, p_1, p_2, p_3, \ldots, p_{L-1}$ are attached to bits $a_0, a_1, a_2, a_3, \ldots, a_{A-1}$ of a transport block transferred from the upper layer. In this instance, A denotes a size of the transport block, and L denotes the number of parity bits. Input bits, to which the CRC is attached, are denoted by $b_0, b_1, b_2, b_3, \ldots, b_{B-1}$. In this instance, B denotes the number of bits of the transport block including the CRC.

$b_0, b_1, b_2, b_3, \ldots, b_{B-1}$ are segmented into multiple code blocks (CBs) according to the size of the TB, and the CRC is attached to the multiple segmented CBs. Bits after the code block segmentation and the CRC attachment are denoted by $c_{r0}, c_{r1}, c_{r2}, c_{r3}, \ldots, c_{r(K_r-1)}$. Here, r represents No. (r=0, ..., C−1) of the code block, and Kr represents the number of bits depending on the code block r. Further, C represents the total number of code blocks.

Subsequently, channel coding is performed. Output bits after the channel coding are denoted by $d_{r0}^{(i)}, d_{r1}^{(i)}, d_{r2}^{(i)}, d_{r3}^{(i)}, \ldots, d_{r(D_r-1)}^{(i)}$. In this instance, i represents a coded stream index and may have a value of 0, 1, or 2. Dr represents the number of bits of an i-th coded stream for a code block r. r represents a code block number (r=0, ..., C−1), and C represents the total number of code blocks. Each code block may be coded by turbo coding.

Subsequently, rate matching is performed. Bits after the rate matching are denoted by $e_{r0}, e_{r1}, e_{r2}, e_{r3}, \ldots, e_{r(E_r-1)}$. In this case, r represents the code block number (r=0, ..., C−1), and C represents the total number of code blocks. Er represents the number of rate-matched bits of a r-th code block.

Subsequently, concatenation between the code blocks is performed again. Bits after the concatenation of the code blocks is performed are denoted by $f_0, f_1, f_2, f_3, \ldots, f_{G-1}$. In this instance, G represents the total number of bits coded for transmission, and when the control information is multiplexed with the UL-SCH, the number of bits used for the transmission of the control information is not included.

When the control information is transmitted on the PUSCH, channel coding of CQI/PMI, RI, and ACK/NACK which are the control information is independently performed. Because different coded symbols are allocated for the transmission of each control information, each control information has a different coding rate.

In time division duplex (TDD), an ACK/NACK feedback mode supports two modes of ACK/NACK bundling and ACK/NACK multiplexing by higher layer configuration. ACK/NACK information bit for the ACK/NACK bundling consists of 1 bit or 2 bits, and ACK/NACK information bit for the ACK/NACK multiplexing consists of between 1 bit and 4 bits.

After the concatenation between the code blocks, coded bits $f_0, f_1, f_2, f_3, \ldots, f_{G-1}$ of the UL-SCH data and coded bits $q_0, q_1, q_2, q_3, \ldots, q_{N_L \cdot Q_{CQI}-1}$ of the CQI/PMI are multiplexed. The result of multiplexing the data and the CQI/PMI is denoted by $\underline{g}_0, \underline{g}_1, \underline{g}_2, \underline{g}_3, \ldots, \underline{g}_{H'-1}$. In this instance, $\underline{g}_i$ (i=0, ..., H'-1) represents a column vector with a length of $(Q_m \cdot N_L)$, $H=(G+N_L \cdot Q_{CQI})$, and $H'=H/(N_L \cdot Q_m)$. $N_L$ represents the number of layers mapped to a UL-SCH transport block, and H represents the total number of coded bits allocated, for the UL-SCH data and the CQI/PMI information, to $N_L$ transport layers to which the transport block is mapped.

Subsequently, multiplexed data and CQI/PMI, separately channel-coded RI, and ACK/NACK are channel-interleaved to generate an output signal.

PDCCH Assignment Procedure

A plurality of PDCCHs may be transmitted within one subframe. That is, a control region of one subframe consists of a plurality of CCEs having indexes 0 to $N_{CCE,k}-1$, where $N_{CCE,k}$ denotes the total number of CCEs in a control region of a k-th subframe. The UE monitors a plurality of PDCCHs in every subframe. Here, the monitoring means that the UE attempts the decoding of each PDCCH depending on a monitored PDCCH format. The base station does not provide the UE with information about where the corresponding PDCCH is in a control region allocated in a subframe. Since the UE cannot know which position its own PDCCH is transmitted at which CCE aggregation level or DCI format in order to receive a control channel transmitted by the base station, the UE monitors a set of PDCCH candidates in the subframe and searches its own PDCCH. This is called blind decoding/detection (BD). The blind decoding refers to a technique, by the UE, for de-masking its own UE identifier (UE ID) from a CRC part and then checking whether a corresponding PDCCH is its own control channel by reviewing a CRC error.

In an active mode, the UE monitors a PDCCH of each subframe in order to receive data transmitted to the UE. In a DRX mode, the UE wakes up in a monitoring interval of each DRX period and monitors a PDCCH in a subframe corresponding to the monitoring interval. A subframe in which the monitoring of the PDCCH is performed is called a non-DRX subframe.

The UE shall perform the blind decoding on all of CCEs present in a control region of the non-DRX subframe in order to receive the PDCCH transmitted to the UE. Since the UE does not know which PDCCH format will be transmitted, the UE shall decode all of PDCCHs at a possible CCE aggregation level until the blind decoding of the PDCCHs is successful within each non-DRX subframe. Since the UE does not know how many CCEs are used for the PDCCH for the UE, the UE shall attempt detection at all the possible CCE aggregation levels until the blind decoding of the PDCCH is successful. That is, the UE performs the blind decoding per CCE aggregation level. That is, the UE first attempts decoding by setting a CCE aggregation level unit to 1. If all the decoding fails, the UE attempts decoding by setting the CCE aggregation level unit to 2. Thereafter, the UE attempts decoding by setting the CCE aggregation level unit to 4 and setting the CCE aggregation level unit to 8. Furthermore, the UE attempts the blind decoding on a total of four of C-RNTI, P-RNTI, SI-RNTI, and RA-RNTI. The UE attempts blind decoding on all the DCI formats that need to be monitored.

As described above, if the UE performs blind decoding on all the possible RNTIs and all the DCI formats, that need to monitored, per each of all the CCE aggregation levels, the number of detection attempts excessively increases. Therefore, in the LTE system, a search space (SS) concept is defined for the blind decoding of the UE. The search space means a set of PDCCH candidates for monitoring, and may have a different size depending on each PDCCH format.

The search space may include a common search space (CSS) and a UE-specific/dedicated search space (US S). In the case of the common search space, all the UEs may be aware of the size of the common search space, but the UE-specific search space may be individually configured to each UE. Thus, the UE must monitor both the UE-specific search space and the common search space in order to decode the PDCCH, and thus performs blind decoding (BD) up to 44 times in one subframe. This does not include blind decoding performed based on a different CRC value (e.g., C-RNTI, P-RNTI, SI-RNTI, RA-RNTI).

There may occur a case where the base station cannot secure CCE resources for transmitting a PDCCH to all the UEs which intend to transmit the PDCCH within a given subframe due to a small search space. This is because resources left over after a CCE location is allocated may not be included in a search space of a specific UE. In order to minimize such a barrier that may continue even in a next subframe, a UE-specific hopping sequence may be applied to the point at which the UE-specific search space starts.

Table 7 represents the size of the common search space and the UE-specific search space.

TABLE 7

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to reduce a computational load of a UE according to the number of times that the UE attempts blind decoding, the UE does not perform search according to all of defined DCI formats at the same time. Specifically, the UE may always perform search for DCI formats 0 and 1A in the UE-specific search space. In this instance, the DCI formats 0 and 1A have the same size, but the UE may distinguish between the DCI formats using a flag for the DCI format 0/format 1A differentiation included in a PDCCH. Furthermore, DCI formats other than the DCI formats 0 and 1A may be required for the UE depending on a PDSCH transmission mode configured by the base station. For example, DCI formats 1, 1B and 2 may be used.

The UE in the common search space may search for the DCI formats 1A and 1C. Furthermore, the UE may be configured to search for the DCI format 3 or 3A. The DCI formats 3 and 3A have the same size as the DCI formats 0 and 1A, but the UE may distinguish between the DCI formats using CRS scrambled by another identifier not a UE-specific identifier.

A search space $S_k^{(L)}$ means a set of PDCCH candidates according to an aggregation level $L \in \{1, 2, 4, 8\}$. A CCE according to a PDCCH candidate set m of the search space may be determined by the following Equation 3.

$$L \cdot \{(Y_k + m) \bmod \lfloor N_{CCE,k}/L \rfloor\} + i \qquad \text{[Equation 3]}$$

Here, $M^{(L)}$ represents the number of PDCCH candidates according to a CCE aggregation level L for monitoring in the search space, and m=0, . . . , $M^{(L)}$–1. i is an index for designating an individual CCE in each PDCCH candidate, where i=0, . . . , L–1.

As described above, the UE monitors both the UE-specific search space and the common search space in order to decode the PDCCH. Here, the common search space (CSS) supports PDCCHs with an aggregation level of {4, 8}, and the UE-specific search space (USS) supports PDCCHs with an aggregation level of {1, 2, 4, 8}.

Table 8 represents DCCH candidates monitored by a UE.

TABLE 8

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Referring to Equation 3, in case of the common search space, $Y_k$ is set to 0 with respect to two aggregation levels L=4 and L=8. On the other hand, in case of the UE-specific search space with respect to an aggregation level L, $Y_k$ is defined as in Equation 4

$$Y_k = (A \cdot Y_{k-1}) \bmod D \quad \text{[Equation 4]}$$

Here, $Y_{-1} = n_{RNTI} \neq 0$, and an RNTI value used for may be defined as one of identifications of the UE. Further, A=39827, D=65537, and $k = \lfloor n_s/2 \rfloor$ where $n_s$ denotes a slot number (or index) in a radio frame.

General ACK/NACK Multiplexing

In a situation in which a UE shall simultaneously transmit multiple ACKs/NACKs corresponding to multiple data units received from an eNB, an ACK/NACK multiplexing method based on PUCCH resource selection may be considered to maintain single-frequency characteristics of an ACK/NACK signal and reduce ACK/NACK transmission power.

Together with ACK/NACK multiplexing, contents of ACK/NACK responses for multiple data units are identified by combining a PUCCH resource and a resource of QPSK modulation symbols used for actual ACK/NACK transmission.

For example, if one PUCCH resource transmits 4 bits and up to four data units can be transmitted, an ACK/NACK result can be identified at the eNB as indicated in the following Table 9.

TABLE 9

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |

TABLE 9-continued

| HARQ-ACK(0), HARQ-ACK(1), HARQ-ACK(2), HARQ-ACK(3) | $n_{PUCCH}^{(1)}$ | b(0), b(1) |
|---|---|---|
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In the above Table 9, HARQ-ACK(i) represents an ACK/NACK result for an i-th data unit. In the above Table 9, discontinuous transmission (DTX) means that there is no data unit to be transmitted for the corresponding HARQ-ACK(i) or that the UE does not detect the data unit corresponding to the HARQ-ACK(i). According to the above Table 9, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided, and b(0) and b(1) are two bits transmitted by using a selected PUCCH.

For example, if the UE successfully receives all of four data units, the UE transmits 2-bit (1, 1) using $n_{PUCCH,1}^{(1)}$.

If the UE fails in decoding in first and third data units and succeeds in decoding in second and fourth data units, the US transmits bits (1, 0) using $n_{PUCCH,3}^{(1)}$.

In ACK/NACK channel selection, if there is at least one ACK, the NACK and the DTX are coupled with each other. This is because a combination of the reserved PUCCH resource and the QPSK symbol may not represent all ACK/NACK states. However, if there is no ACK, the DTX is decoupled from the NACK.

In this case, the PUCCH resource linked to the data unit corresponding to one definite NACK may also be reserved to transmit signals of multiple ACKs/NACKs.

General ACK/NACK Transmission

In the LTE-A system, it considers to transmit, via a specific UL component carrier (CC), a plurality of ACK/NACK information/signals for a plurality of PDSCHs transmitted via a plurality of DL CCs. To this end, unlike ACK/NACK transmission using PUCCH format 1a/1b in the existing Rel-8 LTE, it may consider to transmit a plurality of ACK/NACK information/signals by channel-coding (e.g., Reed-Muller code, Tail-biting convolutional code, etc.) a plurality of ACK/NACK information and then using PUCCH format 2 or a new PUCCH format (i.e., E-PUCCH format) of the following block spreading based modified type.

A block spreading scheme is a scheme for modulating control signal transmission using an SC-FDMA technique, unlike the existing PUCCH format 1 series or 2 series. As illustrated in FIG. 8, a symbol sequence may be spread on a time domain using an orthogonal cover code (OCC) and may be transmitted. Control signals of a plurality of UEs may be multiplexed on the same RB using the OCC. In case of the PUCCH format 2 described above, one symbol sequence is transmitted over the time domain, and the control signals of the plurality of UEs are multiplexed using a cyclic shift (CS) of a CAZAC sequence. On the other hand, in case of the block spreading based PUCCH format (e.g., PUCCH format 3), one symbol sequence is transmitted over a frequency domain, and the control signals of the plurality of UEs are multiplexed using a time domain spreading using the OCC.

Figure 19:
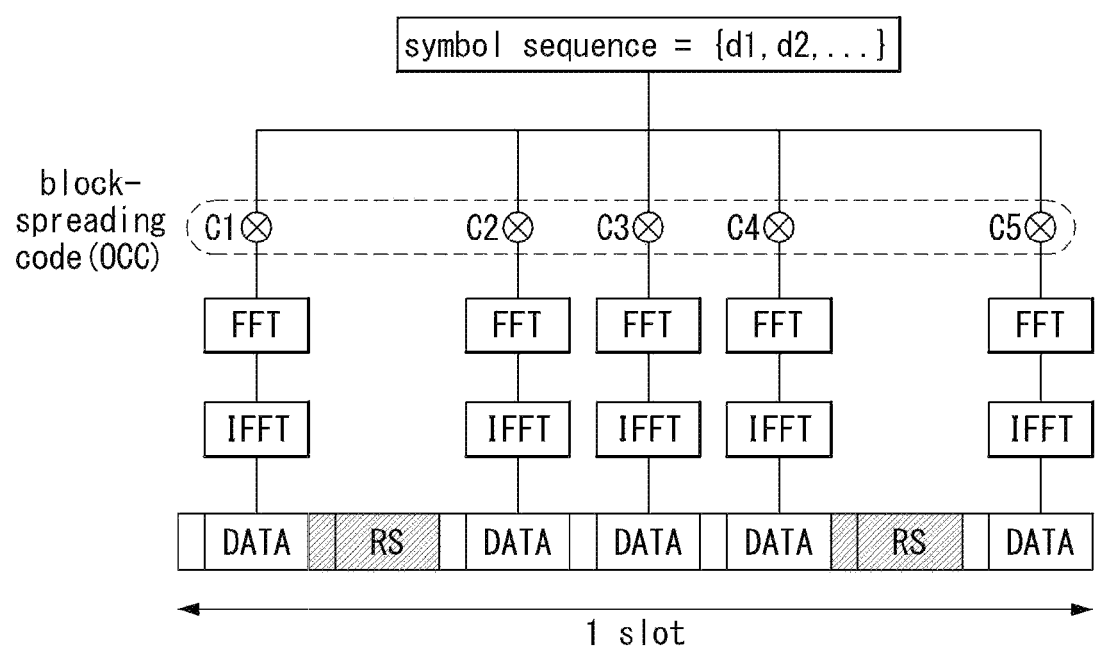
FIG. 19 illustrates an example of generating and transmitting 5 SC-FDMA symbols during one slot in a wireless communication system to which implementations of the present disclosure are applicable.

FIG. 19 illustrates an example of generating and transmitting 5 SC-FDMA symbols during one slot in a wireless communication system to which the present disclosure is applicable.

FIG. 19 illustrates an example of generating and transmitting five SC-FDMA symbols (i.e., data part) using an OCC of the length 5 (or SF=5) in one symbol sequence during one slot. In this case, two RS symbols may be used during one slot.

In the example of FIG. 19, the RS symbol may be generated from a CAZAC sequence, to which a specific cyclic shift value is applied, and may be transmitted in the form in which a predetermined OCC is applied (or multiplied) over a plurality of RS symbols. Further, in the example of FIG. 19, if it is assumed that 12 modulation symbols are used for each OFDM symbol (or SC-FDMA symbol) and each modulation symbol is generated by QPSK, the maximum number of bits which can be transmitted on one slot is 24 bits (=12×2). Thus, the number of bits which can be transmitted on two slots is a total of 48 bits. If a PUCCH channel structure of the block spreading scheme is used as described above, control information of an extended size can be transmitted as compared to the existing PUCCH format 1 series and 2 series.

For convenience of explanation, such a channel coding based technique for transmitting a plurality of ACKs/NACKs using the PUCCH format 2 or the E-PUCCH format is referred to as a multi-bit ACK/NACK coding transmission technique. The technique refers to transmitting an ACK/NACK coded block generated by channel-coding ACK/NACK information or discontinuous transmission (DTX) information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) technique applied to the existing Rel-8 TDD system, the technique may basically consider an implicit ACK/NACK selection technique that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an ACK/NACK selection technique using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-A TDD system may consider a technique (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a technique (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC). Characteristically, as a SF bundling technique, it may consider an ACK-counter technique which informs of the total number of ACKs (or the number of some of the ACKs) per CC with respect to all PDSCHs or DL grant PDCCHs received for each CC. In this instance, a multi-bit ACK/NACK coding or an ACK/NACK selection based ACK/NACK transmission technique may be configurably applied according to a size of an ACK/NACK payload per UE, i.e., a size of an ACK/NACK payload for full or bundled ACK/NACK transmission that is configured for each UE.

ACK/NACK Transmission for LTE-A

The LTE-A system supports transmitting, via a specific UL CC, a plurality of ACK/NACK information/signals for a plurality of PDSCHs which are transmitted via a plurality of DL CCs. To this end, unlike ACK/NACK transmission using PUCCH format 1a/1b in the existing Rel-8 LTE, a plurality of ACK/NACK information may be transmitted through a PUCCH format 3.

Figure 20:
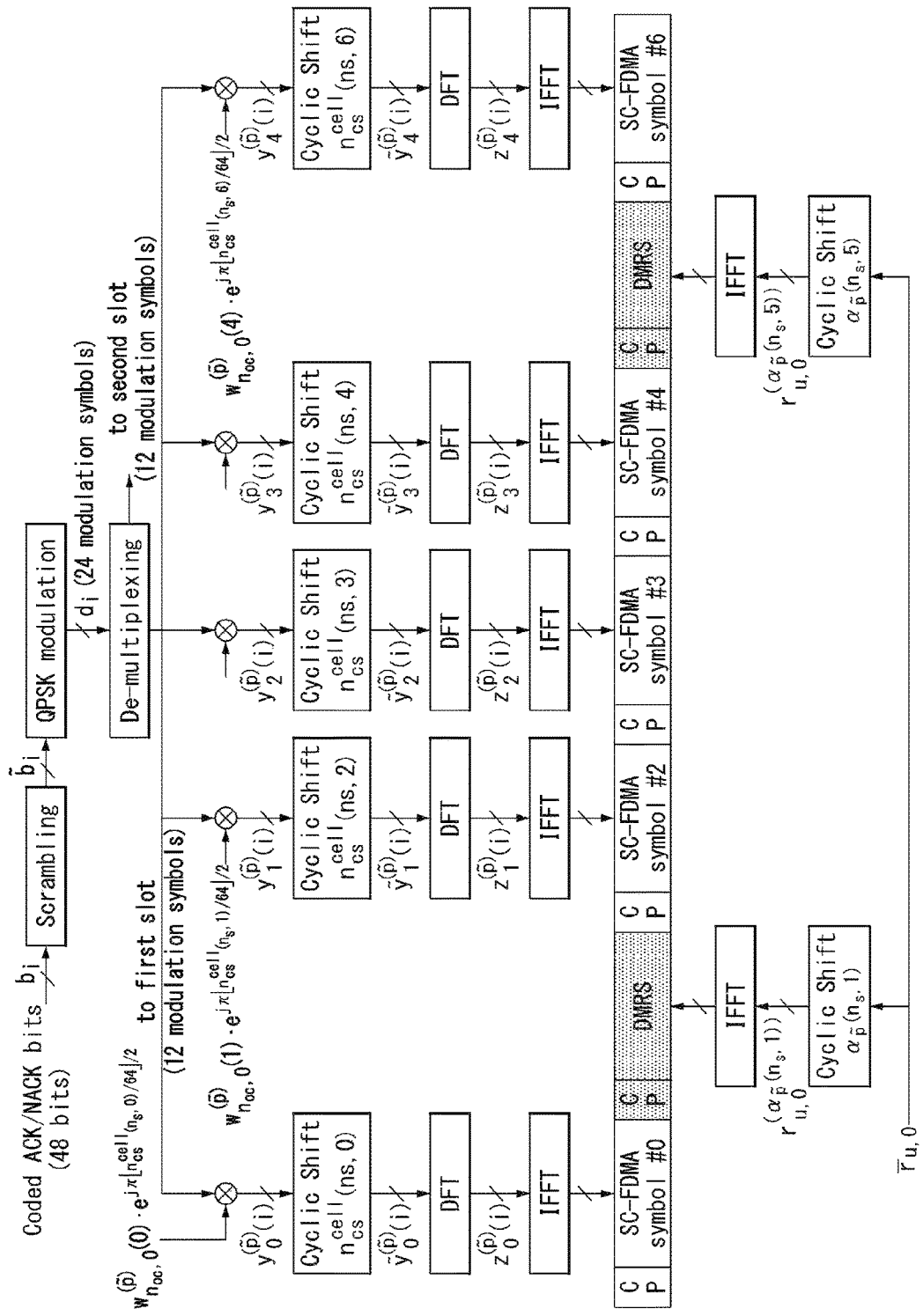
FIG. 20 illustrates an example of an ACK/NACK channel structure for PUCCH format 3 with a normal CP.

FIG. 20 illustrates an ACK/NACK channel structure for PUCCH format 3 with a normal CP.

As illustrated in FIG. 20, a symbol sequence is transmitted by time-domain spreading by an orthogonal cover code (OCC) and may multiplex control signals of multiple UEs on the same RB using the OCC. In the PUCCH format 2 mentioned above, one symbol sequence is transmitted over a time domain and performs the UE multiplexing using a cyclic shift of a CAZAC sequence. On the other hand, in case of the PUCCH format 3, one symbol sequence is transmitted over a frequency domain and performs the UE multiplexing using the time-domain spreading based on the OCC. FIG. 20 illustrates an example of generating and transmitting five SC-FDMA symbols from one symbol sequence using OCC of length-5 (spreading factor=5). In an example of FIG. 20, a total of two RS symbols have been used during one slot, but various applications including a technique of using three RS symbols and using the OCC of spreading factor=4, etc. may be considered. Here, the RS symbol may be generated from a CAZAC sequence with a specific cyclic shift and may be transmitted in the form in which a specific OCC is applied (or multiplied) to a plurality of RS symbols of the time domain. In the example of FIG.

17, if it is assumed that 12 modulation symbols are used for each SC-FDMA symbol and each modulation symbol uses QPSK, the maximum number of bits which can be transmitted on each slot is 24 bits (=12×2). Thus, the number of bits which can be transmitted on two slots is a total of 48 bits.

For convenience of explanation, such a channel coding based technique for transmitting a plurality of ACKs/NACKs using the PUCCH format 2 or the E-PUCCH format is referred to as a "multi-bit ACK/NACK coding" transmission technique. The technique refers to transmitting an ACK/NACK coded block generated by channel-coding ACK/NACK information or DTX information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) technique applied to the existing Rel-8 TDD system, the technique may basically consider an implicit ACK/NACK selection technique that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an "ACK/NACK selection" technique using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-A TDD system may consider a technique (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a technique (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC). Characteristically, as a SF bundling technique, it may consider an "ACK-counter" technique which informs of the total number of ACKs (or the number of some ACKs) per CC for all PDSCHs or DL grant PDCCHs received for each CC. In this instance, a "multi-bit ACK/NACK coding" or an "ACK/NACK selection" based ACK/NACK transmission technique may be configurably applied according to a size of an ACK/NACK payload per UE, i.e., a size of an ACK/NACK payload for the full or bundled ACK/NACK transmission that is configured for each UE.

The next-generation wireless communication system has aimed to use a wide frequency band and support various services or requirements. For example, in New Radio (NR) requirements of 3GPP, in case of Ultra Reliable and Low Latency Communications (URLLC) that is one of representative scenarios, it may require low latency and high reliability requirements in which a user plane delay time of 0.5 ms and X-bite data have to be transmitted within an error rate of $10^{-5}$ within 1 ms.

A traffic of the URLLC has a file size within tens to hundreds of bytes and sporadically occurs, unlike enhanced Mobile Broadband (eMBB) with a large traffic capacity.

Thus, the eMBB requires a transmission capable of maximizing a transfer rate and minimizing an overhead of control information, whereas the URLLC requires a transmission technique with a short scheduling time unit and the reliability.

An assumption and/or a reference time unit used to transmit and receive a physical channel may be variously configured according an applied field or a type of traffic. The reference time may be a base unit for scheduling a specific physical channel. The reference time unit may vary depending on the number of symbols constituting a corresponding scheduling unit and/or a subcarrier spacing, or the like.

The present disclosure is described based on a slot and a mini-slot as the reference time unit for convenience of explanation. For example, the slot may be a scheduling base unit used in a normal data traffic (e.g., eMBB).

The mini-slot may have a shorter time duration than a slot in the time domain. The mini-slot may be a scheduling base unit used in a traffic of more special purpose or a communication scheme (e.g., URLLC, unlicensed band or millimeter wave, etc.).

However, this is merely an example. Even if the eMBB transmits and receives the physical channel based on the mini-slot and/or even if the URLLC or other communication schemes transmit and receive the physical channel based on the slot, it is apparent that implementations of the present disclosure can be extended and applied.

The present disclosure describes examples of operations of a UE when a TTI is encountered having a different direction (DL or UL) than a direction of a repetition transmission (hereinafter, first implementation). The present disclosure also describes examples of operations of a UE when a direction (DL or UL) indicated by a higher layer signal or system information block 1 (SIB 1) is different from a direction indicated by a physical layer signal (e.g., PDCCH) in a repetition transmission operation (hereinafter, second implementation). The present disclosure also describes examples of operations of a UE when the UE follows a direction (DL or UL) that is indicated by a higher layer signal in a repetition transmission operation (hereinafter, third implementation). The present disclosure further describes examples of operations of a UE if the UE fails in detection and/or decoding of a PDCCH when the UE follows a direction (DL or UL) that is indicated by a physical layer signal in a repetition transmission operation (hereinafter, fourth implementation).

The following implementations described in the present disclosure are merely distinguished for convenience of explanation, and thus it is apparent that a partial technique and/or a partial configuration, etc. of any implementation can be replaced by or combined with techniques and/or configurations, etc. of other implementations.

A slot, a subframe, a frame, etc. mentioned in the following implementations described in the present disclosure may correspond to detailed examples of a time unit used in a wireless communication system. That is, when implementations describes in the present disclosure are applied, the time units can be replaced by other time units applied to other wireless communication systems.

In case of transmission for services such as URLLC or transmission for a traffic requiring a tight block error rate (BLER), a latency, and/or reliability requirements, a time domain repetition may be considered. That is, a repetition in units of a transmission time interval (TTI), a slot, and/or a symbol may be applied to the corresponding channel for the purpose of high reliability and/or a short latency of a specific transport block (TB) and/or a code block (CB) (group). The repetition may be semi-persistent scheduling (SPS) transmission or PDCCH-less channel transmission similar to SPS, or may be a form similar to TTI bundling, or may be a form of grant-free UL channel repetition transmission transmitting uplink channel to resources previously configured via the higher layer signal considered in NR.

First Implementation

First, an operation example of a UE is described when a TTI of a different direction exists during a repetition transmission of a specific direction (DL or UL).

Examples described below are merely distinguished for convenience of explanation, and thus it is apparent that configuration of any example can be replaced by or combined with configurations of other examples.

Example 1

In case of TDD, the number of consecutive downlink (DL) or uplink (UL) TTIs may be less than a configured and/or indicated repetition number. In this case, if the UE waits until a next transmission opportunity of the same direction comes, a latency may increase. However, in case of requiring tight latency requirements, this may not be desirable. In case of a repetition due to dynamic scheduling, a base station (e.g., eNB) can control the repetition number at first. However, in case of a semi-static based repetition, it may be difficult for the base station to freely control the repetition number.

Accordingly, if a TTI of a different direction exists during a repetition for transmission of a specific direction (DL or UL), a rule may be defined, promised and/or configured so that the repetition stops. And/or, in this case, a transmission can be performed by a smaller number than a repetition transmission number required to meet specific reliability requirements. Therefore, if the number of consecutive DL or UL TTIs is less than the configured and/or indicated repetition number, a rule may be defined, promised and/or configured so that a large open-loop power control parameter (e.g., P_O, alpha) is applied to the repetition transmission. And/or, an increase/decrease value for a separate TPC accumulation for the case where the number of consecutive DL or UL TTIs is less than the configured and/or indicated repetition number may be defined and/or configured.

And/or, if TTI(s) of a different direction exist during a repetition for the transmission of a specific direction (DL or UL), a rule may be defined, promised and/or configured to determine whether to continue or stop the repetition depending on whether or not a gap generated by the TTI(s) is within a coherence time sufficient to apply DMRS bundling and/or DMRS sharing. For example, if it is decided that performance degradation when the DMRS bundling has performed may occur because of the gap generated by the TTI(s) of the different direction, the repetition may stop, and if not, the repetition may continue. In this instance, a maximum gap as a reference of the decision may be previously defined in units of TTI, slot, and/or symbol, or may be configured and/or indicated via a higher layer signal or a physical layer signal.

Example 2

If TTI(s) of a different direction exist during a repetition for transmission of a specific direction (DL or UL) (e.g., if UL, a special subframe, a short TTI within the special subframe, part of the special subframe, and/or an uplink pilot time slot (UpPTS) exist during DL repetition transmission), a rule may be defined, promised and/or configured so that the repetition excludes the TTI(s) of the corresponding different direction and again continues in the TTI of the corresponding direction.

For example, if a transmission direction of {D, D, D, S, U, D, D} is configured and/or indicated during a specific time interval, a rule may be defined, promised and/or configured so that the UE excludes S and/or U and performs first three DL transmissions and a sixth DL transmission if DL repetition starts at a first TTI and DL has to be transmitted a total of four times. Here, D may denote DL, U may denote UL, and S may denote a special subframe or a short TTI within a special subframe.

And/or, if TTI(s) of a different direction exists during a repetition transmission of a specific direction (DL or UL), it may be determined, depending on a length of a time duration corresponding to the TTI(s) of the different direction, whether the repetition is stopped or the repetition transmission skips a time duration corresponding to the TTI(s) of the different direction and again continues. For example, if the time duration is a predetermined length or more, the repetition may be stopped. Further, if the time duration is the predetermined length or less, the repetition transmission may skip the time duration corresponding to the TTI(s) of the different direction and may again continue.

And/or, if TTI(s) of a different direction exists during a repetition for transmission of a specific direction (DL or UL), it may be determined, depending on a TTI length, whether the repetition is stopped or the repetition transmission skips a time duration corresponding to the TTI(s) of the different direction and again continues. For example, since a latency may become too long for a TTI length (e.g., subframe) that is a specific length or more, the repetition may be stopped. Further, for a TTI length (e.g., slot) that is the specific length or less or below, the repetition transmission may skip a time duration corresponding to the TTI(s) of the different direction and again continue.

In the above-described examples 1 and 2, the special subframe or a (short) TTI belonging to the special subframe may be assumed as DL or UL depending on a length of a downlink pilot time slot (DwPTS) or an UpPTS (or depending on the number of symbols on which DL and/or UL is actually transmitted within a TTI). And/or, the special subframe or the (short) TTI belonging to the special subframe may be always assumed as a transmission of a different direction from a direction of a repetition channel irrespective of the length of the DwPTS or the UpPTS, and may be ignored when counting the number of repetition TTIs or may terminate and/or stop the repetition.

For example, if a slot-TTI is configured, it is determined, depending on a length of the DwPTS, whether a PDSCH transmission is supported on a second slot in a subframe. Hence, a rule may be defined so that a slot-TTI (e.g., a second slot of the DwPTS if a special subframe configuration 1, 2, 6, or 7 is configured) on which the PDSCH transmission is not supported is ignored when counting the repetition TTI number, and on the other hand, a slot-TTI (e.g., a second slot of the DwPTS if a special subframe configuration 3, 4, or 8 is configured) on which the PDSCH transmission is supported is included in the repetition TTI number counting and receives PDSCH being repeatedly transmitted.

Second Implementation

Next, an operation example of a UE is described when a direction indicated by a higher layer signal or system information block 1 (SIB 1) is different from a direction indicated by a physical layer signal (e.g., PDCCH) in a repetition transmission operation.

Examples described below are merely distinguished for convenience of explanation, and thus it is apparent that configuration of any example can be replaced by or combined with configurations of other examples.

Example 1

A rule may be defined, promised, and/or configured so that regarding a repetition for transmission of DL PDSCH (or UL PUSCH), the UE assumes that PDSCH corresponding to a repetition exists (or PUSCH is transmitted) only for a TTI, a symbol, and/or a time interval indicated as DL (or only for a TTI, a symbol, and/or a time interval indicated as UL) by a reference UL/DL configuration (e.g., eIMTA-HARQ-ReferenceConfig-r12) configured via a higher layer signal.

In this case, even if a TTI, a symbol, and/or a time interval, which are configured in a different direction from a link direction of a repetition transmission (e.g., which are configured as UL in case of PDSCH repetition transmission), are changed to the same link direction (e.g., even if UL TTI is changed to DL TTI during the PDSCH repetition) by the physical layer signal (e.g., PDCCH with CRC scrambled by eIMTA-RNTI) during the repetition, a rule may be defined, promised, and/or configured so that the UE assumes that the PDSCH corresponding to a repetition does not exist (or the PUSCH is not transmitted) in the corresponding TTI, symbol, and/or time interval.

In other words, a rule may be defined, promised, and/or configured so that the UE skips PDSCH decoding (or PUSCH transmission) corresponding to a repetition for the corresponding TTI, symbol, and/or time interval.

Example 2

A rule may be defined, promised, and/or configured so that regarding a repetition for transmission of DL PDSCH (or UL PUSCH), the UE assumes that PDSCH corresponding to a repetition exists (or PUSCH is transmitted) only for a TTI, a symbol, and/or a time interval indicated as DL (or only for a TTI, a symbol, and/or a time interval indicated as UL) by an UL/DL configuration by SIB 1.

In this case, even if a TTI, a symbol, and/or a time interval, which are configured in a different direction from a link direction of a repetition transmission (e.g., which are configured as UL in case of PDSCH repetition transmission), are changed to the same link direction (e.g., even if UL TTI is changed to DL TTI during the PDSCH repetition) by the physical layer signal (e.g., PDCCH with CRC scrambled by eIMTA-RNTI) during the repetition, a rule may be defined, promised, and/or configured so that the UE assumes that the PDSCH corresponding to a repetition does not exist (or the PUSCH is not transmitted) in the corresponding TTI, symbol, and/or time interval.

In other words, a rule may be defined, promised, and/or configured so that the UE skips PDSCH decoding (or PUSCH transmission) corresponding to a repetition for the corresponding TTI, symbol, and/or time interval.

Example 3

If regarding a repetition for transmission of DL PDSCH (or UL PUSCH), a symbol, a TTI, and/or a time of UL in an UL/DL configuration configured (semi-statically) by the higher layer signal or the SIB 1 are changed to DL (or if a symbol, a TTI, and/or a time of DL are changed to UL) by the physical layer signal (e.g., PDCCH with CRC scrambled by eIMTA-RNTI), a rule may be defined, promised, and/or configured so that the UE assumes that the PDSCH corresponding to a repetition exists (or the PUSCH is transmitted) even in the corresponding symbol, TTI, and/or time.

In other words, if a TTI, a symbol, and/or a time interval, which are configured in a different direction from a link direction of the repetition transmission (e.g., which are configured as UL in case of PDSCH repetition transmission) by the configuration of the higher layer signal or the SIB 1 during a repetition transmission for a link of a specific direction, are changed to the corresponding TTI, symbol, and/or time interval on a link of the same direction as the repetition transmission by the physical layer signal (e.g., PDCCH with CRC scrambled by eIMTA-RNTI), a rule may be defined, promised, and/or configured so that the UE assumes that the PDSCH corresponding to a repetition exists (or the PUSCH is transmitted) in the corresponding TTI, symbol, and/or time interval.

And/or, if the UE misses the physical layer signal or if an UL/DL configuration of the SIB 1 is different from a reference UL/DL configuration (e.g., eIMTA-HARQ-ReferenceConfig-r12) configured via the higher layer signal, a rule may be defined, promised, and/or configured so that the UE skips PDSCH decoding (or skips PUSCH transmission) for a TTI, a symbol, and/or a time interval, which are configured in a different direction from a link direction of the repetition transmission (e.g., which are configured as UL in case of PDSCH repetition transmission) according to configuration of the SIB 1 (i.e., the corresponding TTI, symbol, and/or time interval may not be counted as the repetition).

In this case, the UE may receive the PDSCH (or transmit the PUSCH) by a remaining number excluding the TTI, the symbol, and/or the time interval from the indicated total transmission number. As a result, the UE may receive the PDSCH (or transmit the PUSCH) by the number less than the indicated total transmission number.

In the above examples, DL may refer to including a "DwPTS" period (all or only a first slot) of a special subframe in addition to "DL". Further, UL may refer to including an "UpPTS" period of a special subframe in addition to "UL".

In addition, the above examples may be applied to only when an eIMTA operation is configured (e.g., when EIMTA-MainConfigServCell-r12 is configured) for carriers on which repetition transmission and reception of a specific link direction are configured, indicated, and/or scheduled.

Example 4

A rule may be defined so that the UE can assume that the same precoder is applied to a PDSCH transmission within two adjacent special subframes in order to enable coherent channel estimation for a repetition for transmission of DL PDSCH (or UL PUSCH).

If an UL/DL configuration configured (semi-statically) by the higher layer signal or the SIB 1 is changed by the physical layer signal (e.g., PDCCH with CRC scrambled by eIMTA-RNTI), it may be determined and/or configured whether or not the same precoder is applied on the basis of a special subframe according to the corresponding changed UL/DL configuration. That is, the UE can assume that the same precoder is applied to the PDSCH transmission within the two adjacent special subframes determined by the physical layer signal (e.g., PDCCH with CRC scrambled by eIMTA-RNTI).

Figure 21A:
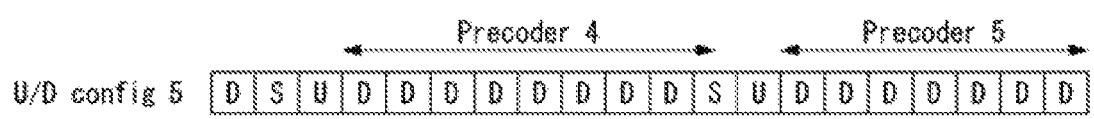
FIGS. 21A and 21B illustrate an example of a PDSCH transmission to which the same precoder will be applied when a UE misses a physical layer signal indicating a transmission direction.

And/or, if the UE misses the corresponding physical layer signal, the UE can assume that the same precoder is applied to the PDSCH transmission within the two adjacent special subframes on the basis of a special subframe according to the configuration of the SIB 1. As an example (of a kind of fallback operation), when UL/DL configuration 2 is configured by the SIB 1 and UL/DL configuration 5 is indicated by the PDCCH, the UE may assume a precoder to be applied to DL TTIs based on an UL/DL configuration indicated by the PDCCH as illustrated in FIG. 21A. On the other hand, when the UE misses the PDCCH, the UE may assume a precoder to be applied to DL TTIs based on an UL/DL configuration configured by the SIB 1 as illustrated in FIG. 21B.

Figure 21B:
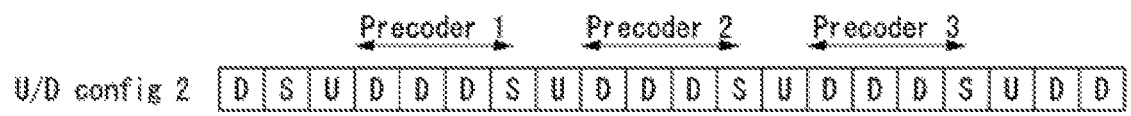

And/or, the UE may determine whether or not the same precoder is applied on the basis of a special subframe always according to the configuration of the SIB 1 (e.g., as illustrated in FIG. 21B), irrespective of the PDCCH. That is, the UE can assume that the same precoder is applied to the PDSCH transmission within the two adjacent special subframes determined always according to the configuration of the SIB 1.

Third Implementation

Next, an operation example of a UE is described when the UE follows a link direction (DL or UL) that is indicated by a higher layer signal in a repetition transmission operation.

In downlink scenarios, for repetition transmission of DL PDSCH, the UE may assume that a DL PDSCH corresponding to the repetition exists only for a transmission time unit (e.g., TTI, a symbol, and/or a time interval) that is indicated as having a DL direction by a UL/DL configuration (e.g., subframeAssignment) through a higher layer signal. However, scenarios may arise during the DL PDSCH repetition transmission where a particular transmission time unit is configured in a UL direction which is different from the DL direction of the PDSCH repetition transmission. In such scenarios, a rule may be defined, promised, and/or configured so that the UE assumes that the DL PDSCH corresponding to a repetition does not exist in that particular transmission time unit having the UL direction. This may be true even if the particular transmission time unit is dynamically changed by a physical layer signal to be the same DL direction as the PDSCH repetition transmission (e.g., the physical layer signal may be a PDCCH with CRC scrambled by eIMTA-RNTI).

Analogously, in uplink scenarios, for repetition transmission of UL PUSCH, the UE may assume that a UL PUSCH corresponding to the repetition is transmitted only for a transmission time unit that is indicated as having a UL direction by the UL/DL configuration (e.g., subframeAssignment) through the higher layer signal. However, analogous to the downlink case, scenarios may arise during the UL PUSCH repetition transmission where a particular transmission time unit is configured in a DL direction which is different from the UL direction of the PUSCH repetition transmission. In such scenarios, analogous to the downlink case, a rule may be defined, promised, and/or configured so that the UE assumes that the UL PUSCH corresponding to a repetition is not transmitted in that particular transmission time unit having the DL direction. This may be true even if the particular transmission time unit is dynamically changed by a physical layer signal to be the same UL direction as the PUSCH repetition transmission (e.g., the physical layer signal may be a PDCCH with CRC scrambled by eIMTA-RNTI).

In such uplink and downlink scenarios, the UE may assume various operations as in the following examples.

Examples described below are merely distinguished for convenience of explanation, and thus it is apparent that configuration of any example can be replaced by or combined with configurations of other examples.

Example 1

In a TTI, a symbol, and/or a time interval, which are configured in a different direction from a link direction of a repetition transmission (e.g., which are configured as UL in case of PDSCH repetition transmission) and are changed to the same link direction by the physical layer signal (e.g., PDCCH with CRC scrambled by eIMTA-RNTI) during a repetition, any control channel is not monitored or decoded, or is discarded. For example, in a TTI which has been configured as UL by the higher layer signal subframeAssignment but indicated and/or changed as DL by the physical layer signal (e.g., PDCCH with CRC scrambled by eIMTA-RNTI) during the PDSCH repetition, any control channel is not monitored or decoded, or is discarded. In particular, the TTI, the symbol, and/or the time interval may be a TTI, a symbol, and/or a time interval in which the PDSCH corresponding to the actual repetition is not received. That is, the TTI, the symbol, and/or the time interval may be a TTI, a symbol, and/or a time interval that are not counted as a TTI, a symbol, and/or a time interval corresponding to the repetition.

Example 2

In a TTI, a symbol, and/or a time interval, which are configured in a different direction from a link direction of a repetition transmission (e.g., which are configured as UL in case of PDSCH repetition transmission) and are changed to the same link direction by the physical layer signal (e.g., PDCCH with CRC scrambled by eIMTA-RNTI) during a repetition, control channels other than "control channel including DCI with CRC scrambled by SI-RNTI, P-RNTI, SPS C-RNTI, RA-RNTI, TPC-PUCCH-RNTI, and/or TPC-PUSCH-RNTI" are not monitored or decoded, or are discarded. For example, in a TTI which has been configured as UL by the higher layer signal subframeAssignment but indicated and/or changed as DL by the physical layer signal (e.g., PDCCH with CRC scrambled by eIMTA-RNTI) during the PDSCH repetition, control channels other than "control channel including DCI with CRC scrambled by SI-RNTI, P-RNTI, SPS C-RNTI, RA-RNTI, TPC-PUCCH-RNTI, and/or TPC-PUSCH-RNTI" are not monitored or decoded, or are discarded.

That is, a rule may be defined, promised, and/or configured so that the UE monitors and/or decodes only "the control channel including DCI with CRC scrambled by SI-RNTI, P-RNTI, SPS C-RNTI, RA-RNTI, TPC-PUCCH-RNTI, and/or TPC-PUSCH-RNTI" in the corresponding TTI, symbol, and/or time interval. In particular, the TTI, the symbol, and/or the time interval may be a TTI, a symbol, and/or a time interval in which the PDSCH corresponding to the actual repetition is not received. That is, the TTI, the symbol, and/or the time interval may be a TTI, a symbol, and/or a time interval that are not counted as a TTI, a symbol, and/or a time interval corresponding to the repetition.

Example 3

In a TTI, a symbol, and/or a time interval, which are configured in a different direction from a link direction of a repetition transmission (e.g., in which UL is configured in case of PDSCH repetition transmission) and are changed to the same link direction by the physical layer signal (e.g., PDCCH with CRC scrambled by eIMTA-RNTI) during a repetition, any control channel scheduling the PDSCH is not monitored or decoded, or is discarded. For example, in a TTI which has been configured as UL by the higher layer signal subframeAssignment but indicated and/or changed as DL by the physical layer signal (e.g., PDCCH with CRC scrambled by eIMTA-RNTI) during the PDSCH repetition, any control channel scheduling the PDSCH is not monitored or decoded, or is discarded.

In particular, the TTI, the symbol, and/or the time interval may be a TTI, a symbol, and/or a time interval in which the PDSCH corresponding to the actual repetition is not received. That is, the TTI, the symbol, and/or the time interval may be a TTI, a symbol, and/or a time interval that are not counted as a TTI, a symbol, and/or a time interval corresponding to the repetition.

If a new PDSCH is scheduled in a state where the repetition is not terminated, a transmission timing of HARQ-ACK for the newly scheduled PDSCH may be earlier than a transmission timing of HARQ-ACK for the repetition. Since this violates a rule, that is configured so that the processing for a PDSCH being earlier received is first performed in a decoding and HARQ-ACK encoding operation of the UE, and/or a higher priority is given to the repetition, this may be undesirable. Thus, this example may be to prevent this.

This example may include that the UE performs a monitoring operation and/or a decoding operation on a control channel scheduling the PUSCH and/or a control channel (e.g., group-common PDCCH including TPC command, PDCCH indicating DL/UL configuration, and/or PDCCH indicating a DL/UL slot format, etc.) configuring and/or indicating operations other than the scheduling of the PDSCH in the above situation.

This example may be expressed as follows.

For a TDD cell, k consecutive DL subframes may include k DL subframes or special subframes according to an UL/DL configuration indicated by a higher layer parameter subframeAssignment for a servicing cell.

If the UE is configured with a higher layer parameter EIMTA-MainConfigServCell-r12, the UE discards any PDCCH and/or EPDCCH for PDSCH data transmission in a subframe i which has been indicated as an UL subframe by the higher layer parameter subframeAssignment but indicated as a DL subframe by a PDCCH with CRC scrambled by eIMTA-RNTI including an UL/DL configuration for the servicing cell.

Example 4

Consider again the scenario where a particular transmission time unit (e.g., a TTI, a symbol, and/or a time interval) is configured in a different direction from a link direction of a repetition transmission (e.g., the time unit is configured as UL in case of PDSCH repetition transmission, or DL in case of PUSCH repetition transmission). Further consider again that the link direction of that particular transmission time unit is dynamically changed by a physical layer signal to be the same link direction as the repetition transmission (e.g., the physical layer signal may be a PDCCH with CRC scrambled by eIMTA-RNTI). In such a scenario, according to this example operation, a control channel that schedules a repetition for TBs (other than a TB being currently repeated) will not be monitored or decoded, or will be discarded, or will not be expected in that particular transmission time unit.

For example, in a transmission time unit which has been configured as UL by the higher layer signal subframeAssignment but is indicated and/or changed to be DL by the physical layer signal (e.g., PDCCH with CRC scrambled by eIMTA-RNTI) during the PDSCH repetition, a control channel scheduling a repetition for TBs other than a TB being currently repeated will not be monitored or decoded, or will be discarded, or will not be expected in that transmission time unit.

In particular, the transmission time unit may be one in which the PDSCH corresponding to the actual repetition is not received. That is, the transmission time unit may be one that is not counted as a transmission time unit corresponding to the repetition. Because other PDSCH being repeated other than a PDSCH being repeated cannot be transmitted in parallel in the same serving cell, this example may be designed to prevent this. Hence, this example may be an operation of giving a higher priority to an ongoing PDSCH repetition transmission and protecting it.

Fourth Implementation

Next, an operation example of a UE is described if the UE fails in PDCCH detection and/or decoding when following a direction indicated by a physical layer signal in a repetition transmission operation.

When a rule is defined so that regarding a repetition for DL PDSCH (or UL PUSCH) transmission, the UE assumes that PDSCH corresponding to a repetition exists (or PUSCH is transmitted) for a TTI, a symbol, and/or a time interval indicated as DL and/or special (or a TTI, a symbol, and/or a time interval indicated as UL and/or special) by an UL/DL configuration (e.g., PDCCH with CRC scrambled by eIMTA-RNTI) by a physical layer signal, there may be a difference in the understanding of UL/DL configuration between the UE and a base station if the UE fails to detect (and/or decode) the PDCCH.

Figure 22A:
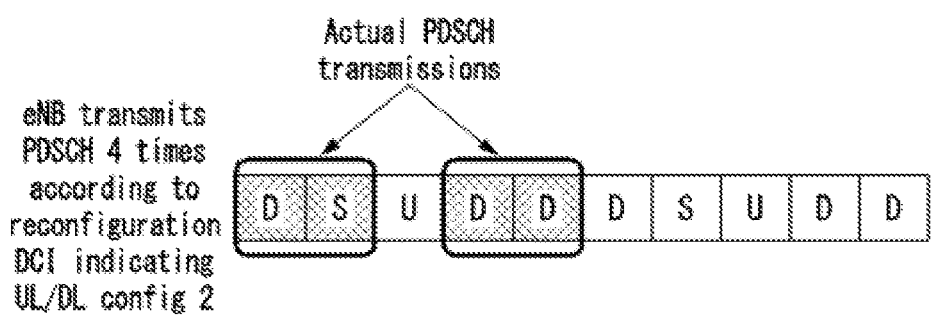
FIGS. 22A and 22B illustrate an example of a problem occurring when a UE fails to detect a physical layer signal if the UE follows a transmission direction indicated by the physical layer signal.
Figure 22B:
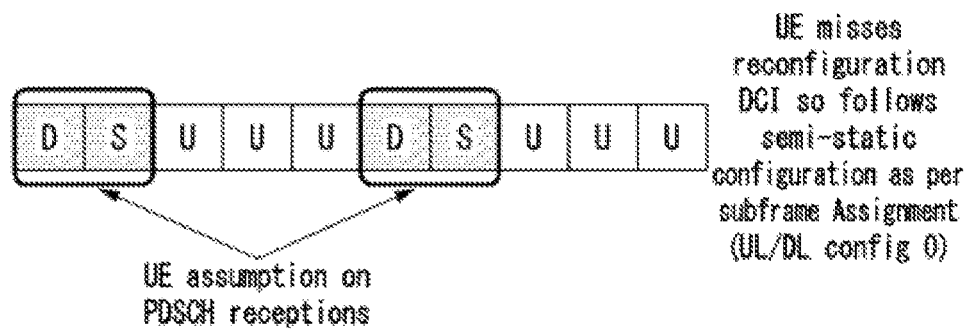

For example, if the UE fails to detect (and/or decode) the corresponding physical layer signal when the UL/DL configuration has been configured as UL/DL configuration 0 by a higher layer signal (e.g., subframeAssignment) and is indicated as UL/DL configuration 2 by the physical layer signal (e.g., PDCCH with CRC scrambled by eIMTA-RNTI), the base station may transmit the PDSCH corresponding to a repetition in subframes #0, 1, 3, and 4 as illustrated in FIG. 22A, but the UE may intend to receive the corresponding repetition in subframes #0, 1, 5, and 6 as illustrated in FIG. 22B. Such a situation can reduce reliability of DL data to which the repetition is applied. In particular, when the UE combines signals received in the subframes #0, 1, 5, and 6 and intends to decode the DL data, a reliability performance can be greatly reduced. Here, "# number" may represent an index of a subframe.

Accordingly, in order to prevent this, when the UE fails to detect (and/or decode) the physical layer signal (e.g., PDCCH with CRC scrambled by eIMTA-RNTI) indicating a UL/DL configuration change, a rule may be defined, promised, and/or configured to terminate PDSCH reception for the repetition after a first flexible TTI within a repetition window (i.e., not to receive PDSCH corresponding to the repetition after the first flexible TTI or not to expect the PDSCH).

Figure 23A:
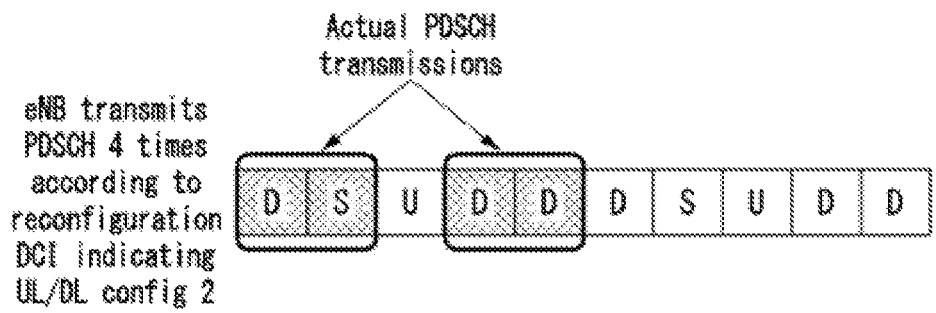
FIGS. 23A and 23B illustrate an example of improving reliability of transmission and reception when a UE fails to detect a physical layer signal if the UE follows a transmission direction indicated by the physical layer signal.
Figure 23B:
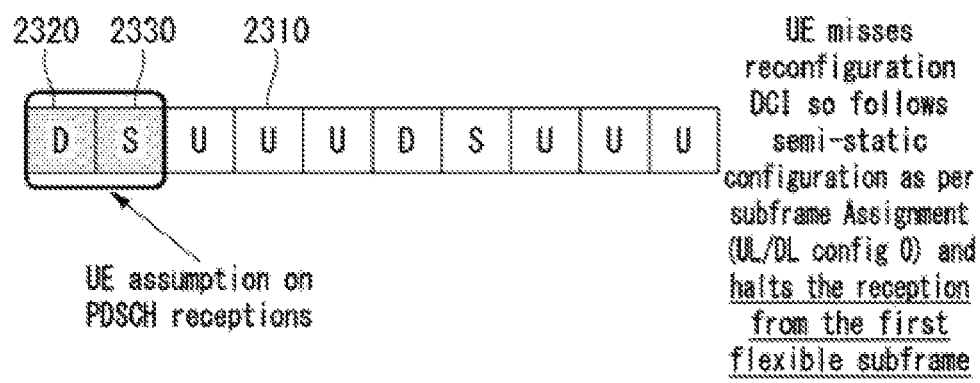

In other words, as illustrated in FIG. 23B, when the UE fails to detect (and/or decode) the physical layer signal (e.g., PDCCH with CRC scrambled by eIMTA-RNTI) indicating the UL/DL configuration change, a rule may be defined, promised, and/or configured to receive PDSCH corresponding to the repetition only in DL and/or special TTIs 2320 and 2330 before a first flexible TTI 2310. Here, the flexible TTI may refer to a TTI which has been configured as UL and/or special by the higher layer signal subframeAssignment but indicated and/or changed as DL by a PDCCH with CRC scrambled by the physical layer signal eIMTA-RNTI.

In this case, a rule may be defined, promised, and/or configured so that the UE determines a HARQ-ACK transmission timing based on last PDSCH reception and transmits HARQ-ACK. Because the base station cannot know whether or not the UE has properly received the physical layer signal, the base station can perform blind decoding for HARQ-ACK reception at the HARQ-ACK transmission timing based on the last PDSCH reception determined by the rule and a HARQ-ACK transmission timing when the UE has properly received PDSCH corresponding to all the repetitions.

Since examples of implementations described by the present disclosure may be included in one of examples for implementing the present disclosure, it is apparent that the example can be regarded as a kind of implementation.

As mentioned above, implementations described by the present disclosure may be independently implemented, or some implementations may be combined and implemented. A rule may be defined, promised, and/or configured so that the base station informs the UE of information about whether implementations are applied (or information about rules of the implementations) via previously defined signaling (e.g., physical layer signaling and/or higher layer signaling, etc.).

Figure 24:
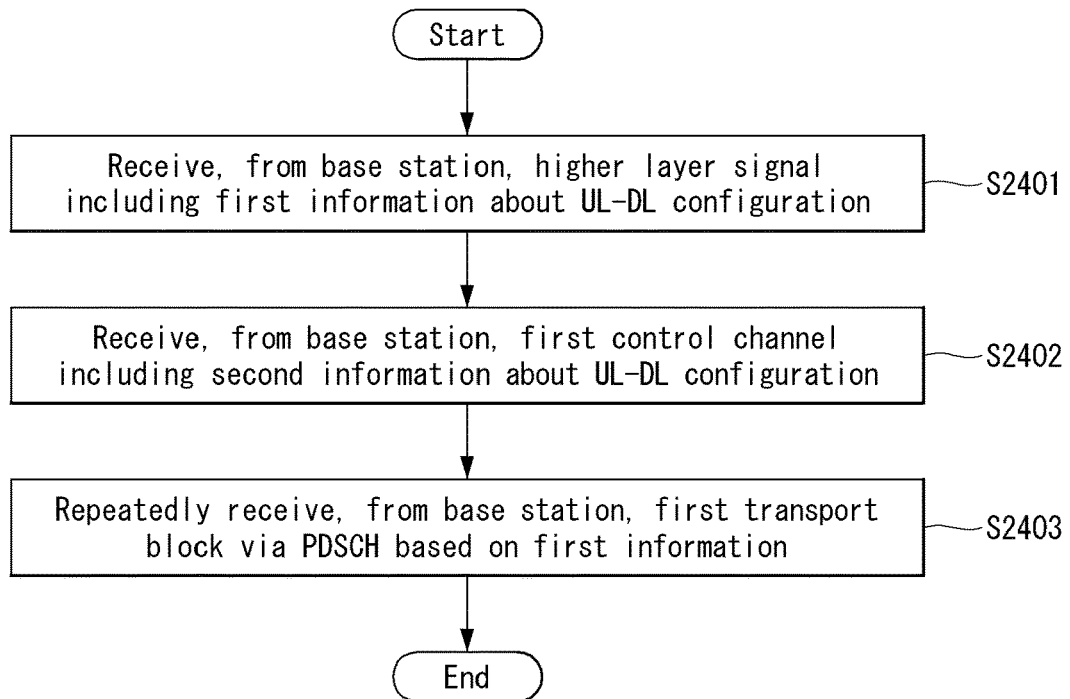
FIG. 24 is a flow chart illustrating an example of an operation of a user equipment described by the present disclosure.

FIG. 24 is a flow chart illustrating an operation example of a UE described by the present disclosure.

Referring to FIG. 24, a UE may receive, from a base station (BS), a higher layer signal including first information for an uplink (UL)-downlink (DL) configuration in S2401. For example, the first information may be a higher layer parameter subframeAssignment.

The higher layer signal may further include information (e.g., higher layer parameter EIMTA-MainConfigServCell-r12) for a configuration of an enhanced interference mitigation and traffic adaptation (eIMTA) operation.

Next, the UE may receive, from the base station, a first control channel including second information (e.g., UL/DL configuration indication) for the UL-DL configuration in S2402.

For example, the first control channel may be a physical downlink control channel (PDCCH).

The first control channel may be a PDCCH with CRC scrambled by eIMTA-radio network temporary identifier (RNTI).

Next, the UE may repeatedly receive, from the base station, a first transport block (TB) via the PDSCH based on the first information in S2403.

For example, the UE may check a transmission direction (uplink or downlink) of each of transmission time intervals (TTIs) included in a radio frame based on the first information. The UE may repeatedly receive the first TB in a DL TTI via the PDSCH based on the first information. Here, the TTI may be referred to as a transmission time unit.

That is, the UE may assume and/or expect that PDSCH exists only for a TTI (or a symbol, a time interval) indicated as DL by the first information. For example, the UE may assume and/or expect that repeated PDSCH does not exist in a TTI (or a symbol, a time interval) changed and/or indicated as DL by the second information during a PDSCH repetition reception based on the first information and may repeatedly receive (and/or monitor, decode) the PDSCH only in a TTI indicated as DL by the first information.

Characteristically, if a TTI indicated as UL by the first information is indicated as DL by the second information, a second control channel scheduling a PDSCH repetition for a second TB may be discarded in the TTI. For example, the second control channel may be PDCCH or an enhanced physical downlink control channel (EPDCCH).

Here, the TTI may be a subslot, a slot, a subframe or a special subframe, one or more symbols, or a specific time interval.

For example, the UE may not monitor (and/or decode) or may discard the second control channel scheduling the repetition of the second TB in a TTI, that is indicated as UL by the first information during the repeated reception of the first TB and is changed and/or indicated as DL by the second information, and may continuously and repeatedly receive the first TB. Here, the second TB may be different from the first TB.

Hence, the present disclosure can prevent a repetition of PDSCHs other than a PDSCH being repeated in the same serving cell and can perform a prioritization and protection operation on a currently ongoing PDSCH repetition.

And/or, if a TTI indicated as UL by the first information is indicated as DL by the second information, any control channel may not be monitored (and/or decoded) or may be discarded in the TTI.

And/or, if a TTI indicated as UL by the first information is indicated as DL by the second information, only a control channel including downlink control information (DCI) with CRC scrambled by a specific radio network temporary identifier (RNTI) may be monitored and/or decoded in the TTI. For example, the specific RNTI may be system information (SI)-RNTI, paging (P)-RNTI, semi-persistent scheduling (SPS) cell (C)-RNTI, random access (RA)-RNTI, transmit power control (TPC)-physical uplink control channel (PUCCH)-RNTI, and/or TPC-physical uplink shared channel (PUSCH)-RNTI.

In other words, control channels other than the control channel including DCI with CRC scrambled by the specific RNTI may not be monitored (and/or decoded) or may be discarded in the TTI.

And/or, if a TTI indicated as UL by the first information is indicated as DL by the second information, any control channel scheduling the PDSCH may not be monitored (and/or decoded) or may be discarded in the TTI.

That is, if a TTI indicated as UL by the first information is indicated as DL by the second information, a control channel scheduling the PUSCH and/or a control channel (e.g., group-common PDCCH including TPC command, PDCCH indicating DL/UL configuration, or PDCCH indicating a DL/UL slot format, etc.) configuring and/or indicating operations other than the scheduling of the PDSCH may be monitored and/or decoded in the TTI.

Hence, the present disclosure can prevent a transmission timing of HARQ-ACK for a newly scheduled PDSCH from being earlier than a transmission timing of HARQ-ACK for a PDSCH being repeated when the new PDSCH is scheduled in a state where the repetition is not terminated. That is, the present disclosure has an effect of giving a high priority to the PDSCH being earlier repeated.

The present disclosure can improve reliability and a latency performance of a transmission and reception operation of PDSCH repetition through the above-described examples.

In the present disclosure, the above-described implementations and examples have been described focusing on the operations implemented in a situation of DL repetition transmission (e.g., PDSCH), but are not limited thereto. For example, the above-described implementations and examples can be implemented by the UE and/or the BS even in UL repetition transmission (e.g., PUSCH).

Since the operation example of the UE described with reference to FIG. 24 is the same as the operation example of the UE described with reference to FIGS. 1 to 23, a detailed description thereof is omitted.

Figure 26:
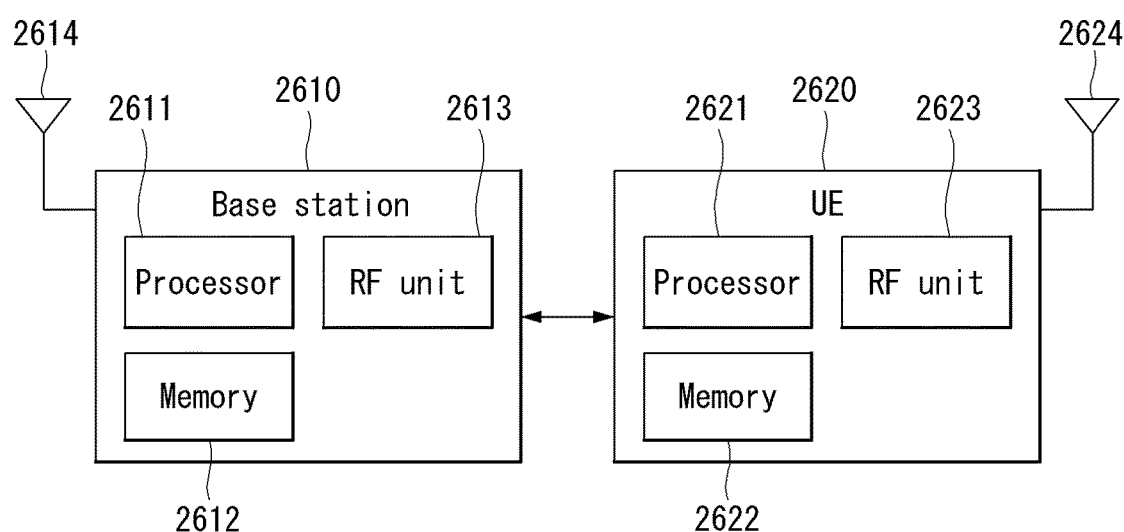
FIG. 26 illustrates an example of a block configuration diagram of a wireless communication device to which implementations of the present disclosure are applicable.

In this regard, the above-described operation of the UE may be specifically implemented by a UE 2620 illustrated in FIG. 26. For example, the above-described operation of the UE may be performed by a processor 2621 and/or a RF unit 2623.

Referring to FIG. 26, the processor 2621 may receive, from a base station (BS), a higher layer signal including first information for an uplink (UL)-downlink (DL) configuration through the RF unit 2623 (S2401). For example, the first information may be a higher layer parameter subframeAssignment.

The higher layer signal may further include information (e.g., higher layer parameter EIMTA-MainConfigServCell-r12) for a configuration of an enhanced interference mitigation and traffic adaptation (eIMTA) operation.

Next, the processor 2621 may receive, from the base station, a first control channel including second information (e.g., UL/DL configuration indication) for the UL-DL configuration through the RF unit 2623 (S2402).

For example, the first control channel may be a physical downlink control channel (PDCCH).

The first control channel may be a PDCCH with CRC scrambled by eIMTA-radio network temporary identifier (RNTI).

Next, the processor 2621 may repeatedly receive, from the base station, a first transport block (TB) via the PDSCH based on the first information through the RF unit 2623 (S2403).

For example, the UE may check a transmission direction (uplink or downlink) of each of transmission time intervals (TTIs) included in a radio frame based on the first information. The UE may repeatedly receive the first TB in a DL TTI via the PDSCH based on the first information.

That is, the UE may assume and/or expect that PDSCH exists only for a TTI (or a symbol, a time interval) indicated as DL by the first information. For example, the UE may assume and/or expect that repeated PDSCH does not exist in a TTI (or a symbol, a time interval) changed and/or indicated as DL by the second information during a PDSCH repetition reception based on the first information and may repeatedly receive (and/or monitor, decode) the PDSCH only in a TTI indicated as DL by the first information.

Characteristically, if a TTI indicated as UL by the first information is indicated as DL by the second information, a second control channel scheduling a PDSCH repetition for a second TB may be discarded in the TTI. For example, the second control channel may be PDCCH or an enhanced physical downlink control channel (EPDCCH).

Here, the TTI may be a subslot, a slot, a subframe or a special subframe, one or more symbols, or a specific time interval.

For example, the UE may not monitor (and/or decode) or may discard the second control channel scheduling the repetition of the second TB in a TTI, that is indicated as UL by the first information during the repeated reception of the first TB and is changed and/or indicated as DL by the second information, and may continuously and repeatedly receive the first TB. Here, the second TB may be different from the first TB.

Hence, the present disclosure can prevent a repetition of PDSCHs other than a PDSCH being repeated in the same serving cell and can perform a prioritization and protection operation on a currently ongoing PDSCH repetition.

And/or, if a TTI indicated as UL by the first information is indicated as DL by the second information, any control channel may not be monitored (and/or decoded) or may be discarded in the TTI.

And/or, if a TTI indicated as UL by the first information is indicated as DL by the second information, only a control channel including downlink control information (DCI) with CRC scrambled by a specific radio network temporary identifier (RNTI) may be monitored and/or decoded in the TTI. For example, the specific RNTI may be system information (SI)-RNTI, paging (P)-RNTI, semi-persistent scheduling (SPS) cell (C)-RNTI, random access (RA)-RNTI, transmit power control (TPC)-physical uplink control channel (PUCCH)-RNTI, and/or TPC-physical uplink shared channel (PUSCH)-RNTI.

In other words, control channels other than the control channel including DCI with CRC scrambled by the specific RNTI may not be monitored (and/or decoded) or may be discarded in the TTI.

And/or, if a TTI indicated as UL by the first information is indicated as DL by the second information, any control channel scheduling the PDSCH may not be monitored (and/or decoded) or may be discarded in the TTI.

That is, if a TTI indicated as UL by the first information is indicated as DL by the second information, a control channel scheduling the PUSCH and/or a control channel (e.g., group-common PDCCH including TPC command, PDCCH indicating DL/UL configuration, or PDCCH indicating a DL/UL slot format, etc.) configuring and/or indicating operations other than the scheduling of the PDSCH may be monitored and/or decoded in the TTI.

Hence, the present disclosure can prevent a transmission timing of HARQ-ACK for a newly scheduled PDSCH from being earlier than a transmission timing of HARQ-ACK for a PDSCH being repeated when the new PDSCH is scheduled in a state where the repetition is not terminated. That is, the present disclosure has an effect of giving a high priority to the PDSCH being earlier repeated.

The present disclosure can improve reliability and a latency performance of a transmission and reception operation of PDSCH repetition through the above-described examples.

In the present disclosure, the above-described implementations and examples have been described focusing on the operations implemented in a situation of DL repetition transmission (e.g., PDSCH), but are not limited thereto. For example, the above-described implementations and examples can be implemented by the UE and/or the BS even in UL repetition transmission (e.g., PUSCH).

Since the operation of the UE described with reference to FIG. 26 is the same as the operation of the UE described with reference to FIGS. 1 to 24, a detailed description thereof is omitted.

Figure 25:
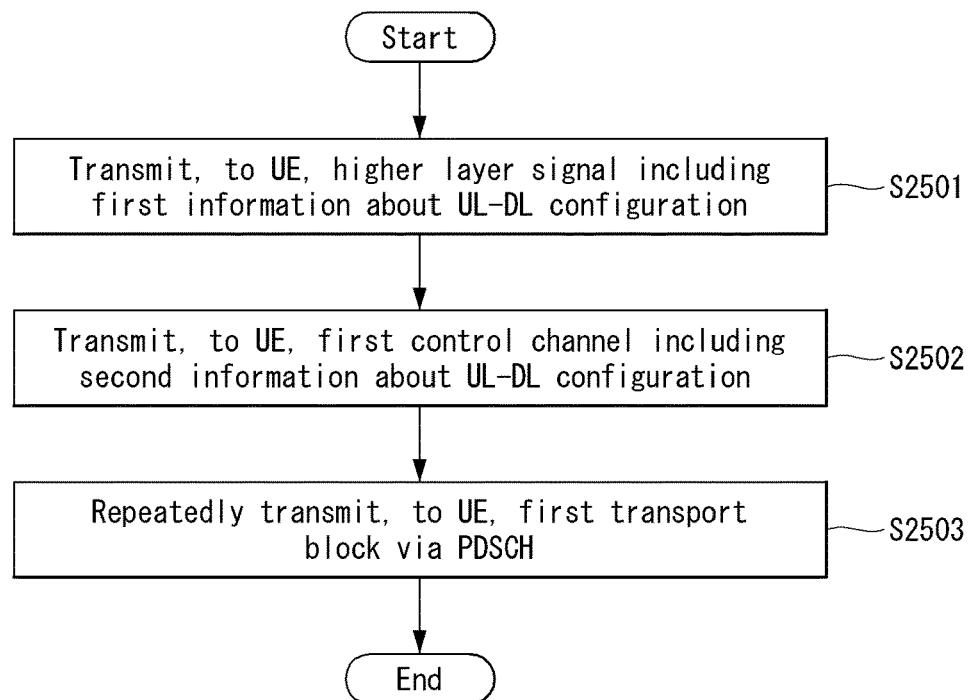
FIG. 25 is a flow chart illustrating an example of an operation of a base station described by the present disclosure.

FIG. 25 is a flow chart illustrating an operation example of a base station described by the present disclosure.

Referring to FIG. 25, a base station may transmit, to a UE, a higher layer signal including first information for an uplink (UL)-downlink (DL) configuration in S2501. For example, the first information may be a higher layer parameter subframeAssignment.

The higher layer signal may further include information (e.g., higher layer parameter EIMTA-MainConfigServCell-r12) for a configuration of an enhanced interference mitigation and traffic adaptation (eIMTA) operation.

Next, the base station may transmit, to the UE, a first control channel including second information (e.g., UL/DL configuration indication) for the UL-DL configuration in S2502.

For example, the first control channel may be a physical downlink control channel (PDCCH).

The first control channel may be a PDCCH with CRC scrambled by eIMTA-radio network temporary identifier (RNTI).

Next, the base station may repeatedly transmit, to the UE, a first transport block (TB) via the PDSCH in S2503.

For example, the UE may check a transmission direction (uplink or downlink) of each of transmission time intervals (TTIs) included in a radio frame based on the first information. The UE may repeatedly receive the first TB in a DL TTI via the PDSCH based on the first information.

That is, the UE may assume and/or expect that PDSCH exists only for a TTI (or a symbol, a time interval) indicated as DL by the first information. For example, the UE may assume and/or expect that repeated PDSCH does not exist in a TTI (or a symbol, a time interval) changed and/or indicated as DL by the second information during a PDSCH repetition reception based on the first information and may repeatedly receive (and/or monitor, decode) the PDSCH only in a TTI indicated as DL by the first information.

Characteristically, if a TTI indicated as UL by the first information is indicated as DL by the second information, a second control channel scheduling a PDSCH repetition for a second TB may be discarded in the TTI. For example, the second control channel may be PDCCH or an enhanced physical downlink control channel (EPDCCH).

Here, the TTI may be a subslot, a slot, a subframe or a special subframe, one or more symbols, or a specific time interval.

For example, the UE may not monitor (and/or decode) or may discard the second control channel scheduling the repetition of the second TB in a TTI, that is indicated as UL by the first information during the repeated reception of the first TB and is changed and/or indicated as DL by the second information, and may continuously and repeatedly receive the first TB. Here, the second TB may be different from the first TB.

Hence, the present disclosure can prevent a repetition of PDSCHs other than a PDSCH being repeated in the same serving cell and can perform a prioritization and protection operation on a currently ongoing PDSCH repetition.

And/or, if a TTI indicated as UL by the first information is indicated as DL by the second information, any control channel may not be monitored (and/or decoded) or may be discarded in the TTI.

And/or, if a TTI indicated as UL by the first information is indicated as DL by the second information, only a control channel including downlink control information (DCI) with CRC scrambled by a specific radio network temporary identifier (RNTI) may be monitored and/or decoded in the TTI. For example, the specific RNTI may be system information (SI)-RNTI, paging (P)-RNTI, semi-persistent scheduling (SPS) cell (C)-RNTI, random access (RA)-RNTI, transmit power control (TPC)-physical uplink control channel (PUCCH)-RNTI, and/or TPC-physical uplink shared channel (PUSCH)-RNTI.

In other words, control channels other than the control channel including DCI with CRC scrambled by the specific RNTI may not be monitored (and/or decoded) or may be discarded in the TTI.

And/or, if a TTI indicated as UL by the first information is indicated as DL by the second information, any control channel scheduling the PDSCH may not be monitored (and/or decoded) or may be discarded in the TTI.

That is, if a TTI indicated as UL by the first information is indicated as DL by the second information, a control channel scheduling the PUSCH and/or a control channel (e.g., group-common PDCCH including TPC command, PDCCH indicating DL/UL configuration, or PDCCH indicating a DL/UL slot format, etc.) configuring and/or indicating operations other than the scheduling of the PDSCH may be monitored and/or decoded in the TTI.

Hence, the present disclosure can prevent a transmission timing of HARQ-ACK for a newly scheduled PDSCH from being earlier than a transmission timing of HARQ-ACK for a PDSCH being repeated when the new PDSCH is scheduled in a state where the repetition is not terminated. That is, the present disclosure has an effect of giving a high priority to the PDSCH being earlier repeated.

The present disclosure can improve reliability and a latency performance of a transmission and reception operation of PDSCH repetition through the above-described examples.

In the present disclosure, the above-described implementations and examples have been described focusing on the operations implemented in a situation of DL repetition transmission (e.g., PDSCH), but are not limited thereto. For example, the above-described implementations and examples can be implemented by the UE and/or the BS even in UL repetition transmission (e.g., PUSCH).

Since the operation example of the base station described with reference to FIG. 25 is the same as the operation example of the base station described with reference to FIGS. 1 to 24, a detailed description thereof is omitted.

In this regard, the above-described operation of the base station may be specifically implemented by a base station 2610 illustrated in FIG. 26. For example, the above-described operation of the base station may be performed by a processor 2611 and/or a RF unit 2613.

Referring to FIG. 26, the processor 2611 may transmit, to a UE, a higher layer signal including first information for an uplink (UL)-downlink (DL) configuration through the RF unit 2613 (S2501). For example, the first information may be a higher layer parameter subframeAssignment.

The higher layer signal may further include information (e.g., higher layer parameter EIMTA-MainConfigServCell-r12) for a configuration of an enhanced interference mitigation and traffic adaptation (eIMTA) operation.

Next, the processor 2611 may transmit, to the UE, a first control channel including second information for the UL-DL configuration through the RF unit 2613 (S2502).

For example, the first control channel may be a physical downlink control channel (PDCCH).

The first control channel may be a PDCCH with CRC scrambled by eIMTA-radio network temporary identifier (RNTI).

Next, the processor 2611 may repeatedly transmit, to the UE, a first transport block (TB) via the PDSCH through the RF unit 2613 (S2503).

For example, the UE may check a transmission direction (uplink or downlink) of each of transmission time intervals (TTIs) included in a radio frame based on the first information. The UE may repeatedly receive the first TB in a DL TTI via the PDSCH based on the first information.

That is, the UE may assume and/or expect that PDSCH exists only for a TTI (or a symbol, a time interval) indicated as DL by the first information. For example, the UE may assume and/or expect that repeated PDSCH does not exist in a TTI (or a symbol, a time interval) changed and/or indicated as DL by the second information during a PDSCH repetition reception based on the first information and may repeatedly receive (and/or monitor, decode) the PDSCH only in a TTI indicated as DL by the first information.

Characteristically, if a TTI indicated as UL by the first information is indicated as DL by the second information, a second control channel scheduling a PDSCH repetition for a second TB may be discarded in the TTI. For example, the second control channel may be PDCCH or an enhanced physical downlink control channel (EPDCCH).

Here, the TTI may be a subslot, a slot, a subframe or a special subframe, one or more symbols, or a specific time interval.

For example, the UE may not monitor (and/or decode) or may discard the second control channel scheduling the repetition of the second TB in a TTI, that is indicated as UL by the first information during the repeated reception of the first TB and is changed and/or indicated as DL by the second information, and may continuously and repeatedly receive the first TB. Here, the second TB may be different from the first TB.

Hence, the present disclosure can prevent a repetition of PDSCHs other than a PDSCH being repeated in the same serving cell and can perform a prioritization and protection operation on a currently ongoing PDSCH repetition.

And/or, if a TTI indicated as UL by the first information is indicated as DL by the second information, any control channel may not be monitored (and/or decoded) or may be discarded in the TTI.

And/or, if a TTI indicated as UL by the first information is indicated as DL by the second information, only a control channel including downlink control information (DCI) with CRC scrambled by a specific radio network temporary identifier (RNTI) may be monitored and/or decoded in the TTI. For example, the specific RNTI may be system information (SI)-RNTI, paging (P)-RNTI, semi-persistent scheduling (SPS) cell (C)-RNTI, random access (RA)-RNTI, transmit power control (TPC)-physical uplink control channel (PUCCH)-RNTI, and/or TPC-physical uplink shared channel (PUSCH)-RNTI.

In other words, control channels other than the control channel including DCI with CRC scrambled by the specific RNTI may not be monitored (and/or decoded) or may be discarded in the TTI.

And/or, if a TTI indicated as UL by the first information is indicated as DL by the second information, any control channel scheduling the PDSCH may not be monitored (and/or decoded) or may be discarded in the TTI.

That is, if a TTI indicated as UL by the first information is indicated as DL by the second information, a control channel scheduling the PUSCH and/or a control channel (e.g., group-common PDCCH including TPC command, PDCCH indicating DL/UL configuration, or PDCCH indicating a DL/UL slot format, etc.) configuring and/or indicating operations other than the scheduling of the PDSCH may be monitored and/or decoded in the TTI.

Hence, the present disclosure can prevent a transmission timing of HARQ-ACK for a newly scheduled PDSCH from being earlier than a transmission timing of HARQ-ACK for a PDSCH being repeated when the new PDSCH is scheduled in a state where the repetition is not terminated. That is, the present disclosure has an effect of giving a high priority to the PDSCH being earlier repeated.

The present disclosure can improve reliability and a latency performance of a transmission and reception operation of PDSCH repetition through the above-described examples.

In the present disclosure, the above-described implementations and examples have described focusing on the operations implemented in a situation of DL repetition transmission (e.g., PDSCH), but are not limited thereto. For example, the above-described implementations and examples can be implemented by the UE and/or the BS even in UL repetition transmission (e.g., PUSCH).

Since an operation of the base station described below with reference to FIG. 26 is the same as the operation of the base station described with reference to FIGS. 1 to 25, a detailed description thereof is omitted.

Overview of Device to which the Present Disclosure is Applicable

FIG. 26 illustrates an example of an internal block diagram of a wireless communication device to which the present disclosure is applicable.

Referring to FIG. 26, a wireless communication system includes a base station 2610 and a plurality of UEs 2620 located in an area of the base station 2610. Hereinafter, the base station 2610 and the UE 2620 may be referred to as a wireless device.

The base station 2610 includes a processor 2611, a memory 2612, and a radio frequency (RF) unit 2613. The processor 2611 implements functions, processes, and/or methods described in FIGS. 1 to 25. Layers of a radio interface protocol may be implemented by the processor 2611. The memory 2612 is connected to the processor 2611 and stores various types of information for driving the processor 2611. The RF unit 2613 is connected to the processor 2611 and transmits and/or receives a radio signal.

The UE 2620 includes a processor 2621, a memory 2622, and a RF unit 2623. The processor 2621 implements functions, processes, and/or methods described in FIGS. 1 to 25. Layers of a radio interface protocol may be implemented by the processor 2621. The memory 2622 is connected to the processor 2621 and stores various types of information for driving the processor 2621. The RF unit 2623 is connected to the processor 2621 and transmits and/or receives a radio signal.

The memories 2612 and 2622 may be inside or outside the processors 2611 and 2621 and may be connected to the processors 2611 and 2621 through various well-known means.

The memories 2612 and 2622 may store programs for processing and controlling the processors 2611 and 2621 and may temporarily store input/output information.

The memories 2612 and 2622 may serve as a buffer.

Further, the base station 2610 and/or the UE 2620 may have a single antenna or multiple antennas.

Figure 27:
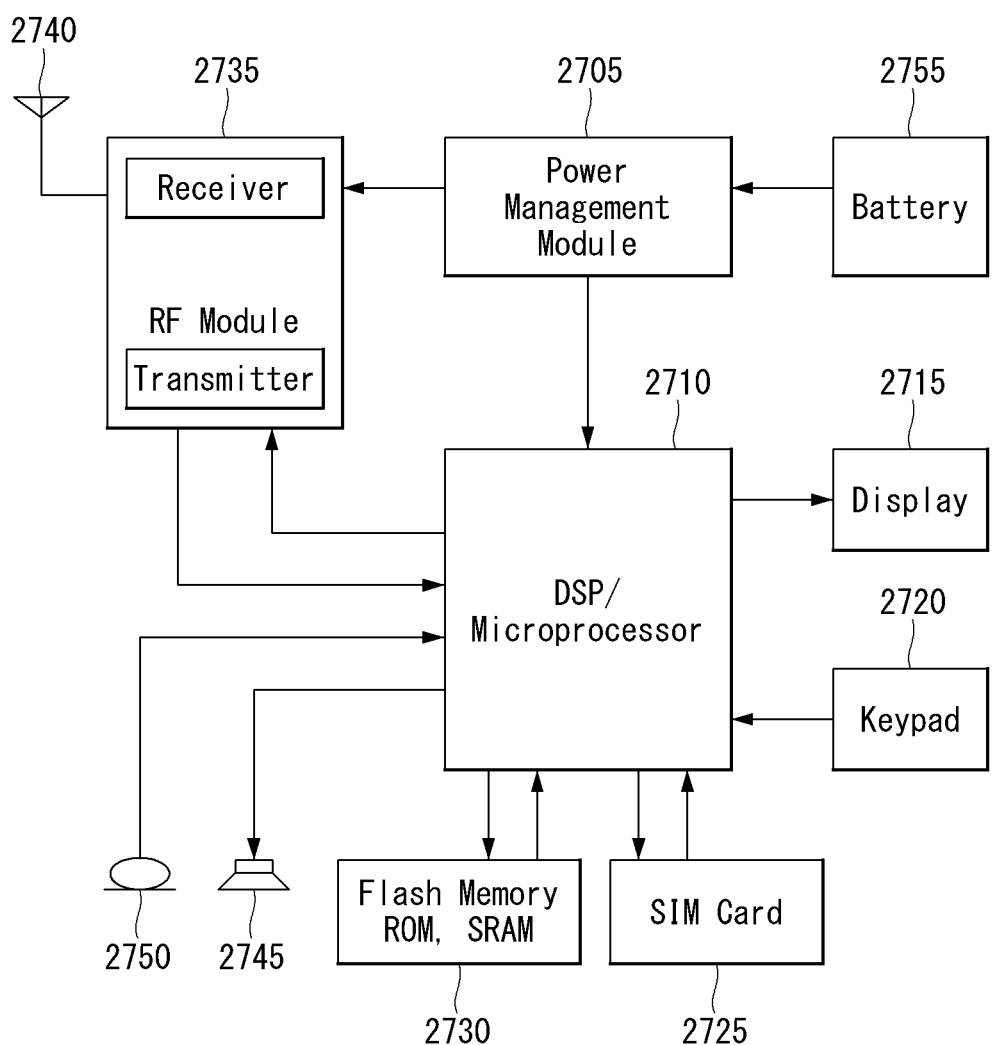
FIG. 27 illustrates an example of a block configuration diagram of a communication device according to implementations of the present disclosure.

FIG. 27 illustrates a block configuration diagram of a communication device according to an implementation of the present disclosure.

In particular, FIG. 27 illustrates in more detail the UE illustrated in FIG. 26.

Referring to FIG. 27, the UE may include a processor (or digital signal processor (DSP)) 2710, an RF module (or RF unit) 2735, a power management module 2705, an antenna 2740, a battery 2755, a display 2715, a keypad 2720, a memory 2730, a subscriber identification module (SIM) card 2725 (which is optional), a speaker 2745, and a microphone 2750. The UE may also include a single antenna or multiple antennas.

The processor 2710 implements functions, processes, and/or methods described in FIGS. 1 to 26. Layers of a radio interface protocol may be implemented by the processor 2710.

The memory 2730 is connected to the processor 2710 and stores information related to operations of the processor 2710. The memory 2730 may be inside or outside the processor 2710 and may be connected to the processors 2710 through various well-known means.

A user inputs instructional information, such as a telephone number, for example, by pushing (or touching) buttons of the keypad 2720 or by voice activation using the microphone 2750. The processor 2710 receives and processes the instructional information to perform an appropriate function, such as to dial the telephone number. Operational data may be extracted from the SIM card 2725 or the memory 2730. Further, the processor 2710 may display instructional information or operational information on the display 2715 for the user's reference and convenience.

The RF module 2735 is connected to the processor 2710 and transmits and/or receives a RF signal. The processor 2710 forwards instructional information to the RF module 2735 in order to initiate communication, for example, transmit a radio signal configuring voice communication data. The RF module 2735 consists of a receiver and a transmitter to receive and transmit the radio signal. The antenna 2740 functions to transmit and receive the radio signal. Upon reception of the radio signal, the RF module 2735 may forward a signal to be processed by the processor 2710 and convert the signal into a baseband. The processed signal may be converted into audible or readable information output via the speaker 2745.

Figure 28:
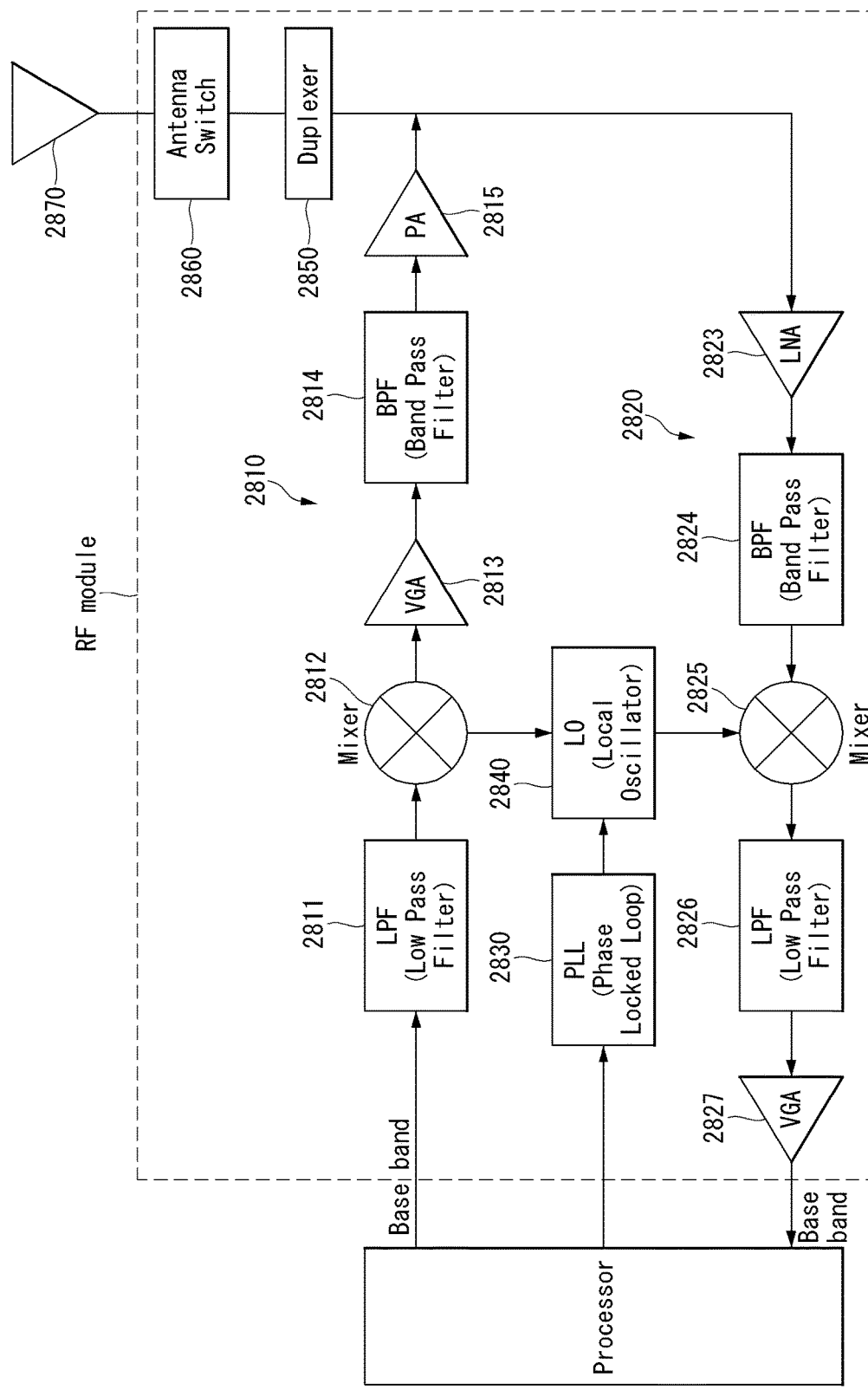
FIG. 28 illustrates an example of a RF module of a wireless communication device to which implementations of the present disclosure are applicable.

FIG. 28 illustrates an example of a RF module of a wireless communication device to which implementations of the present disclosure are applicable.

More specifically, FIG. 28 illustrates an example of an RF module that can be implemented in a frequency division duplex (FDD) system.

First, in a transmission path, the processor illustrated in FIGS. 26 and 27 processes data to be transmitted and provides an analog output signal to a transmitter 2810.

In the transmitter 2810, the analog output signal is filtered by a low pass filter (LPF) 2811 to remove images caused by a digital-to-analog conversion (ADC), is up-converted from a baseband to an RF by an up-converter (mixer) 2812, and is amplified by a variable gain amplifier (VGA) 2813, and the amplified signal is filtered by a filter 2814, is additionally amplified by a power amplifier (PA) 2815, is routed through duplexer(s) 2850/antenna switch(es) 2860, and is transmitted through an antenna 2870.

Further, in a reception path, the antenna 2870 receives signals from the outside and provides the received signals, and the signals are routed through the antenna switch(es) 2860/duplexers 2850 and are provided to a receiver 2820.

In the receiver 2820, the received signals are amplified by a low noise amplifier (LNA) 2823, are filtered by a bans pass filter 2824, and are down-converted from the RF to the baseband by a down-converter (mixer) 2825.

The down-converted signal is filtered by a low pass filter (LPF) 2826 and is amplified by a VGA 2827 to obtain an analog input signal, and the analog input signal is provided to the processor illustrated in FIGS. 26 and 27.

Further, a local oscillator (LO) generator 2840 generates transmitted and received LO signals and provides them to the up-converter 2812 and the down-converter 2825, respectively.

In addition, a phase locked loop (PLL) 2830 receives control information from the processor in order to generate the transmitted and received LO signals at appropriate frequencies and provides control signals to the LO generator 2840.

The circuits illustrated in FIG. 28 may be arranged differently from the configuration illustrated in FIG. 28.

Figure 29:
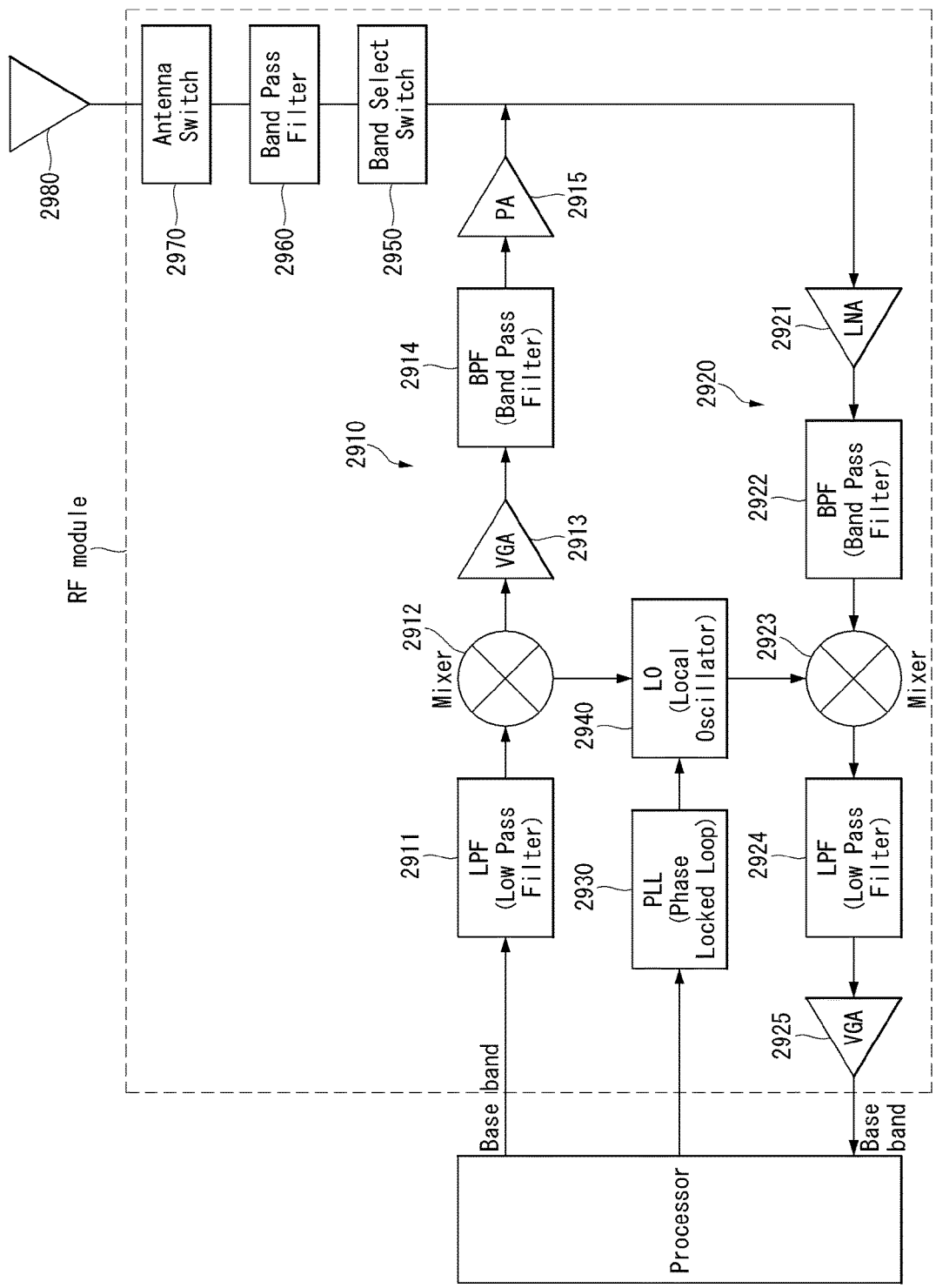
FIG. 29 illustrates another example of a RF module of a wireless communication device to which implementations of the present disclosure are applicable.

FIG. 29 illustrates another example of a RF module of a wireless communication device to which implementations of the present disclosure are applicable.

More specifically, FIG. 29 illustrates an example of an RF module that can be implemented in a time division duplex (TDD) system.

A transmitter 2910 and a receiver 2920 of the RF module in the TDD system have the same structure as the transmitter and the receiver of the RF module in the FDD system.

Hereinafter, only the structure of the RF module of the TDD system that differs from the RF module of the FDD system will be described, and the same structure will refers to the description of FIG. 29.

A signal amplified by a power amplifier (PA) 2915 of the transmitter 2910 is routed through a band select switch 2950, a band pass filter (BPF) 2960, and antenna switch(es) 2970 and is transmitted via an antenna 2980.

Further, in a reception path, the antenna 2980 receives signals from the outside and provides the received signals, and the signals are routed through the antenna switch(es) 2970, the band pass filter 2960, and the band select switch 2950 and are provided to the receiver 2920.

Figure 30:
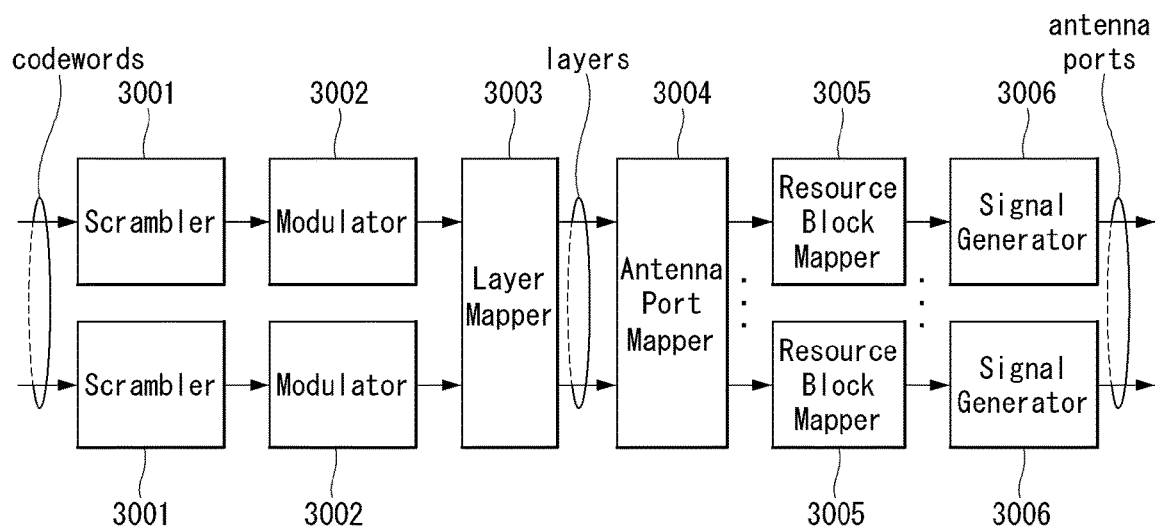
FIG. 30 illustrates an example of a signal processing module to which implementations of the present disclosure are applicable.

FIG. 30 illustrates an example of a signal processing module to which implementations of the present disclosure are applicable.

More specifically, FIG. 30 illustrates an example of a signal processing module structure in a transmitting device.

Hereinafter, the UE or the base station of FIG. 26 may be referred to as a receiving device.

Here, the signal processing may be performed by the processor of the same base station/UE as the processors 2611 and 2621 of FIG. 26.

Referring to FIG. 30, a transmitting device in a UE or a base station may include a scrambler 3001, a modulator 3002, a layer mapper 3003, an antenna port mapper 3004, a resource block mapper 3005, and a signal generator 3006.

The transmitting device may transmit one or more codewords. Each of coded bits in each codeword may be scrambled by the scrambler 3001 and transmitted on a physical channel. The codeword may be referred to as a data column and may be equivalent to a transport block that is a data block provided by a MAC layer.

The scrambled bits are modulated to complex-valued modulation symbols by the modulator 3002. The modulator 3002 may modulate the scrambled bits according to a modulation scheme and dispose the modulated bits as complex-valued modulation symbols representing a location on signal constellation. There is no restriction in the modulation scheme, and m-PSK (m-Phase Shift Keying) or m-QAM (m-Quadrature Amplitude Modulation), etc. may be used in the modulation of coded data. The modulator may be referred to as a modulation mapper.

The complex-valued modulation symbols may be mapped to one or more transport layers by the layer mapper 3003. The complex-valued modulation symbol on each layer may be mapped by the antenna port mapper 3004 for the transport on an antenna port.

The resource block mapper 3005 may map the complex-valued modulation symbol for each antenna port to an appropriate resource element within a virtual resource block allocated for the transport. The resource block mapper 3005 may map the virtual resource block to a physical resource block according to an appropriate mapping scheme. The resource block mapper 3005 may allocate the complex-valued modulation symbol for each antenna port to an appropriate subcarrier and multiplex it according to a user.

The signal generator 3006 may modulate the complex-valued modulation symbol, i.e., an antenna-specific symbol for each antenna port through a specific modulation scheme, for example, an orthogonal frequency division multiplexing (OFDM) scheme to generate a complex-valued time domain OFDM symbol signal. The signal generator 3006 may perform an inverse fast Fourier transform (IFFT) on the antenna-specific symbol, and a cyclic prefix (CP) may be inserted into a time domain symbol on which the IFFT is performed. An OFDM symbol goes through digital-to-analog conversion, frequency up-conversion, etc. and is transmitted to the receiving device via each transmitting antenna. The signal generator 3006 may include an IFFT module, a CP inserter, a digital-to-analog converter (DAC), a frequency up-converter, and the like.

Figure 31:
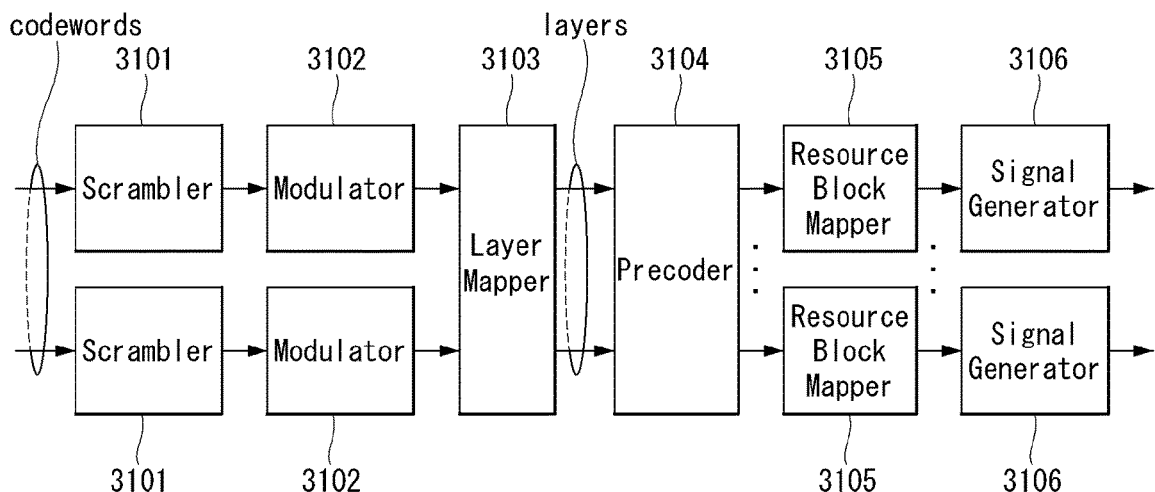
FIG. 31 illustrates another example of a signal processing module to which implementations of the present disclosure are applicable.

FIG. 31 illustrates another example of a signal processing module to which implementations of the present disclosure are applicable.

More specifically, FIG. 31 illustrates another example of a signal processing module structure in a base station or a UE. Here, the signal processing may be performed by the processor of the base station/UE of the processors 2611 and 2621, etc. of FIG. 26.

Referring to FIG. 31, a transmitting device in a UE or a base station may include a scrambler 3101, a modulator 3102, a layer mapper 3103, a precoder 3104, a resource block mapper 3105, and a signal generator 3106.

The transmitting device may scramble coded bits within one codeword for the one codeword by the scrambler 3101 and then transmit it via a physical channel.

The scrambled bits are modulated to complex-valued modulation symbols by the modulator 3102. The modulator 3102 may modulate the scrambled bits according to a predetermined modulation scheme and dispose the modulated bits as complex-valued modulation symbols representing a location on signal constellation. There is no restriction in the modulation scheme, and pi/2-BPSK (pi/2-Binary Phase Shift Keying), m-PSK (m-Phase Shift Keying), or m-QAM (m-Quadrature Amplitude Modulation), etc. may be used in the modulation of coded data.

The complex-valued modulation symbols may be mapped to one or more transport layers by the layer mapper 3103.

The complex-valued modulation symbol on each layer may be precoded by the precoder 3104 for the transport on an antenna port. In this instance, the precoder 3104 may perform a transform precoding on the complex-valued modulation symbols and then perform a precoding on the complex-valued modulation symbols. Alternatively, the precoder 3104 may perform the precoding on the complex-valued modulation symbols without performing the transform precoding. The precoder 3104 may process the complex-valued modulation symbols through a MIMO scheme according to multiple transmitting antennas to output antenna-specific symbols and may distribute the antenna-specific symbols to the corresponding resource block mapper 3105. An output z of the precoder 3104 may be obtained by multiplying an output y of the layer mapper 3103 by a precoding matrix W of N×M, where N is the number of antenna ports, and M is the number of layers.

The resource block mapper 3105 maps the complex-valued modulation symbol for each antenna port to an appropriate resource element within a virtual resource block allocated for the transport.

The resource block mapper 3105 may allocate the complex-valued modulation symbols to appropriate subcarriers and multiplex them according to a user.

The signal generator 3106 may modulate the complex-valued modulation symbols through a specific modulation scheme, for example, an orthogonal frequency division multiplexing (OFDM) scheme to generate a complex-valued time domain OFDM symbol signal. The signal generator 3106 may perform an inverse fast Fourier transform (IFFT) on the antenna-specific symbol, and a cyclic prefix (CP) may be inserted into a time domain symbol on which the IFFT is performed. An OFDM symbol goes through digital-to-analog conversion, frequency up-conversion, etc. and is transmitted to the receiving device via each transmitting antenna. The signal generator 3106 may include an IFFT module, a CP inserter, a digital-to-analog converter (DAC), a frequency up-converter, and the like.

The signal processing of the receiving device may be configured in the reverse of the signal processing of the transmitter. Specifically, a processor of the receiving device performs decoding and demodulation on a radio signal received from the outside via antenna port(s) of the RF unit. The receiving device may include a plurality of multi-receiving antennas. Each signal received via the receiving antenna is recovered as a baseband signal, and then goes through multiplexing and MIMO demodulation and is recovered to a data column that the transmitting device originally intends to transmit. The receiving device may include a signal restorer for recovering a received signal as a baseband signal, a multiplexer for combining and multiplexing the received and processed signals, and a channel demodulator for modulating a multiplexed signal string to a corresponding codeword. The signal restorer, the multiplexer, and the channel demodulator may be configured as one integrated module to perform their functions or respective independent modules. More specifically, the signal restorer may include an analog-to-digital converter (ADC) for converting an analog signal into a digital signal, a CP remover for removing a CP from the digital signal, a FFT module which applies a fast Fourier transform (FFT) to a signal, from which the CP is removed, and outputs a frequency domain symbol, and a resource element demapper/an equalizer for recovering the frequency domain symbol as an antenna-specific symbol. The antenna-specific symbol is recovered to a transport layer by the multiplexer, and the transport layer is recovered to a codeword, that the transmitting device intends to transmit, by the channel demodulator.

A radio device in the present disclosure may be a base station, a network node, a transmitter UE, a receiver UE, a radio device, a wireless communication device, a vehicle, a vehicle with an automatic driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

The UE in the present disclosure may include a cellular phone, a smart phone, a laptop computer, a digital broadcast terminal, a personal digital assistants (PDA), a portable multimedia player (PMP), a navigator, a slate PC, a tablet PC, an ultrabook, a wearable device (e.g., a smart watch, a smart glass, a head mounted display (HMD)), a foldable device, or the like. For example, the HMD may be a display device which is worn on the head, and may be used to implement the VR or AR device.

The implementations described above are implemented by combinations of components and features of the present disclosure in predetermined forms. Each component or feature should be considered selectively unless specified separately. Each component or feature may be carried out without being combined with another component or feature.

Moreover, some components and/or features are combined with each other and can implement implementations of the present disclosure. The order of operations described in implementations of the present disclosure may be changed. Some components or features of one implementation may be included in another implementation, or may be replaced by corresponding components or features of another implementation. It is apparent that some claims referring to specific claims may be combined with another claims referring to the claims other than the specific claims to constitute the implementation or add new claims by means of amendment after the application is filed.

Implementations of the present disclosure can be implemented by various means, for example, hardware, firmware, software, or combinations thereof. When implementations are implemented by hardware, one implementation of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When implementations are implemented by firmware or software, one implementation of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

Although various implementations for transmitting and receiving downlink data in a wireless communication system according to the present disclosure have been described focusing on examples applying to the 3GPP LTE/LTE-A system, such implementations can be applied to various wireless communication systems, such as the 5G system, other than the 3GPP LTE/LTE-A system.

What is claimed is:

1. A method of receiving, by a user equipment, a physical downlink shared channel (PDSCH) in a wireless communication system, the method comprising:
   receiving, from a base station (BS), configuration information related to an uplink (UL)-downlink (DL) configuration;
   repeatedly receiving, from the BS, a first PDSCH based on the configuration information;
   receiving, from the BS, a first physical downlink control channel (PDCCH) related to an UL-DL reconfiguration; and
   discarding a second PDCCH scheduling a repetition of a second PDSCH in a transmission time unit based on (i) the configuration information indicating the transmission time unit as an uplink, and (ii) the first PDCCH indicating the transmission time unit as a downlink.

2. The method of claim 1, wherein the transmission time unit is a subframe or a special subframe.

3. The method of claim 1, wherein the configuration information further comprises information for configuration of an enhanced interference mitigation and traffic adaptation (eIMTA) operation.

4. The method of claim 1, wherein the first PDCCH is a PDCCH with a cyclic redundancy check (CRC) scrambled by an eIMTA-radio network temporary identifier (RNTI).

5. A user equipment (UE) configured to receive a physical downlink shared channel (PDSCH) in a wireless communication system, the UE comprising:
- at least one transceiver;
- at least one processor; and
- at least one computer memory operably connectable to the at least one processor and storing instructions that, when executed by the at least one processor, perform operations comprising:
- receiving, from a base station (BS), configuration information related to an uplink (UL)-downlink (DL) configuration;
- repeatedly receiving, from the BS, a first PDSCH based on the configuration information;
- receiving, from the BS, a first physical downlink control channel (PDCCH) related to an UL-DL reconfiguration; and
- discarding a second PDCCH scheduling a repetition of a second PDSCH in a transmission time unit based on (i) the configuration information indicating the transmission time unit as an uplink, and (ii) the first PDCCH indicating the transmission time unit as a downlink.

6. The UE of claim 5, wherein the transmission time unit is a subframe or a special subframe.

7. The UE of claim 5, wherein the configuration information further comprises information for configuration of an enhanced interference mitigation and traffic adaptation (eIMTA) operation.

8. The UE of claim 5, wherein the first PDCCH is a PDCCH with a cyclic redundancy check (CRC) scrambled by an eIMTA-radio network temporary identifier (RNTI).

9. A base station (BS) configured to transmit a physical downlink shared channel (PDSCH) in a wireless communication system, the BS comprising:
- at least one transceiver;
- at least one processor; and
- at least one computer memory operably connectable to the at least one processor and storing instructions that, when executed by the at least one processor, perform operations comprising:
- transmitting, to a user equipment (UE), a configuration information related to an uplink (UL)-downlink (DL) configuration;
- repeatedly transmitting, to the UE, a first PDSCH based on the configuration information; and
- transmitting, to the UE, a first physical downlink control channel (PDCCH) related to an UL-DL reconfiguration,
- wherein a second PDCCH scheduling a repetition of a second PDSCH is discarded in a transmission time unit based on (i) the configuration information indicating the transmission time unit as an uplink, and (ii) the first PDCCH indicating the transmission time unit as a downlink.

10. The BS of claim 9, wherein the transmission time unit is a subframe or a special subframe.

11. The BS of claim 9, wherein the configuration information further comprises information for configuration of an enhanced interference mitigation and traffic adaptation (eIMTA) operation.

12. The BS of claim 9, wherein the first PDCCH is a PDCCH with a cyclic redundancy check (CRC) scrambled by an eIMTA-radio network temporary identifier (RNTI).

* * * * *